(12) United States Patent
Kim et al.

(10) Patent No.: US 12,231,925 B2
(45) Date of Patent: Feb. 18, 2025

(54) METHOD, DEVICE, AND SYSTEM FOR DIAGNOSING PERFORMANCE OF 5G MOBILE COMMUNICATION-BASED NETWORK

(71) Applicant: MAGDATA INC., Seoul (KR)

(72) Inventors: Jong Min Kim, Seoul (KR); Ho Jeong Hwang, Seongnam-si (KR)

(73) Assignee: MAGDATA INC., Seoul (KR)

( * ) Notice: Subject to any disclaimer, the term of this patent is extended or adjusted under 35 U.S.C. 154(b) by 400 days.

(21) Appl. No.: 17/641,077

(22) PCT Filed: Aug. 26, 2020

(86) PCT No.: PCT/KR2020/011359
§ 371 (c)(1),
(2) Date: Mar. 7, 2022

(87) PCT Pub. No.: WO2021/049783
PCT Pub. Date: Mar. 18, 2021

(65) Prior Publication Data
US 2022/0345914 A1    Oct. 27, 2022

(30) Foreign Application Priority Data

Sep. 9, 2019  (KR) .................. 10-2019-0111512
Sep. 9, 2019  (KR) .................. 10-2019-0111513

(51) Int. Cl.
*H04W 4/00*    (2018.01)
*H04L 43/0864*    (2022.01)
(Continued)

(52) U.S. Cl.
CPC ......... *H04W 24/04* (2013.01); *H04L 43/0864* (2013.01); *H04L 43/0894* (2013.01); *H04L 43/12* (2013.01); *H04W 24/06* (2013.01)

(58) Field of Classification Search
CPC .... H04W 24/04; H04W 24/06; H04L 43/0864
See application file for complete search history.

(56) References Cited

U.S. PATENT DOCUMENTS 9,954,751 B2 * 4/2018 Zhang ................. H04L 43/0864
2010/0265832 A1 * 10/2010 Bajpay ................ H04L 41/5009
370/250
(Continued)

FOREIGN PATENT DOCUMENTS

JP    2016096416 A    5/2016
JP    2018504050 A    2/2018
(Continued)

OTHER PUBLICATIONS

Huawei et al., S6-181502, Proposal for Network situation and QoS monitoring and reporting, 3GPP TSG SA WG6 #026.
(Continued)

*Primary Examiner* — Elisabeth Benoit Magloire
(74) *Attorney, Agent, or Firm* — INVENSTONE PATENT, LLC

(57) ABSTRACT

An aspect of the present disclosure discloses a method for diagnosing the performance of a 5G-based network by a network performance diagnosis device connected to a switching device connected to the 5G-based network. The method comprises the steps of: obtaining at least one mirrored packet for at least one packet transceived from/to a user terminal connected to at least one base station on the basis of mirroring from the switching device; calculating performance-related indicators representing the performance of a network associated with the user terminal and the at least one base station on the basis of at least part of information included in the at least one mirrored packet; and determining whether the 5G-based network operates normally, on the basis of the performance-related indicators.

19 Claims, 29 Drawing Sheets

(51) Int. Cl.
*H04L 43/0894* (2022.01)
*H04L 43/12* (2022.01)
*H04W 24/04* (2009.01)
*H04W 24/06* (2009.01)

(56) References Cited

U.S. PATENT DOCUMENTS

| | | | | |
|---|---|---|---|---|
| 2015/0334593 | A1* | 11/2015 | Chen | H04L 47/2491 |
| | | | | 370/235 |
| 2016/0072693 | A1* | 3/2016 | Michaelis | H04L 43/50 |
| | | | | 709/203 |
| 2017/0373950 | A1 | 12/2017 | Szilagyi et al. | |
| 2018/0152384 | A1* | 5/2018 | Kakadia | H04L 43/12 |
| 2018/0295144 | A1* | 10/2018 | Jackson | H04L 43/10 |
| 2019/0104078 | A1* | 4/2019 | Kachrani | H04B 10/07953 |
| 2019/0386913 | A1* | 12/2019 | Wei | H04L 47/125 |
| 2020/0106687 | A1* | 4/2020 | Nambisan | H04L 12/2854 |
| 2021/0051611 | A1* | 2/2021 | Xu | H04L 1/189 |
| 2021/0367870 | A1 | 11/2021 | Kim et al. | |

FOREIGN PATENT DOCUMENTS

| | | |
|---|---|---|
| KR | 10-2014-0091900 A | 7/2014 |
| KR | 10-2017-0110105 A | 10/2017 |
| KR | 10-2018-0093197 A | 8/2018 |
| KR | 10-2019-0088342 A | 7/2019 |
| WO | 2018-213688 A1 | 11/2018 |

OTHER PUBLICATIONS

Etri et al., S5-192221, Add use case and requirements of self-monitoring of network performance, 3GPP TSG SA WG5 #124.

* cited by examiner

FIG. 19

| Alert Name | Rule Set | Alert Level | Duration | Server IP | SMS | E-Mail |
|---|---|---|---|---|---|---|
| Web traffic latency occurs | Wait > 70%<br>Latency > 5sec | Normal | 10sec | All web servers | Y | Y |
| WAS traffic server latency 5 sec or more | Latency > 5sec | High | 5sec | 1 case except 192.168.10.20 | Y | Y |
| WAS traffic Wait excess occurs | Wait > 70% | High | 5sec | 1 case except 192.168.10.20 | | Y |
| DB traffic latency occurs | Wait > 70%<br>Latency > 5sec | Normal | 10sec | All DB servers | | Y |
| BPS excess occurs | BPS > 50M | Normal | 5sec | All servers | | Y |
| 50X Error occurs | Http 50x Error > 5 | High | 5sec | All Web servers | Y | Y |
| CPS excess occurs | CPS > 150 | Low | 10sec | All servers | | Y |
| Wait excess occurs | Session > 1000<br>Wait > 80% | High | 10sec | All servers | Y | Y |
| Web WAS section latency occurs | Latency > 5sec | Normal | 5sec | All Web-WAS servers | | Y |

METHOD, DEVICE, AND SYSTEM FOR DIAGNOSING PERFORMANCE OF 5G MOBILE COMMUNICATION-BASED NETWORK

CROSS-REFERENCE TO RELATED APPLICATIONS

This application is the National Stage filing under 35 U.S.C. 371 of International Application No. PCT/KR2020/011359, filed on Aug. 26, 2020, which claims the benefit of earlier filing date and right of priority to Korean Application No. 10-2019-0111512, filed on Sep. 9, 2019, and No. 10-2019-0111513, filed on Sep. 9, 2019, the contents of which are all hereby incorporated by reference herein in their entirety.

BACKGROUND OF THE DISCLOSURE

Field of the Disclosure

The present disclosure relates to a network performance monitoring method, and more particularly, to a method for efficiently monitoring network performance in a 5G-based network.

Related Art

As more and more communication devices demand larger communication capacity, there is a need for improved mobile broadband communication compared to existing radio access technology (RAT). Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed. In the present disclosure, this technology is called new RAT, NR (NEW RADIO), or 5G communication for convenience.

A network related to 5G communication generally includes a communication link and various devices with communication capability connected to the communication link. The devices related to the network include computers, peripheral devices, routers, storage devices, and appliances with processors and communication interfaces. As used herein, the term "device" typically includes logical devices or other units having functionality and an ability to process and exchange data, and can include not only all home devices but also general purpose computers.

Particularly, in a 5G communication network, devices within the 5G communication network operate under the assumption that device-to-device communication occurs within a performance range required for 5G. Thus, it is very important to find out how quickly device-to-device communication occurs and, if not, what is the cause of a performance degradation. However, there is no appropriate service for clarifying where the cause of such performance degradation lies, making it impossible to deal with the performance degradation. This problem results in a failure to properly deal with the performance degradation and miss a golden time for performance enhancement, thereby making it difficult to run the overall system.

SUMMARY

An aspect of the present disclosure provides a method for diagnosing network performance by a network performance diagnosis device for managing 5G-based network service on a network system related to 5G communication.

According to an aspect of the present disclosure, there is provided a method for diagnosing a performance of a 5G-based network by a network performance diagnosis device connected to a switching device connected to the 5G-based network. The method comprises: obtaining at least one mirrored packet for at least one packet transceived from/to a user terminal connected to at least one base station on the basis of mirroring from the switching device; calculating performance-related indicators representing the performance of a network associated with the user terminal and the at least one base station on the basis of at least a part of information included in the at least one mirrored packet; and determining whether the 5G-based network operates normally, on the basis of the performance-related indicators.

The at least one base station may comprise at least one of a gNB (Next Generation NodeB), which is a base station of a 5G network, and an en-gNB and an ng-eNB, which support a connection to an LTE (Long Term Evolution) core, as well as a connection to a 5G core.

The performance diagnosis method may further comprise: comparing the performance-related indicators with a predetermined reference value related to a network performance required by a 5G communication service; and determining whether an error has occurred or not based on a result of the comparison.

The performance diagnosis method may further comprise: comparing the performance-related indicators with a predetermined reference value related to a network performance required by a communication service to which the user terminal is connected, the communication service to which the user terminal is connected comprising LTE or 5G communication; and determining whether an error has occurred or not based on a result of the comparison.

The performance diagnosis method may further comprise, when it is determined that an error in network performance has occurred, sending an alert to the error occurrence.

The alert may comprise at least one of displaying a visual representation related to the alert on a display screen or transmitting a signal related to the alert to the user terminal.

The performance-related indicators may comprise information on the user terminal's connections to the at least one base station, wherein the connection information may comprise information indicating whether a network to which the user terminal is connected is a 5G network or an LTE network.

A reference value related to a packet RTT (Round Trip Time) from the user terminal to a first entity or the at least one base station among the performance-related indicators and a reference value related to a network latency required by the 5G communication service, may be compared.

The reference value related to the network latency may be from 1 ms to 2 ms.

A BPS (Bits Per Second) representing the number of bits of data per second, among the performance-related indicators, may be compared with a BPS-related reference value required by a 5G communication service.

The BPS-related reference value required by the 5G communication service may be from 100 Mbps to 1 Gbps.

The calculating of performance-related indicators representing the performance of a network service on the basis of at least a part of information included in the at least one mirrored packet may comprise: extracting, from a mirrored packet of a first packet transmitted to the first entity from the user terminal, information on a first timing T1 at which the first packet arrives at the network performance diagnosis device from the user terminal, the first entity being an entity that arrives from the user terminal via at least one of the at least one base station and a core network; extracting, from a mirrored packet of a first response packet from the first entity with respect to the first packet, information on a second timing T2 at which the first response packet arrives at the network performance diagnosis device from the first entity; and calculating a first round trip time sRTT based on the extracted information on the first timing T1 and the extracted information on the second timing T2.

The calculating of performance-related indicators representing the performance of the network service on the basis of at least a part of information included in the at least one mirrored packet may comprise: extracting, from a mirrored packet of a second response packet from the user terminal with respect to the first response packet, information on a third timing T3 at which the second response packet arrives at the network performance diagnosis device from the user terminal; and calculating a second round trip time cRTT based on the extracted information on the second timing T2 and the extracted information on the third timing T3.

The performance diagnosis method may further comprise calculating individual network performance-related indicators for each of a first network and a second network located between the user terminal and a data network DN, by using the first round trip time sRTT and the second round trip time cRTT, which are calculated by a first network performance diagnosis device connected to a first switching device, and by using the first round trip time sRTT and the second round trip time cRTT, which are calculated by a second network performance diagnosis device connected to a second switching device, the first switching device being disposed between a network core and at least one base station, and the second switching device being disposed between a network core and the data network.

The first network may comprise at least one of a wireless network (Air Net) and an access network, and the second network may comprise at least one of an access network (Access Net) and a core network (Core Net).

The performance diagnosis method may further comprise calculating individual network performance-related indicators for each of a first network and a second network located between the user terminal and a data network, by using the first round trip time sRTT and the second round trip time cRTT, which are calculated using a first network interface connected to a first switching device provided between a network core and at least one base station, and by using the first round trip time sRTT and the second round trip time cRTT, which are calculated using a second network interface connected to a second switching device between a network core and a data network, wherein the first network interface and the second network interface are connected to different ports of the network performance diagnosis device.

5-tuple information of the at least one mirrored packet may be analyzed in order to calculate individual network performance-related indicators, wherein the 5-tuple information comprises a source IP, a destination IP, a source port, a destination port, and NIC (Network Interface Card) information.

The switching device may be provided between a network core and at least one base station.

According to another aspect of the present disclosure, there is provided a network performance diagnosis device connected to a switching device connected to a 5G-based network, the network performance diagnosis device comprising: a port that obtains at least one mirrored packet for at least one packet transceived from/to a user terminal connected to at least one base station on the basis of mirroring from the switching device; a processor that calculates performance-related indicators representing the performance of a network associated with the user terminal and the at least one base station on the basis of at least a part of information included in the at least one mirrored packet, and that determines whether the 5G-based network operates normally, on the basis of the performance-related indicators; and a memory that stores instructions related to the operation of the processor and stores the calculated performance-related indicators.

According to yet another aspect of the present disclosure, there is provided a 5G-based network performance diagnosis system comprising: a switching device connected to a 5G-based network; and a network performance diagnosis device that obtains at least one mirrored packet for at least one packet transceived from/to a user terminal connected to at least one base station on the basis of mirroring from the switching device, that calculates performance-related indicators representing the performance of a network associated with the user terminal and the at least one base station on the basis of at least a part of information included in the at least one mirrored packet, and that determines whether the 5G-based network operates normally, on the basis of the performance-related indicators.

According to an aspect of the present disclosure, there is provided a method for visualizing the performance of a 5G-based network by a network performance visualization device connected to a switching device connected to the 5G-based network, the method comprising: obtaining at least one mirrored packet for at least one packet transceived from/to a user terminal connected to at least one base station on the basis of mirroring from the switching device; calculating performance-related indicators representing the performance of a network associated with the user terminal and the at least one base station on the basis of at least a part of information included in the at least one mirrored packet; obtaining location information of the user terminal; and displaying the user terminal in a visual representation corresponding to the performance-related indicators of the user terminal in a location in a first visualization space that corresponds to the location information of the user terminal.

The at least one base station may comprise at least one of a gNB (Next Generation NodeB), which is a base station of a 5G network, and an en-gNB and an ng-eNB, which support a connection to an LTE (Long Term Evolution) core, as well as a connection to a 5G core.

The first visualization space may comprise a map visualizing a network area that is under control of the at least one base station.

A network shaded area display map distinctively displaying a network shaded area for the network area may be generated by displaying a visual representation corresponding to network performance information of each of a plurality of user terminals on the map, based on the location information and performance-related indicators obtained from the plurality of user terminals.

The network performance visualization method may comprise: estimating network performance in a location where the plurality of user terminals are not disposed based on performance-related indicators in a location where the plurality of user terminals are disposed; and generating the network shaded area display map based on the estimated network performance.

The estimating of network performance in a location where the plurality of user terminals are not disposed may comprise: training an artificial intelligence model that takes, as an input, a location in an area where the user terminal is actually disposed in the first visualization space and the performance-related indicators, and that estimates the relationship between the location in the first visualization space and the performance-related indicators; and estimating network performance in a location where the user terminal is not disposed, based on the trained artificial intelligence model.

The network shaded area display map may be generated by estimating an expected shaded area based on a location of an obstacle stored in a network area and a location of a cell area of the at least one base station.

A degradation in the network performance of a second user terminal may be predicted by using at least one of the direction of movement of the second user terminal in the network shaded area display map and the movement speed thereof.

A visual representation corresponding to the performance-related indicators may comprise a visual representation corresponding to a packet round trip time between the user terminal and a first entity or at least one base station.

A visual representation corresponding to the performance-related indicators may comprise a visual representation corresponding to a BPS (Bits Per Second) representing the number of bits of data per second.

The visual representation may be displayed different from at least one reference value stored in relation to a network performance required by a 5G communication service.

In relation to a visual representation for the user terminal, a first visual representation of the user terminal may be displayed different depending on the type of a connected network, and a second visual representation of the user terminal may be displayed differently depending on the performance-related indicators.

The first visual representation may be a contour line of the user terminal, and the second visual representation may be a color of the user terminal.

Location information of the user terminal may be information obtained through stored terminal location information, or may be information obtained by receiving positioning information of the user terminal from the user terminal.

The switching device may be provided between a network core and at least one base station.

According to another aspect of the present disclosure, there is provided a network performance visualization device connected to a switching device connected to a 5G-based network, the network performance visualization device comprising: a port that obtains at least one mirrored packet for at least one packet transceived from/to a user terminal connected to at least one base station on the basis of mirroring from the switching device; a processor that calculates performance-related indicators representing the performance of a network associated with the user terminal and the at least one base station on the basis of at least a part of information included in the at least one mirrored packet, and that displays the user terminal in a visual representation corresponding to the performance-related indicators of the user terminal in a location in a first visualization space that corresponds to the location of the user terminal; and a memory that stores instructions related to the operation of the processor and stores the calculated performance-related indicators.

According to yet another aspect of the present disclosure, there is provided a 5G-based network performance visualization system comprising: a switching device connected to a 5G-based network; and a network performance visualization device that obtains at least one mirrored packet for at least one packet transceived from/to a user terminal connected to at least one base station on the basis of mirroring from the switching device, that calculates performance-related indicators representing the performance of a network associated with the user terminal and the at least one base station on the basis of at least a part of information included in the at least one mirrored packet, and that displays the user terminal in a visual representation corresponding to the performance-related indicators of the user terminal in a location in a first visualization space that corresponds to the location of the user terminal.

According to a method for diagnosing network performance by a network performance diagnosis device according to the present disclosure, preemptive control (prevention) of signs of a problem with a 5G-based network service may be achieved by ensuring visibility and intuitiveness for an entire area of a 5G-related network service.

BRIEF DESCRIPTION OF THE DRAWINGS

FIG. 19 is a table illustrating an example of setting values for determining whether an alert associated with network performance in the packet mirroring device according to an embodiment of the present disclosure occurs.

DESCRIPTION OF EXEMPLARY EMBODIMENTS

Figure 1:
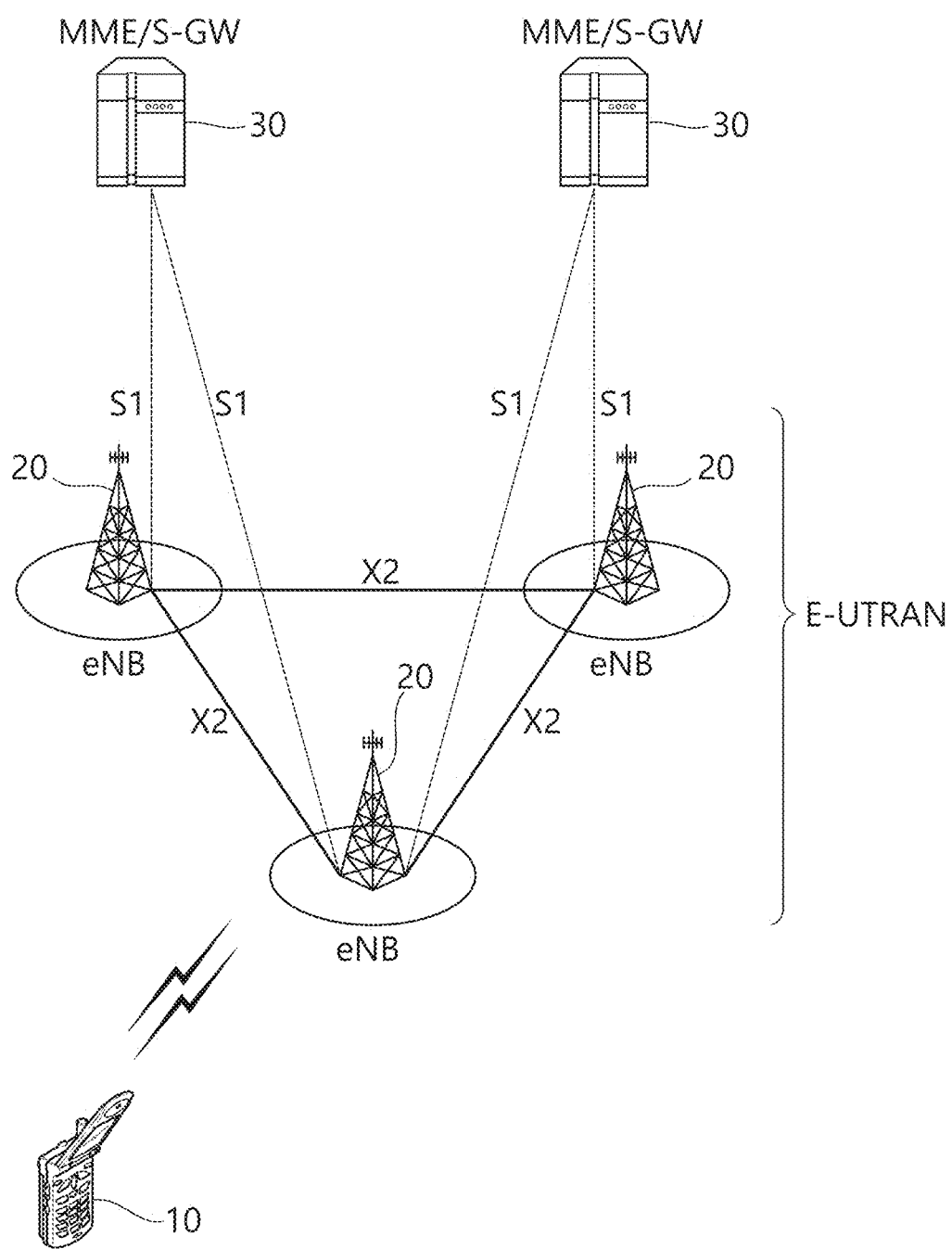
FIG. 1 is a conceptual diagram illustrating a wireless communication system to which the present disclosure is applied.

As the present disclosure allows for various changes and numerous embodiments, particular embodiments will be illustrated in the drawings and described in detail in the written description.

However, this is not intended to limit the present disclosure to particular modes of practice, and it is to be appreciated that all changes, equivalents, and replacements that do not depart from the spirit and technical scope of the present disclosure are encompassed in the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

When one element is described as being "connected" or "accessed" to another element, it shall be construed as being connected or accessed to another element directly but also as possibly having yet another element in between. On the other hand, if one element is described as being "directly connected" or "directly accessed" to another element, it shall be construed that there is no other element in between.

The terms used in the description are intended to describe embodiments only, and shall by no means be restrictive. Unless clearly used otherwise, expressions in a singular form include a meaning of a plural form. In the present description, expressions such as "comprise", "include", and "have" are intended to designate a characteristic, a number, a step, an operation, an element, a part, or combinations thereof, and shall not be construed to preclude any presence or possibility of one or more other characteristics, numbers, steps, operations, elements, parts, or combinations thereof.

Unless otherwise defined, all terms used herein have the same meaning as how they are generally understood by those of ordinary skill in the art to which the disclosure pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, exemplary embodiments of the present disclosure will be described in more detail with reference to the accompanying drawings. In describing the present disclosure, like elements on the drawings are denoted by like reference numerals, and redundant explanations of the same elements will be omitted.

Definitions of Terms

Throughout this specification, the term "entity" refers to various types of devices associated with a network, which include a user terminal (also referred to as "client terminal") and/or a server device.

A user basically means a user of a user terminal. However, in some cases, the user may mean a user of a packet mirroring device according to an embodiment of the present disclosure. A network administrator and/or a network manager is a person who manages a network related to the packet mirroring device.

A network performance diagnosis device which calculates performance-related indicators related to network performance may be called a packet mirroring device. Also, it may be implemented as a device for visualizing the performance-related indicators of a network service, and therefore may be called a network performance indicator visualization device.

Moreover, the term "network performance" may be used generally with respect to communication performance in servers, networks, and clients.

LTE and 5G-Based Communication System

FIG. 1 illustrates a wireless communication system to which the present disclosure is applied. This system may be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other via an X2 interface. The base station 20 is connected to an evolved packet core (EPC) 30 via an S1 interface, more specifically, to a mobility management entity (MME) via S1 MME and to a serving gateway (S-GW) via S1-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based on three lower layers of an open system interconnection (OSI) reference model which is widely known in a communication system, and, among them, a physical layer that belongs to the first layer provides an information transfer service using a physical channel and a radio resource control (RRC) layer positioned on the third layer serves to control radio resources between the UE and the network. For this, the RRC layer exchanges an RRC message between the UE and the base station.

Figure 2:
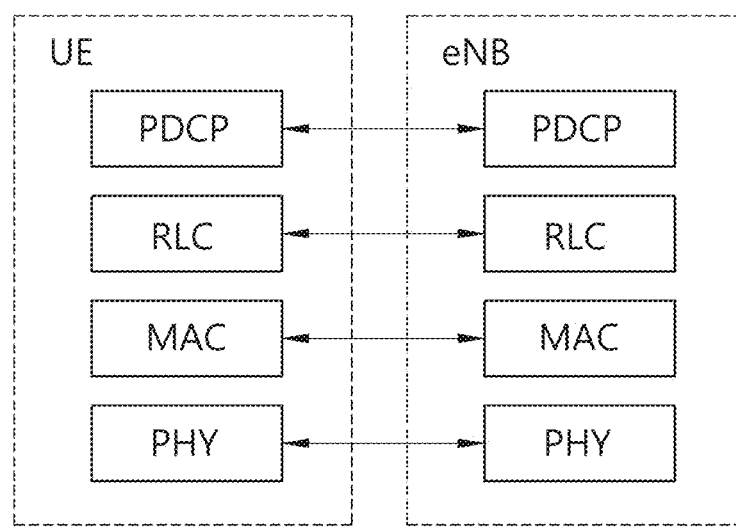
FIG. 2 is a block diagram showing a radio protocol architecture with respect to a user plane.
Figure 3:
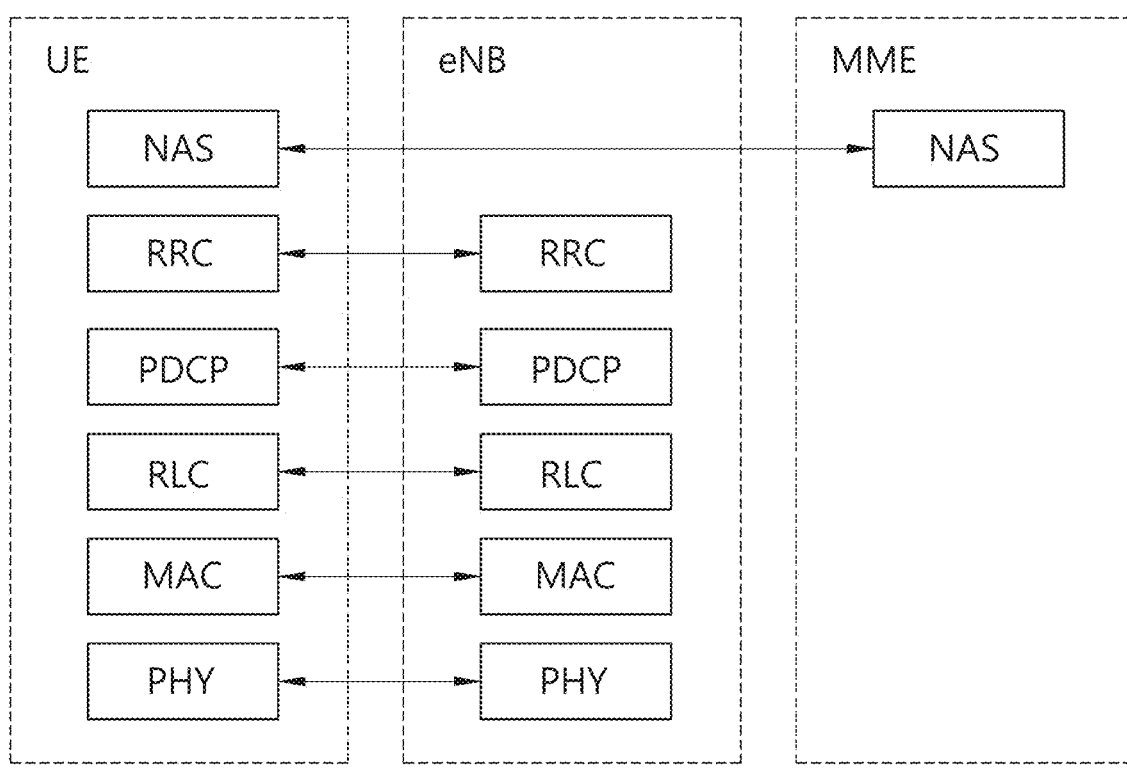
FIG. 3 is a block diagram showing a radio protocol architecture with respect to a control plane.

FIG. 2 is a block diagram showing a radio protocol architecture with respect to a user plane. FIG. 3 is a block diagram showing a radio protocol architecture with respect to a control plane. The user plane is a protocol stack for transmitting user data, and the control plane is a protocol stack for transmitting a control signal.

Referring to FIGS. 2 and 3, the physical layer provides an information transfer service to an upper layer by using a physical channel. The physical layer is connected to a medium access control (MAC) layer via a transport channel. Data is transferred between the MAC layer and the physical layer via the transport channel. Transport channels are classified depending on how and with what kind of characteristics data is transmitted through a radio interface.

Between different physical layers, namely, between physical layers of a transmitter and a receiver, data is transferred via the physical channel. The physical channel may be modulated according to an OFDM (Orthogonal Frequency Division Multiplexing) scheme, and time and frequency may be utilized as radio resources.

Functions of the MAC layer include mapping between a logical channel and a transport channel and multiplexing/demultiplexing an MAC SDU (service data unit) belonging to a logical channel into a transport block belonging to a physical channel via a transport channel. The MAC layer provides a service to an RLC (radio link control) layer through a logical channel.

Functions of the RLC layer include concatenation, segmentation, and reassembly of an RLC SDU. In order to guarantee various QoS (Quality of Service) required by a radio bearer (RB), the RLC layer provides three types of operation modes: a transparent mode (TM), an unacknowledged mode (UM), and an acknowledged mode (AM). An AM RLC provides an error correction through an ARQ (automatic repeat request).

The RRC (Radio Resource Control) layer is defined only in the control plane. The RRC layer handles controlling of a logical channel, a transport channel, and a physical channel in relation to configuration, re-configuration, and releasing of radio bearers (RBs).

A PDCP (Packet Data Convergence Protocol) layer in the user plane performs a transfer of a user data, header compression, and ciphering. Functions of the PDCP in the control plane include transfer of control plane data and ciphering/integrity protection.

Setting of an RF refers to defining characteristics of radio protocol layers and channels and configuring detailed parameters and operation methods to provide a particular service. RBs may be divided into two types: SRB (Signaling RB) and DRB (Data RB). The SRB is used as a passage for transmitting an RRC message on the control plane, and the DRB is used as a passage for transferring an RRC message on the user plane.

When there is an RRC connection between the RRC layer of the UE and the RRC layer of the E-UTRAN, the UE is in an RRC-connected mode, or otherwise, the UE is in an RRC idle mode.

Downlink transport channels for transmitting data from the network to the UE includes a BCH (Broadcast Channel) for transmitting system information and a DL-SCH (Downlink-Shared Channel) for transmitting user traffic or a control message. Traffic or a control message of a downlink multicast or broadcast service may be transmitted via the DL-SCH or an extra downlink MCH (Multicast Channel). Meanwhile, uplink transport channels for transmitting data from the UE to the network includes an RACH (Random Access Channel) for transmitting an initial control message and a UL-SCH (Uplink-Shared Channel) for transmitting user traffic or a control message.

Logical channels positioned at a higher level and mapped to a transport channel includes a BCCH (Broadcast Channel), a PCCH (Paging Control Channel), a CCCH (Common Control Channel), an MCCH (Multicast Control Channel), an MTCH (Multicast Traffic Channel), or the like.

A physical channel is comprised of several OFDM symbols in a time domain and several subcarriers in a frequency domain. A single subframe includes a plurality of OFDM symbols in the time domain. A resource bock is a resource allocation unit, which includes a plurality of OFDM symbols and a plurality of subcarriers. Each subframe may use particular subcarriers of particular OFDM symbols (e.g., first OFDM symbol) of a corresponding subframe for a PDCCH (Physical Downlink Control Channel), namely, for an L1/L2 control channel. A TTI (Transmission Time Interval) is a unit time of a subframe transmission.

Hereinafter, a new radio access technology (new RAT (NR)) (referred to as "5G") will be described.

As more and more communication devices demand larger communication capacity, there is a need for improved mobile broadband communication compared to existing radio access technology (RAT). Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed. In the present disclosure, this technology is called new RAT, NR (NEW RADIO), or 5G communication for convenience.

Figure 4:
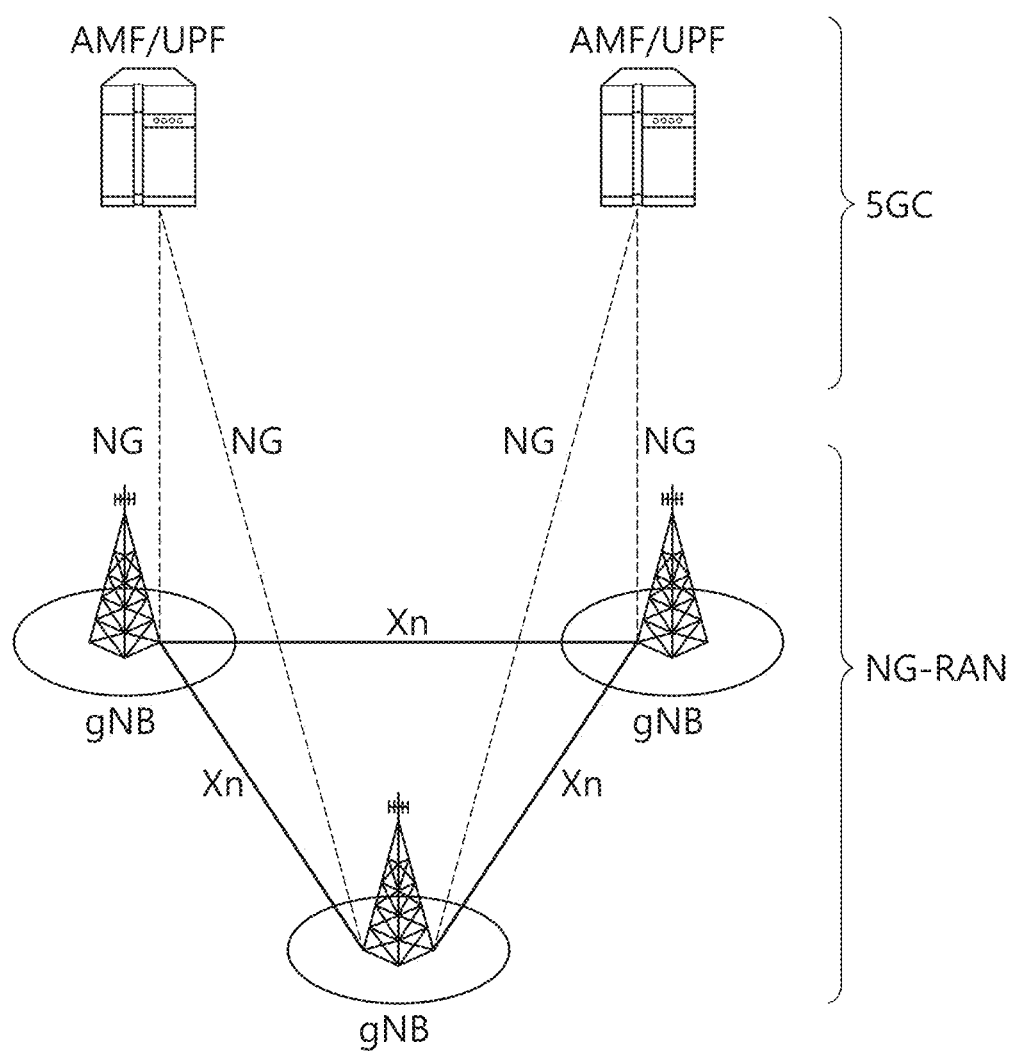
FIG. 4 is a conceptual diagram illustrating a system structure of a new generation radio access network (NG-RAN) system to which NR is applied.

FIG. 4 illustrates a system structure of a new generation radio access network (NG-RAN) system to which NR is applied.

Referring to FIG. 4, an NG-RAN may include a gNB and/or eNB providing a user plane and control plane protocol termination to a user. FIG. 4 illustrates a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
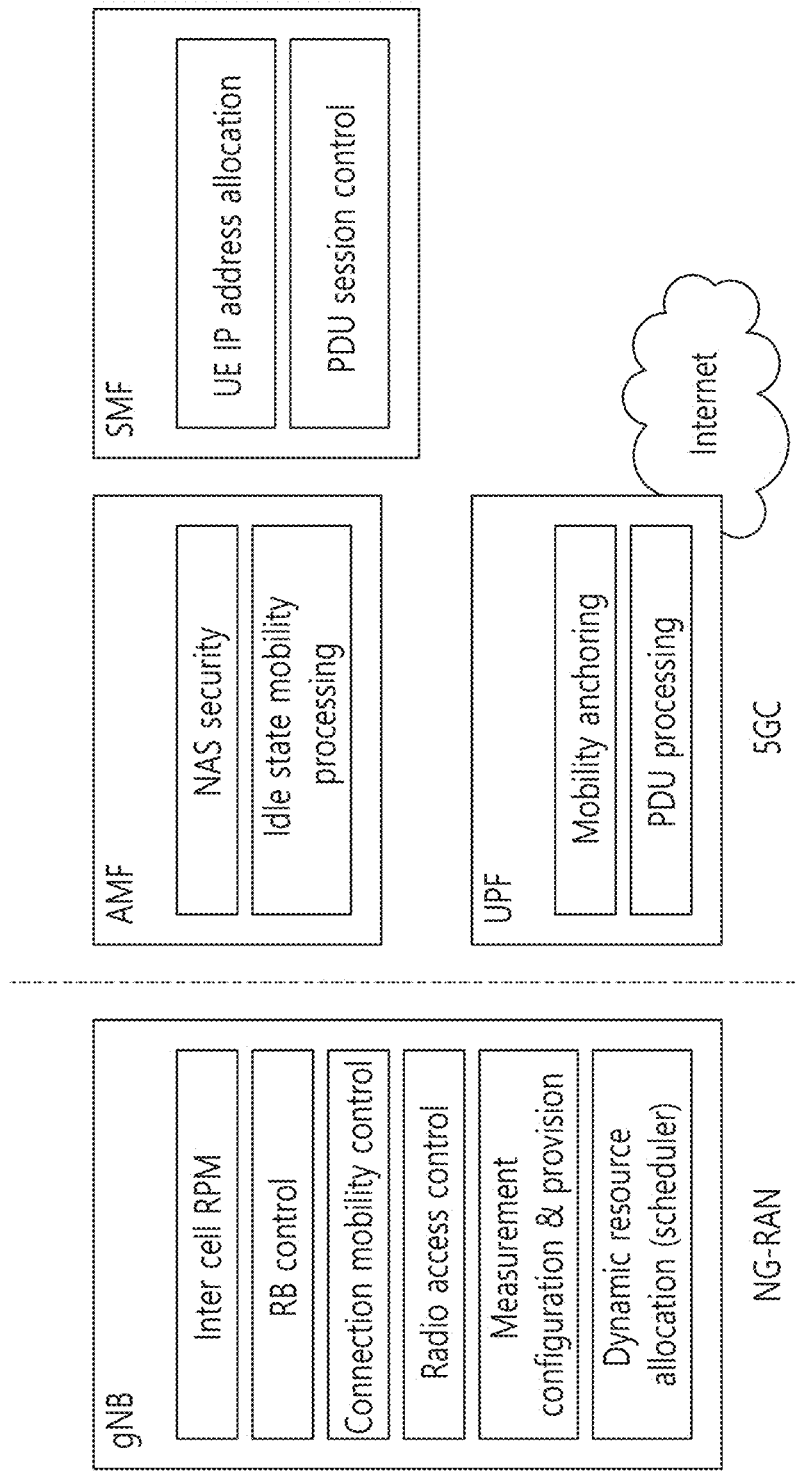
FIG. 5 is a block diagram illustrating a functional division between an NG-RAN and a 5GC.

FIG. 5 illustrates a functional division between an NG-RAN and a 5GC.

Referring to FIG. 5, the gNB may provide functions, such as Inter Cell Radio Resource Management (RRM), Radio Bearer (RB) control, Connection Mobility Control, Radio Access Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 6:
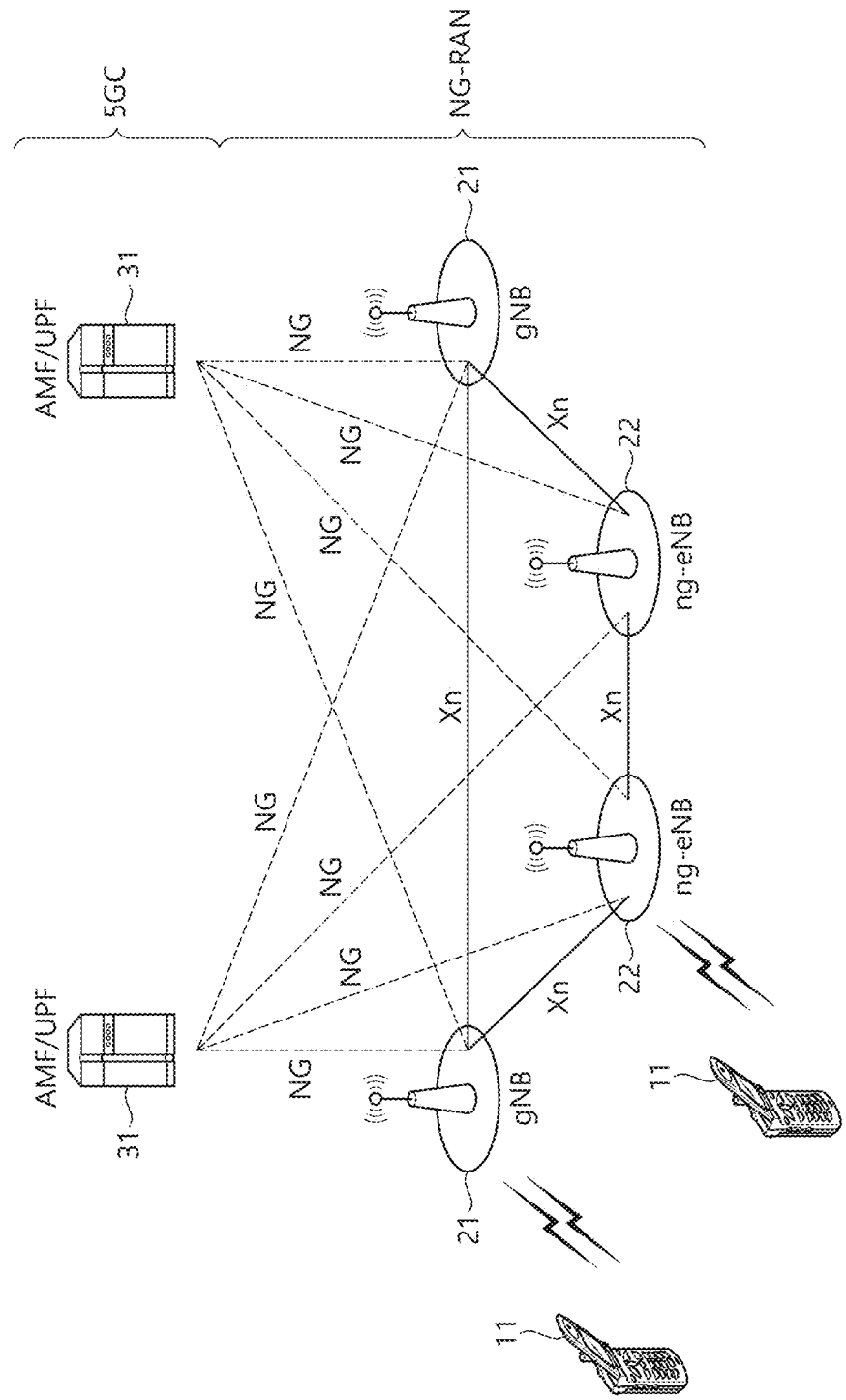
FIG. 6 is a view showing another example of a wireless communication system to which technical features of the present disclosure can be applied.

FIG. 6 is a view showing another example of a wireless communication system to which technical features of the present disclosure can be applied. Specifically, FIG. 6 depicts a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE.

In the following description, for NR, 3GPP TS 38 series (3GPP TS 38.211, 38.212, 38.213, 38.214, 38.331, etc.) can be referred to in order to facilitate understanding of the following description.

Referring to FIG. 6, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNB and ng-eNB are interconnected with each other via the Xn interface. The gNB and the ng-eNB are also connected via the NG interface to the 5GC, more specifically to the AMF via the NG-C interface and to the UPF via the NG-U interface.

Figure 7:
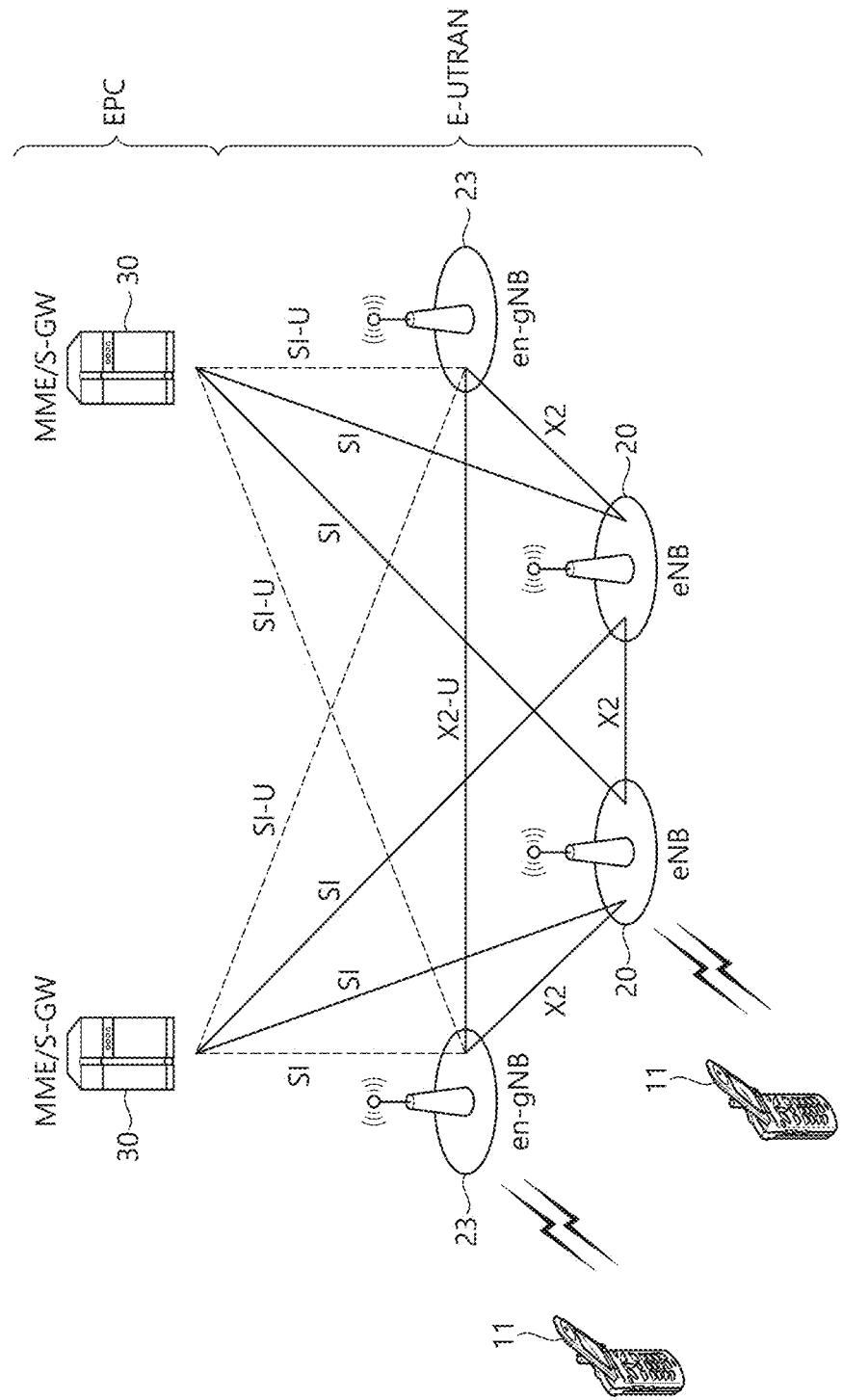
FIG. 7 is a view showing still another example of a wireless communication system to which technical features of the present disclosure can be applied.

FIG. 7 is a view showing still another example of a wireless communication system to which technical features of the present disclosure can be applied. Specifically, FIG. 7 depicts a system architecture based on an LTE system. The entity used in the NR may absorb some or all of the functions of the entities introduced in FIG. 4 (e.g., gNB, AME, UPF). The entity used in the NR system may be identified by the name "EN" for distinction from the NR.

Referring to FIG. 7, the wireless communication system includes one or more UEs 11, an E-UTRAN, and an EPC. The E-UTRAN consists of at least one E-UTRAN nodes. The E-UTRAN node is an entity corresponding to the BS 20 depicted in FIG. 1. The E-UTRAN node consists of at least one en-gNB 23 and/or at least one eNB 20. The en-gNB 23 provides NR user plane and control plane protocol terminations towards the UE 11. The eNB 20 provides E-UTRA user plane and control plane protocol terminations towards the UE 11.

The EPC includes an MME and a S-GW. The en-gNB and the eNB are interconnected with each other via the Xn interface. The en-gNB and the eNB are also connected via the S1 interface to the EPC, more specifically to the MME and/or S-GW via the S1-U and/or S1 interface.

Figure 8:
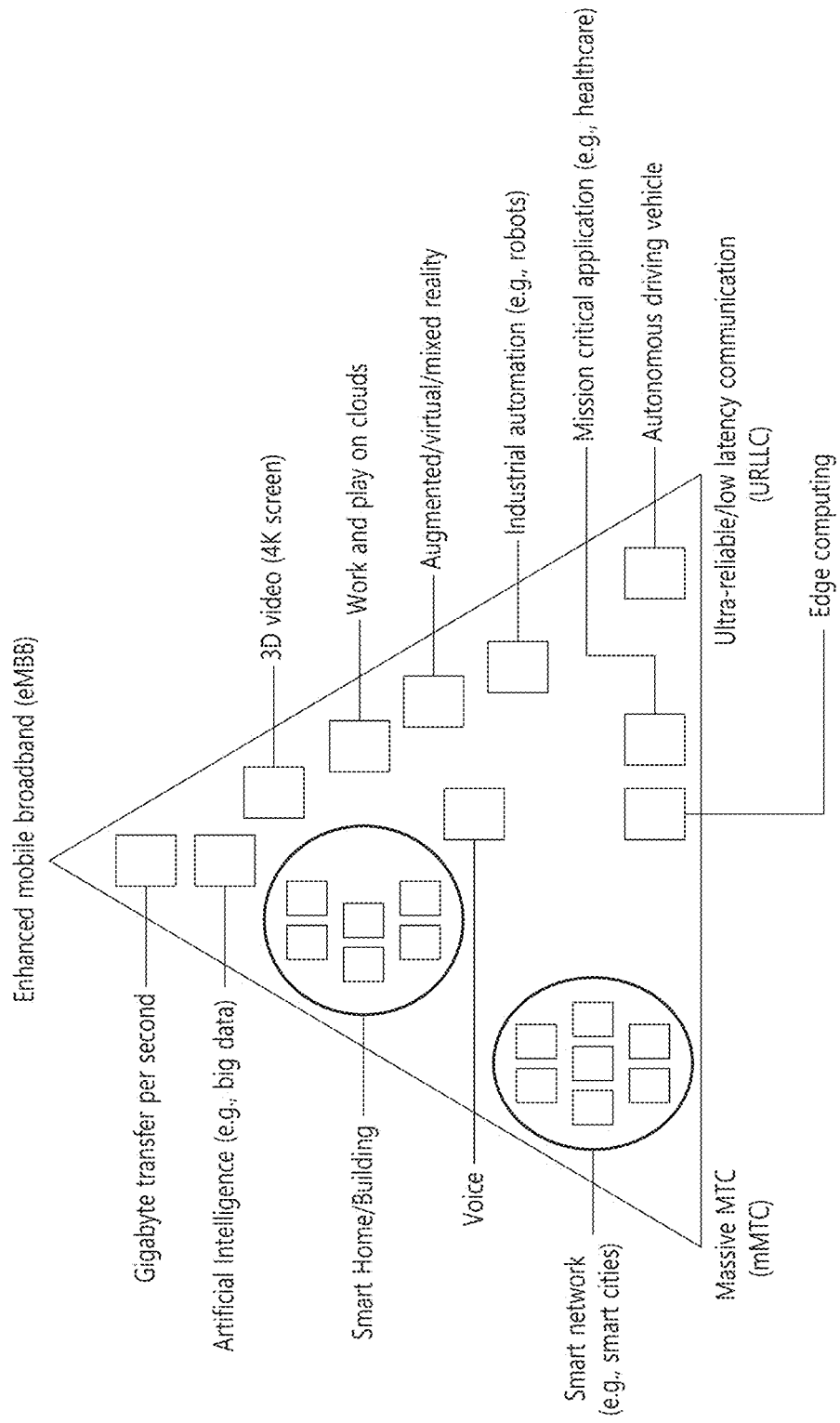
FIG. 8 is a view showing an example of a 5G usage scenario to which technical features of the present invention can be applied.

FIG. 8 is a view showing an example of a 5G usage scenario to which technical features of the present disclosure can be applied. The 5G usage scenario shown in FIG. 8 is exemplary only, and the technical features of the present disclosure are applicable to other 5G usage scenarios not shown in FIG. 8.

Referring to FIG. 8, the three major requirement areas of 5G include (1) an enhanced mobile broadband (eMBB) domain, (2) a massive machine type communication (mMTC) domain, and (3) an ultra-reliable and low latency communications (URLLC) domain. Some use examples may require multiple areas for optimization and other use examples may only focus on only one key performance indicator (KPI). 5G is to support these various use examples in a flexible and reliable way.

eMBB focuses on the overall improvement of data rate, latency, user density, capacity and coverage of mobile broadband connections. The eMBB aims at a throughput of about 10 Gbps. The eMBB far surpasses basic mobile Internet access and covers media and entertainment applications in rich interactive work, cloud or augmented reality. Data is one of the key drivers of 5G and may not be able to see dedicated voice services for the first time in the 5G era. In 5G, the voice is expected to be processed as an application simply using the data connection provided by the communication system. The main reason for the increased amount of traffic is an increase in the size of the content and an increase in the number of applications requiring high data rates. Streaming services (audio and video), interactive video and mobile Internet connections will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special example of driving up the growth of uplink data rates. 5G is also used for remote tasks on the cloud and requires much lower end-to-end latency to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use example is augmented reality and information retrieval for entertainment. Here, augmented reality requires very low latency and instantaneous data amount.

The mMTC is designed to enable communication between a large amount of low-cost devices powered by batteries and is intended to support applications such as smart metering, logistics, field and body sensors. The mMTC is aimed at a 10-year battery and/or a million devices per square kilometer. The mMTC allows smooth connection of embedded sensors in all areas and is one of the most widely used 5G applications. Potentially by 2020, IoT devices are expected to reach 20.4 billion. Industry IoT is one of the areas where 5G plays a key role in enabling smart cities, asset tracking, smart utilities, agriculture, and security infrastructures.

URLLC is ideal for automotive communications, industrial control, factory automation, remote surgery, smart grid and public safety applications by allowing devices and machines to communicate with high reliability, very low latency and high availability. The URLLC aims at a latency of about 1 ms. The URLLC includes new services that will change the industry through remote control of key infrastructures and ultra-trusted/low latency links such as autonomous driving vehicles. The level of reliability and latency is essential for smart grid control, industrial automation, robotics, drone control, and coordination.

Next, a plurality of use examples included in the triangle of FIG. 8 will be described in more detail.

5G is a means to provide streams evaluated as hundreds of megabits per second and gigabits per second and may complement fiber-to-the-home (FTTH) and cable-based broadband (or DOCSIS). This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize latency.

Automotive is expected to become an important new driver for 5G, with many use examples for mobile communications to vehicles. For example, entertainment for passengers demands high capacity and high mobile broadband at the same time. This is because future users will continue to expect high-quality connections regardless of their location and speed. Another use example in the automotive sector is an augmented reality dashboard. The driver can identify an object in the dark on top of what is being viewed through the front window through the augmented reality dash board. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that the driver can drive more safely, thereby reducing the risk of accidents. The next step would be a remote control vehicle or an autonomous driving vehicle. This is very reliable and requires very fast communication between different autonomous driving vehicles and/or between cars and infrastructures. In the future, an autonomous driving vehicle will perform all driving activities, and the driver will focus only on unusual traffic situations that the vehicle itself cannot identify. The technical requirements of autonomous driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each assumption. Temperature sensors, windows and heating controllers, burglar alarms and appliances are all wirelessly connected. Many of these sensors typically require low data rates, low power and low cost. However, for example, real-time HD video may be required for certain types of devices for monitoring.

<Artificial Intelligence (AI)>

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an indicator for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to estimate when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

<Robot>

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields.

A robot may include an actuator or a driver including a motor to perform various physical operations, such as moving a robot joint. In addition, a movable robot may include a wheel, a brake, a propeller, and the like in a driver to run on the ground or fly in the air through the driver.

<Self-Driving or Autonomous Driving>

Autonomous driving refers to a technique of self-driving, and an autonomous vehicle refers to a vehicle that travels without a user's operation or with a user's minimum operation of a user.

For example, autonomous driving may include a technique for maintaining a lane while driving, a technique for automatically adjusting speed, such as adaptive cruise control, a technique for automatically traveling along a predetermined route, and a technique for traveling by automatically setting a route when a destination is set.

A vehicle may include a vehicle having only an internal combustion engine, a hybrid vehicle having both an internal combustion engine and an electric motor, and an electric vehicle having only an electric motor, and may include not only an automobile but also a train, a motorcycle, and the like.

An autonomous vehicle can be regarded as a robot having an autonomous driving function.

<Extended Reality (XR)>

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a cellular phone, a tablet PC, a laptop computer, a desktop computer, a TV, digital signage, and the like. A device to which XR technology is applied may be referred to as an XR device.

Figure 9:
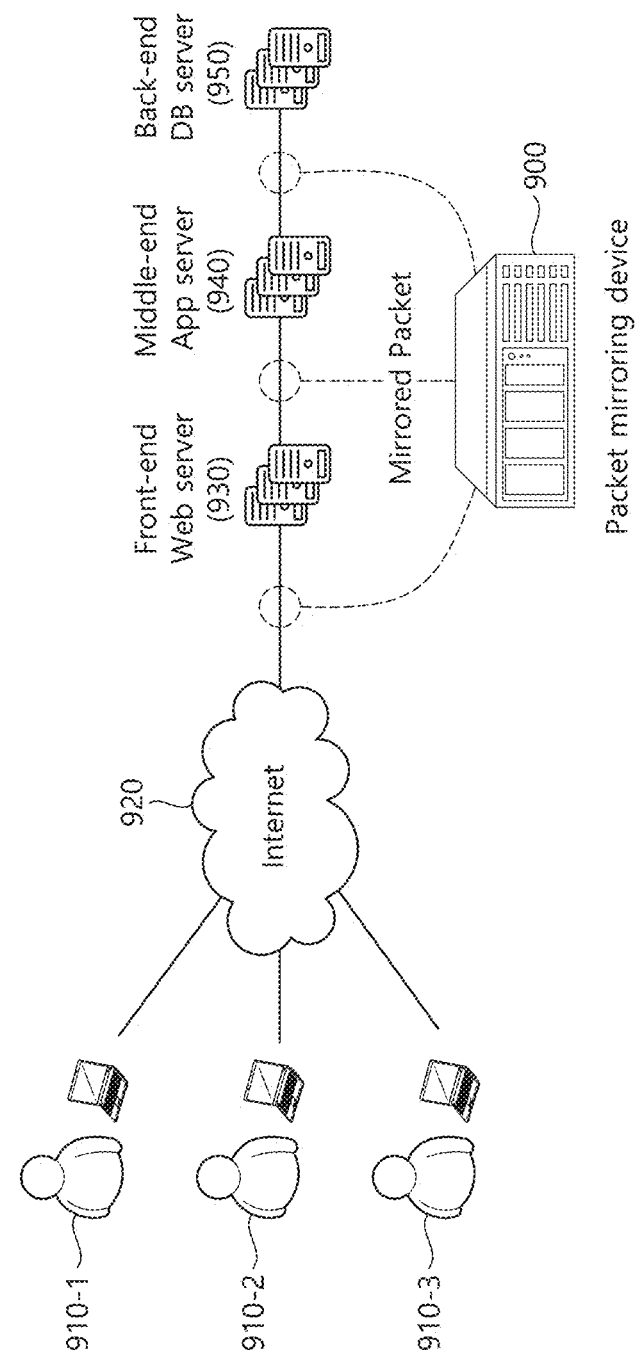
FIG. 9 is a conceptual diagram showing a system comprising a packet mirroring device according to an embodiment of the present disclosure.

Calculation of Network Performance Indicators According to Packet Mirroring and Packet Analysis FIG. 9 is a conceptual diagram showing a system comprising a packet mirroring device according to an embodiment of the present disclosure. As illustrated in FIG. 9, the packet mirroring system according to an embodiment of the present disclosure may include user terminals 910-1 to 910-3 (identical to the UE in the previous drawings), a network 920, server stages 930 to 950, and a packet mirroring device 900.

Referring to FIG. 9, the user terminals 910-1 to 910-3 access a specific web site and/or web application over the network 920. Here, the user terminals 910-1 to 910-3 may be a portable terminal on a 5G network, a robot, an IoT device (e.g., sensor), and so on. In this case, the access is performed in the server stages 930 to 950 associated with the web site and/or the web application.

According to the embodiment of FIG. 9, the user terminals 910-1 to 910-3 access a specific web page through a web browser and request the execution of a desired page or application. The request may include the execution of multimedia content, such as a moving image and audio, and/or other applications in addition to static content such as a html document.

According to an embodiment of the present disclosure, the user terminals 910-1 to 910-3 are operated by a user, and may include a given device having a communication function (including Internet access and a web browser execution function) and a data processing function. The user terminals 910-1 to 910-3 may be denoted as a mobile station (MS), a user equipment (UE), a user terminal (UT), a wireless terminal, an access terminal (AT), a terminal, a fixed or mobile subscriber unit, a subscriber station (SS), a cellular telephone, a wireless device, a wireless communication device, a wireless transmit/receive unit (WTRU), a mobile node, a mobile, a mobile station, a personal digital assistant (PDA), a smartphone, a laptop, a netbook, a personal computer, a wireless sensor, a consumer electronic device (CE), an Internet of things (IoT) device, or other terms. Various embodiments of the user terminals 910-1 to 910-3 may include a cellular phone, a smartphone having a wireless communication function, a personal digital assistant (PDA) having a wireless communication function, a wireless modem, a portable computer having a wireless communication function, a photographing device such as a digital camera having a portable wireless communication function, a gaming device having a wireless communication function, music storage and playback home appliances having a wireless communication function, Internet home appliances capable of wireless Internet access and browsing, and portable units or terminals in which combinations of such functions are integrated, but the present disclosure is not limited thereto.

Each of the user terminals 910-1 to 910-3 may include a user communication interface, including input devices, such as a mouse and a keyboard for receiving a user input, and a display for providing a control user interface that enables a user to interact with networked devices. The user interface may include a graphical user interface (GUI) in order to provide a user with information.

The network 920 includes a wired and/or wireless network. The network 920 may include the Internet, and may include a 5G SA (standalone) system or a 5G NSA (non-standalone) and/or a 4G system. The network 920 may include a serial bus that provides a physical layer (medium) for the transmission and reception of data between variously accessed user terminals 910-1 to 910-3 and server stages 930 to 950. In this case, the serial bus may include 1394 serial bus. The 1394 serial bus may support both a time-multiplexed audio/video (A/V) stream and standard Internet Protocol (IP) communication (e.g., IETF REC 2734), but the present disclosure is not essentially limited thereto. The network 920 may also include a non-1394 network (e.g., Ethernet). Furthermore, the network 920 may include a home network. Each of the user terminals 910-1 to 910-3 may communicate with one or more server devices 930 to 950 over the network 920.

The server stages 930 to 950 respond to requests from users by using resources of the network 920 in order to provide the users with services. The server stages 930 to

950, although expressed as such, do not necessarily need to be a server related to a particular website. They may be one server device. In this specification, the term "server" may refer to another entity communicating with a specific user terminal 910-1 to 910-3, a target entity the user terminal 910-1 to 910-3 requests to communicate with, a controller device (a central controller for controlling a robot or an IoT device), and/or a base station (eNB, gNB, etc.).

The server stages 930 to 950 execute the return of information (data) in response to a request from the user terminals 910-1 to 910-3. Furthermore, the response includes the return of performance and state of a function (e.g., mechanical function), the return of a data stream and state, the return of the accommodation and state of a data stream, or the storage of a state for various actions. The server stages 930 to 950 may include an ordered, embedded, or control program in order to implement control of their own hardware.

The server stages 930 to 950 may be associated with a specific web site and/or web application, and perform an operation and management related to a task performed in each web site and/or web application. The server stages 930 to 950 may interact with the user terminals 910-1 to 910-3 and other servers 930 to 950. Exemplary services may include MPEG sourcing/sinking and a display service.

The server stages 930 to 950 may process information, such as interface data (e.g., HTML, XML, Java, JavaScript, GIF, JPEG, MPEG, a graphic file, or another given format used for an intended purpose) that provides an interface for a command and control for a device through the network 920. In a specific embodiment, each of the servers 930 to 950 may process information, such as one or more hypertext markup languages (HTMLs) providing a command and control for a corresponding device. The server stages 930 to 950 use an Internet standard indicative of a HTML page by using a browser scheme.

According to an embodiment of the present disclosure, the server stages 930 to 950 may include a web server 930, an app server 940, and a database (DB) server 950. However, the server stages do not need to be essentially composed of only a combination of the three servers. Only the web server 930 may be present but the app server 940 and the database server 950 may not be present. Alternatively, only one app server 940 may be configured. Other various forms and a server combination of layers are also possible.

The web server 930 is a server that provides requested content to a web client. The web server 930 may provide a web browser with static HTML or an image, such as JPEG or GIF, through a HTTP protocol. According to circumstances, the web server 930 may also include a container capable of operating an internal application therein.

The app server 940 may also be called a web application server (WAS) server, which indicates a middleware software server that provides transaction processing and management and an application execution environment in a client/server environment. Typically, the server stages 930 to 950 may be constructed as a three-layer web computing environment of a web server, an application server, and a database. In this case, the app server 940 plays a role as an application server of the client/server environment. The app server 940 provides an application execution environment and a database access function, manages transactions, performs business logic for processing a task, and performs an application association between other types of systems, etc.

According to an embodiment of the present disclosure, an effective distribution may be induced through a function classification of the web server 930 and the WAS 940. Static data may be processed by the web server 930 present at the front end in structure, and dynamic data may be processed by the WAS 940 behind the web server 930. For example, an HTML and JavaScript file, CSS, an image, etc., that is, static data, are located and processed by the web server 930 at the front end in response to a request from a user so that a service request is not transmitted to the WAS 940. Furthermore, a web application service is handed over to the WAS 940 located behind the web server 930, so that the WAS 940 can concentrate on the execution of a web application. A method of processing a thing to be processed by the web server 930 and a thing to be handed over to the WAS 940 may be processed through a configuration of the web server 930. Whether to hand a specific extension or a directory task to the WAS 940 is processed by the web server 930.

The database server 950 is a repository in which various data handled by the web server 930 and/or the app server 940 is stored. The database server 950 may store a task processed by the web server 930 and/or the app server 940, a web site, a large amount of data associated with a web application depending on the properties of the web application. The large amount of data may include personal information, institution information, data associated with various types of content (e.g., multimedia content), etc.

The packet mirroring device 900 may be disposed in at least one of spaces between the network 920 and the web server 930, between the web server 930 and the app server 940, and between the app server 940 and the database server 950. The packet mirroring device 900 is connected to a switching device (not illustrated) disposed in at least one of the spaces between the network 920 and the web server 930, between the web server 930 and the app server 940, and between the app server 940 and the database server 950, and diagnoses performance of a network service based on a packet mirrored from packets transmitted and received between two entities. According to the embodiment of the present disclosure, since the mirrored packet may be generated by duplication based on packets (actually used user traffic) that are actually transmitted and received, a separate artificial test packet does not need to be generated in order to diagnose performance of a network service. In particular, the packet mirroring device 900 may monitor all packets in real time.

The packet mirroring device 900 calculates various indicators of the performance of a network service in real time based on various information (e.g., a source ID, a destination ID and time information) included in a mirrored packet. The calculation of the indicator may be performed in a transaction unit. The calculated indicator may be more than 120 types, which are more specifically described with reference to FIG. 12. The packet mirroring device 900 determines whether a problem, such as speed delay, waiting delay, exceeding traffic, or the occurrence of an error, in what section for each section based on calculated indicators, and visualizes a result of the determination so that an operator or manager can check the result. That is, the packet mirroring device 900 enables an error section to be rapidly checked, and enables measures against the error section to be rapidly performed based on the check.

Moreover, the packet mirroring device 900 may track approach (related to a security issue) from a malicious user by analyzing a mirrored packet, and enables measures therefor to be performed in real time.

According to the embodiment of the present disclosure, the packet mirroring device 900 may not require the installation of an agent that substantially gives a burden on the server stages 930 to 950 because it is connected to the switching device. That is, the packet mirroring device 900 does not give a burden, such as slowing a task speed of the server stages 930 to 950. However, the packet mirroring device 900 of the present disclosure does not need to be configured as hardware and may be installed and operated in the switching device or another device as software.

Figure 10:
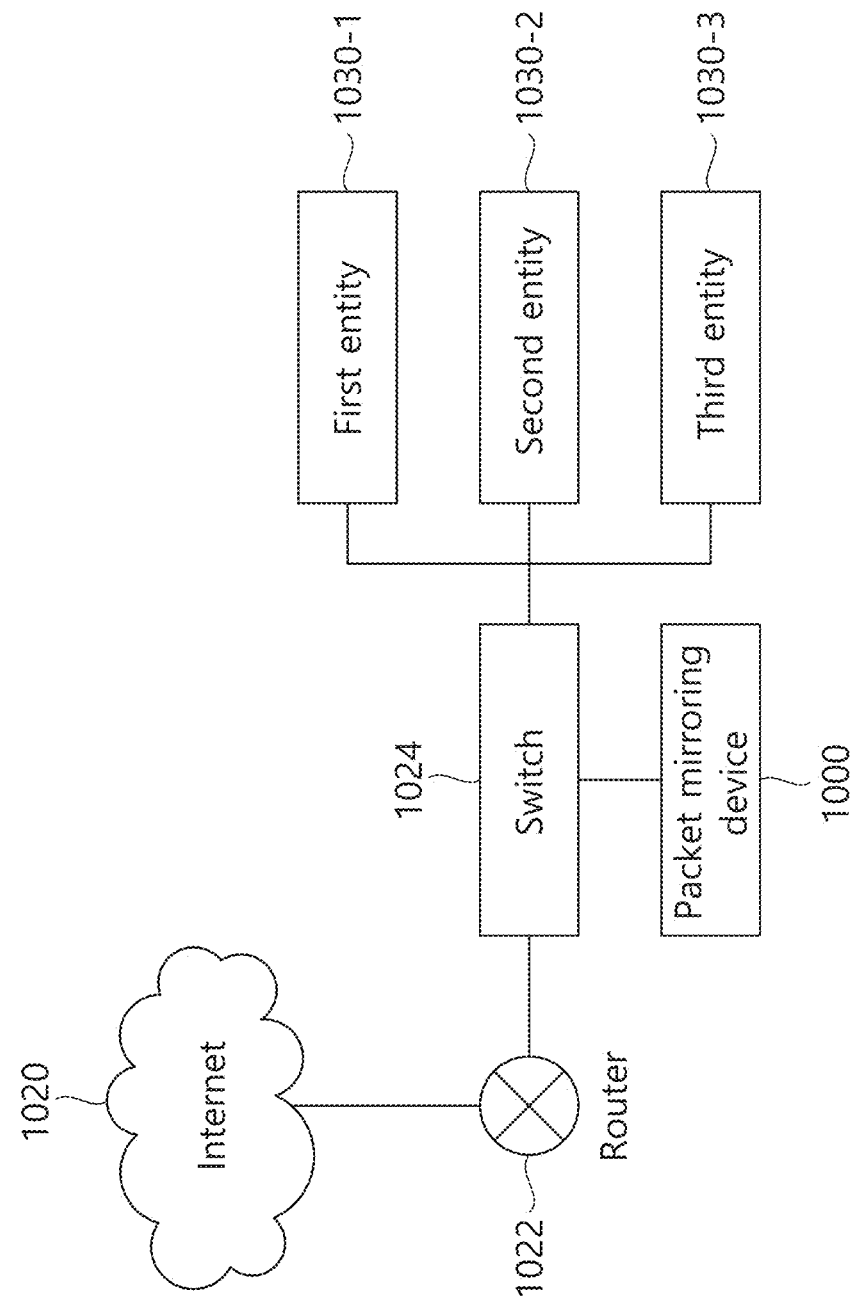
FIG. 10 is a block diagram illustrating a connection configuration between the packet mirroring device and another device of a network according to an embodiment of the present disclosure.

FIG. 10 is a block diagram illustrating a connection configuration between the packet mirroring device and another device of a network according to an embodiment of the present disclosure.

Referring to FIG. 10, a router 1022 is connected to a network, such as the Internet 1120. The router 1022 is connected to a switch 1024, transmits a request from a user terminal (not illustrated) to servers 1030-1 to 1030-3 related to the request, and transmits, to the user terminal, information related to a response to the request from the first to third entities 1030-1 to 1030-3. The first to third entities 1030-1 to 1030-3 may be different servers. Or else, the first to third entities 1030-1 to 1030-3 may be different user terminals when viewed from a client side, and, since a packet for communication between the user terminals passes through the switch 1024, the packet mirroring device 1000 may analyze packet-related information by mirroring the packet.

The router 1022 or a sharer (not illustrated) having a routing function extracts a location and receiving address of a packet transmitted by the user terminal through the Internet 1120, designates an optimal path for the location, and turns a data packet to the switch 1024 according to the path. The router 1022 identifies an IP address and forwards data to the switch 1024.

If the first to third entities are servers, the switch 1024 stores a unique MAC address of each of the servers 1030-1 to 1030-3, determines to which place a packet needs to be transmitted through address, and transmits, to corresponding servers 1030-1 to 1030-3, a packet provided by the router 1022. The switch 1024 includes a switch playing a role as an OSI 2 layer, an OSI 3 layer, an OSI 4 layer, and/or another layer (e.g., OSI 7 layer). For example, the switch may perform a function for setting up a path. Furthermore, the switch may perform functions, such as load balancing, port forwarding, and QoS. The switch 1024 may be called a network switch, a switching hub, or a port switching hub.

The packet mirroring device 1000 is connected to the switch 1024, and obtains almost all packets provided to the servers 1030-1 to 1030-3 through the switch 1024 by mirroring the packets. Packet mirroring, that is, the duplication or capture of a packet may be performed in the switch 1024. According to circumstances, packet mirroring may be performed in the packet mirroring device 1000 itself. After duplicating a packet provided to the servers 1030-1 to 1030-3, the switch 1024 may set, as a destination port, a port connected to the packet mirroring device 1000, and may provide the duplicated packet to the packet mirroring device 1000. In this case, the switch may designate a corresponding port for analysis use, and may provide the packet to the port.

Figure 11:
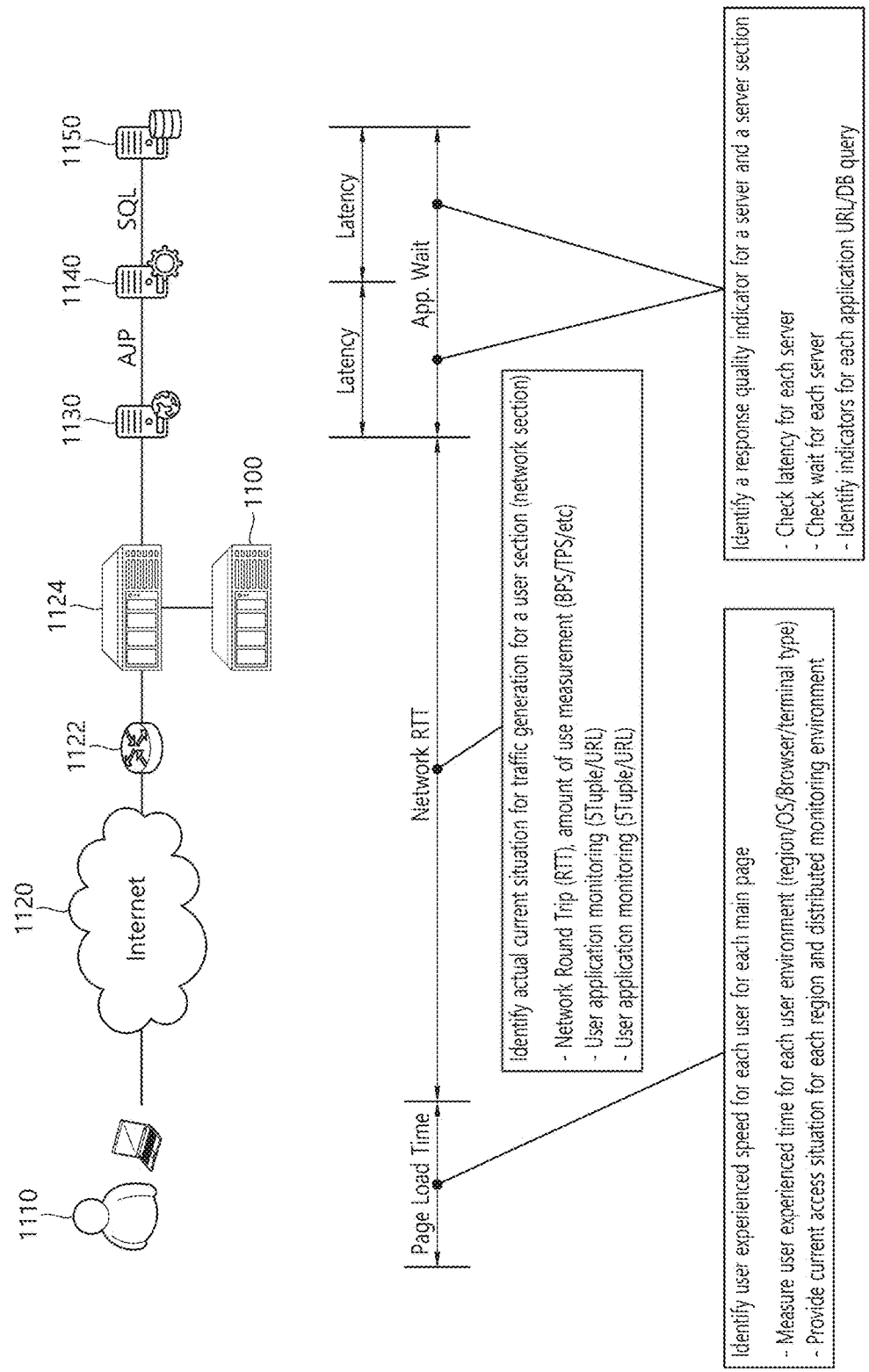
FIG. 11 is a conceptual diagram for describing an operation for each section of the packet mirroring device according to an embodiment of the present disclosure.

FIG. 11 is a conceptual diagram for describing an operation for each section of the packet mirroring device according to an embodiment of the present disclosure.

Referring to FIG. 11, as described with reference to FIGS. 9 and 10, a user terminal 1110 transmits packets to server stages 1130, 1140, and 1150 through the Internet 1120. In this case, a router 1122 and a switch 1124 are present between the Internet 1120 and the server 1130. A packet mirroring device 1100 is connected to the switch 1124.

The packet mirroring device 1100 may check the delay time the user experiences in the user terminal 1110 by analyzing a mirrored packet. Furthermore, the packet mirroring device 1100 may check information associated with traffic up to the first server 1130 through the Internet 1120, and may also check latency in the server stages 1130, 1140, and 1150. In particular, latency in the server stages 1130, 1140, and 1150 is determined for each section. Latency in the section of the web server 1130 and the WAS 1140 and the section of the WAS 1140 and the database server 1150 is separately calculated and treated. Web latency and app latency may be separately calculated. In this case, the web latency indicates the delay time it takes for a static URL (an image (gif, png, jpg, etc.), css, js, text, etc.) to receive data from the web server 1130. The app latency means the delay time it takes for the first packet of a page generated from a dynamic URL or a post URL to be received. The app latency may be associated with dynamic content including a query parameter, dynamic content (page), such as HTML, ASP, JSP, or PHP, and/or a call using a HTTP POST method. That is, the app latency indicates latency associated with a task returned via the WAS server 1140 and/or the database server 1150.

First, in the user terminal 1110, the speed the user experience is checked as a page loading time. The speed the user experience is analyzed and visualized as a speed each user experiences with respect to each major web page. That is, if there are multiple users accessing a specific web page, the time the user experiences may be checked for each user environment and/or each area of the multiple users. The user environment may be differently checked for each area, each OS installed in the user terminal, type of a web browser, and each type of a terminal. Furthermore, an access situation for each area and distribution monitoring environment may be provided. In this case, the access situation for each area may be divided and provided as a present global area situation that aims at the entire world and a present local area situation that aims at a local area.

An actual traffic occurrence situation for a user section (network section) up to the server 1130 may be represented as a network round trip time (RTT). The actual traffic occurrence situation may be called a network time required. In addition, in relation to usage, present situations for bit per second (BPS) information indicative of a data transfer speed per second, user per second (UPS) information indicative of the number of users connected per second, connection per second (CPS) information indicative of the number of new sessions connected per second, and transaction per second (TPS) information indicative of the number of transactions occurring per second may also be checked. Furthermore, a user application may be monitored, and an abnormal action by a user may also be analyzed and tracked. Through these performance-related indicators, an application that occupies network traffic may be recognized and a correlation among a user, an application, and a network may be monitored, through such performance-related indicators.

Additionally, the packet mirroring device 1100 may also check the delay time between the servers 1130, 1140, and 1150. That is, the packet mirroring device 1100 may check a response quality indicator for each server section. In this case, the packet mirroring device 100 may check the delay time for each server, the number of response wait sessions for each server, and an indicator for each application URI, and/or an indicator for each query (DB query) of a DB server.

Figure 12:
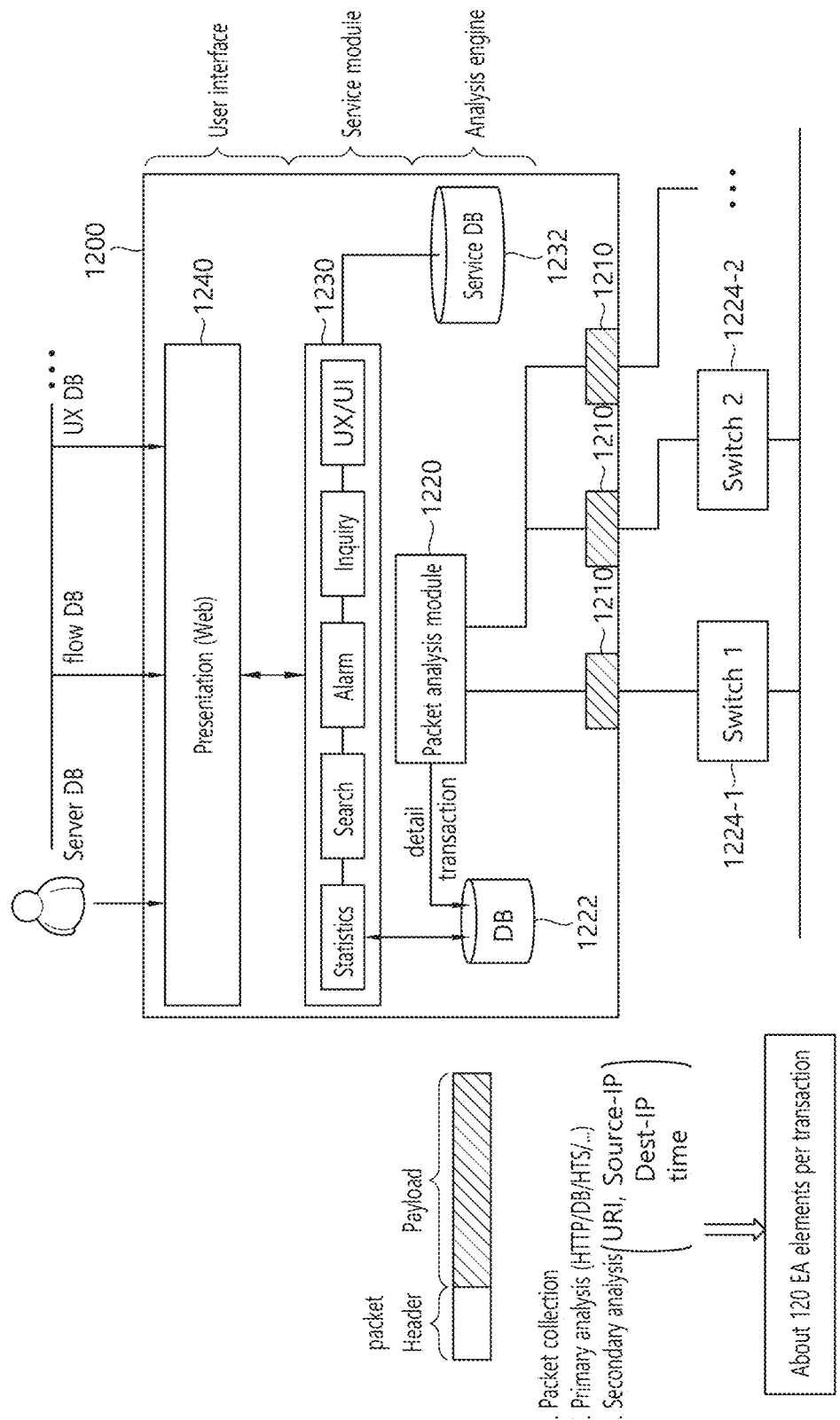
FIG. 12 is a block diagram specifically illustrating the packet mirroring device according to an embodiment of the present disclosure.

FIG. 12 is a block diagram specifically illustrating the packet mirroring device according to an embodiment of the present disclosure. As illustrated in FIG. 12, the packet mirroring device 1200 according to an embodiment of the present disclosure may include a port 1210, a packet analysis module 1220, a service module 1230, and a user interface 1240. Furthermore, the packet mirroring device 1200 may further include a packet analysis database 1222 and a service database 1232.

Referring to FIG. 12, at least one port 1210 may be provided, and is connected to switch devices 1224-1, 1224-2, . . . . One port may be connected to one switch device. The connected ports receive mirrored packet information from the switch devices 1224-1, 1224-2, . . . and transmit the mirrored packet to the packet analysis module 1220.

The packet analysis module 1220 collects a mirrored packet and substantially analyzes the packet, and may be called an analysis engine. The packet analysis module 1220 primarily analyzes the header of the packet in the mirrored packet, and identifies whether the mirrored packet is a HTTP packet, a packet associated with a DB or a packet associated with a TCP through the analysis. That is, the packet analysis module 1220 determines with which protocol the mirrored packet is associated. Accordingly, the packet analysis module 1220 may check to which server request information, such as "GET/web address/HTTP/1.1" has been transmitted. The packet analysis module 1220 analyzes a sentence structure by parsing such packet header information. "GET" is a request message, and the "web address" indicates a web address associated with the request. Furthermore, "HTTP/1.1" means HTTP 1.1 version. In addition, the packet analysis module 1220 may also identify and store language information (e.g., ko-kr) associated with the packet. In a request method, in addition to GET, POST, HEAD, PUT, DELETE, etc. may be transmitted according to circumstances. The packet analysis module 1220 stores such information along with time information and a related IP.

The packet analysis module 1220 assigns the indicator of each packet, and identifies what the packet is, whether the packet is a HTTP-based request packet, that is, a corresponding packet, or a response packet thereto based on the assigned indicator. In this case, the packet analysis module 1220 may also perform a comparison and analysis with information obtained from packets in the past. That is, if a request packet obtained from a first entity is present, a response packet thereto from a second entity may be subsequently present. In this case, the establishment of one session and flows of transactions may be analyzed based on at least two time-series packets and packets transmitted to and received from the first entity and the second entity.

Furthermore, the packet analysis module 1220 may parse what browser has been used by a client terminal, information associated with HOST, previous URL address information, and browser support language information. In this case, the packet analysis module 1220 may analyze that a header is which type of header (general header, request header or entity header), and may parse information indicating the boundary line of the header and payload.

Thereafter, the packet analysis module 1220 secondarily analyzes a uniform resource locator (URL) (or uniform resource identifier (URI)), source IP (Source ip), destination IP (Dest ip) and time information of the mirrored packet. In this case, whether the packet is a packet for redirection to which address, like https://www.google.co.kr/?gws_rd=ssl, may be checked by identifying a URL value. Furthermore, the source IP may indicate the IP address of a user terminal, and the destination IP may indicate the IP of a server associated with the final destination site of a request. In the case of a response packet, they may indicate opposite information. The time information may be provided in a timestamp form. In addition, length information of the entire packet may be checked.

The packet analysis module 1120 includes a packet analysis algorithm corresponding to each protocol, for example, various protocols such as HTTP, IP, UDP, TCP, and DNS, may adaptively extract a URL, a source IP, a destination IP, and time information from a packet based on each protocol, and may use them for analysis.

The packet analysis module 1120 may generate performance indicator information of about 120 elements per transaction based on packet-related information extracted through secondary analysis as described above. Preferably, the packet analysis module 1120 analyzes 6,000 transactions per second. Thereafter, the packet analysis module 1120 stores the extracted packet-related information and the about 120-performance indicator information generated per transaction in the database 1222. Hereinafter, performance-related indicators generated based on packet-related information of a mirrored packet is more specifically described.

The packet analysis module 1220 calculates RTT information in a transaction unit. That is, the packet analysis module 1220 calculates RTT information of a data signal. An algorithm related to the calculation of the RTT information is more specifically described below with reference to FIGS. 14*a* and 14*b*.

Furthermore, the packet analysis module 1220 generates session information. The session information may indicate the number of sockets established per second, that is, the number of sockets connected without being disconnected. Furthermore, the packet analysis module 1220 calculates latency information taken for a client to receive a response from a specific server after transmitting a request. This may be considered to be latency time it takes to query a database, execute an application, or perform other tasks. Contrariwise, from the point of view of the server toward the user terminal, the time it takes before the server receives a response from a specific user terminal after sending a request may be calculated as latency time.

The packet analysis module 1220 calculates BPS information indicative of the size of a bit transmitted or received per second, packet per second (PPS) information indicative of information on the number of packets transmitted or received per second, and UPS information indicative of the number of users (based on IP) connected per second. How many users are connected per second may be calculated based on the number of source IPs connected to a specific destination IP. In addition, the packet analysis module 1220 calculates CPS information (indicating how many sessions are newly connected per second) indicative of the number of new sessions connected per second, and TPS information (indicating how many transactions occur per second) indicative of the number of transactions occurring per second. Furthermore, the packet analysis module 1220 calculates hit per second (HPS) information indicative of the number of URLs requested per second. In this case, the packet analysis module 1220 calculates HPS based on how many URLs are requested per second in a corresponding server in the case of a server HPS, and calculates HPS based on how many URLs are requested per second in a corresponding client in the case of a client HPS. Furthermore, the packet analysis module 1220 calculates server per second (SPS) information, that is, information on the number of servers connected per second. The SPS information indicates to how many servers a client is connected per second.

In addition, the packet analysis module 1220 calculates wait information indicative of the number of response wait sessions. The wait information is the number of sessions in the state in which a client has not received a response after transmitting a request, and indicates that 10 of 100 sessions is in the state in which they have not received a response, assuming that the number of real-time sessions of a server is 100 and the number of waits is 10 among the 100 sessions.

Moreover, the packet analysis module 1220 generates client_ip, server_ip, client_port, and server_port information, which indicate IP information of a client, IP information of a server, port information of the client, and port information of the server, respectively. In this case, the client_ip and server_ip information use a string as a unit (e.g., 222.103.141.187), and the client_port and server_port information use a number as a unit (e.g., 1254 or 80).

The packet analysis module 1220 may calculate transaction_number information. The transaction_number information is a transaction number generated after a session is established. In the case of the first transaction after a session is established, the transaction number information indicates 1. In general, after a session is established, several transactions occur. The transaction_number information is indexed by increasing the number by 1 every time. If one page is viewed through a browser, when components (js, css, image, etc.) within the page are requested, if several transactions are processed through one session, the transaction_number information may be indexed by increasing the number by 1 per transaction, so the transactions may be classified. For example, if the transaction_number information is 8, this indicates that a corresponding transaction is an eighth transaction after a session is established.

In relation to the start and end of a transaction, the packet analysis module 1220 generates start_time information, start_usec information, end_time information, end_usec information, fin_time information and fin_usec information. Such information may be obtained by providing a request packet by the same source (client) and destination (e.g., server) during given duration based on source ip, destination ip and time information of a mirrored packet and analyzing a detailed history for whether all data related to the request packet has been received.

The start time information indicates a transaction start time (year/month/day hour/minute/second: for example, 2012-07-18 22:33:06), and the start_usec information indicates a transaction start time (1 second in a million). The start_usec information may become a completed time by being combined with the start time (e.g., 2012-07-18 22:33:06.288370).

The end_time information indicates a transaction end time. That is, the end_time information indicates the end of data (time when the last Response Data of a transaction was received). For example, the end_time information may be represented as 2012-07-18 22:33:12.

The end usec information indicates a transaction end time in one-millionth second unit.

The fin_time information indicates a fully ended time when a next transaction is reached after a transaction is ended or when a transaction is completed (Fin is received) or when the time is out (Timeout). For example, the fin_time information may be represented as 2012-07-18 22:35:23.

The fin_usec information: indicates a transaction-full termination time in one-millionth second unit.

The packet analysis module 1220 stores a transaction state as an information name called "state." The information name may be represented as seven numbers and is as follows.
Transaction state code—
 1—session finish: an initial state—
 2—3whs_syn_sent: the state in which a client has transmitted syn during three handshakes—
 3—3whs_syn_received: the state in which a client has receives syn/ack during three handshakes—
 4—3whs_ack_received: the state in which a server has received ack during three handshakes—
 5—session_connected: the state in which a session has been established—
 6—session request: the state in which a client has made a request—
 7—session response: the state in which a server has made a response Next, the packet analysis module 1120 stores the results of the transaction as an information name called "result." The information name may be represented as eleven numbers and is as follows.
Transactions result codes—
 1—trans_finish: the state in which one transactions has been finished—
 2—client_finish: the state in which a client has finished a session (transmits Finish-FIN)—
 3—server_finish: the state in which a server has finished a session (transmits Finish-FIN)—
 4—client_reset: the state in which a client has finished a session (transmits Reset-RST)—
 5—server reset: the state in which a server has finished a session (transmits Reset-RST)—
 6—client_timeout: the state in which a session has been finished due to Timeout while a client transmits a request—
 7—server_timeout: the state in which a session has been finished due to Timeout while a server transmits a response
 9—session_error: HTTP session error—
 10—req_parser_error: HTTP Request Header error—
 11—rsp_parser_error: HTTP Response Header error Next, the packet analysis module 11220 calculates time information related to response delay of a transaction. The time information includes tran_latency, tran_rsp_time, used_time, and fin_used_time information.

The tran_latency information indicates transaction latency, and indicates latency time taken for a client to receive the first data from a server after transmitting a request. The tran_latency information uses a millionth of a second as a unit. For example, the tran_latency information may have a 76328 value. The tran_rsp_time is a transaction response time, and indicates the transmission time of response data. That is, the tran_rsp_time indicates the time when a server transmits response data, and also uses a millionth of a second as a unit. The used_time information is the entire use time of a transaction, and may be calculated as "End Time−Start Time." The used_time information indicates the time taken for a session to be established between a client and a server and for both a request from the client and a response from the server to be finished. The fin_used_time information is a use time until the full termination of a transaction, and is calculated as "Fin Time−Start Time."

The packet analysis module 1220 calculates session_req_pkts, session_req_bytes, session_rsp_pkts, session_rsp_bytes, session_bps, sess_max_bps, session_pps, sess_max_pps information.

The session_req_pkts information indicates the number of transaction request data packets, and is calculated based on the number of packets transmitted by a specific client as request data. The session_req_pkts information uses a number as a unit. The session_req_bytes information indicates bytes of request data of a transaction, is calculated based on the amount of bytes transmitted by a specific client as request data, and uses a byte as a unit. The session_rsp_pkts information indicates the number of transaction response packets, is calculated based on the number of packets of response data transmitted from a specific server to a client, and uses a number as a unit. The session_rsp_bytes information indicates bytes of response data of a transaction, is calculated based on the amount of bytes transmitted by a specific server as response data, and uses a byte as a unit. The session bps information indicates a real-time BPS of a session, is calculated based on a BPS of a currently established session, and uses a number as a unit. The session_pps information indicates a real-time PPS of a session, is calculated based on a PPS of a currently established session, and uses a number as a unit. The sess_max_pps information indicates a maximum PPS of a session, is calculated based on a maximum PPS for a period in which a corresponding session will be used, and uses a number as a unit.

Next, the packet analysis module 1220 generates domain, url, method, and response_code_number information.

The domain information indicates information associated with a domain in a Url requested by a client, and uses a string as a unit. For example, the domain information indicates information such as www.lgmobile.co.kr.

The url information is a Url requested by a client, indicates information such as "/jsp/front/search/include/akc.jsp", and has a string as a unit.

The method information is the type of request method (POST, GET, HEAD, PUT . . . ), indicates the type of request method requested by a client, and has a string as a unit.

The response_code_number information is a response result and is indicated as a HTTP state code. For example, the response_code_number information is a Response Status Code requested by a server, may be represented as one value of "200, 304, 404, 500 . . . ", and has a string as a unit.

The packet analysis module 1220 calculates users, max_users, sessions, max_sessions, wait, max_wait, ups, max_ups, cps, max_cps, tps, max_tps, latency, max_latency, and idle information in relation to a specific url.

The users information indicates the number of real-time users (based on a client IP) of a corresponding Url, may indicate "the number of real-time users of /jsp/front/search/include/akc.jsp", for example, and has a number as a unit.

The max_users information is a maximum number of users of a corresponding Url during the time when a Url is used, indicates "a maximum number of users of/jsp/front/search/include/akc.jsp", for example, and has a number as a unit.

The sessions information indicates the number of real-time sessions of a corresponding Url, may indicate "the number of real-time sessions of /jsp/front/search/include/akc.jsp", for example, and has a number as a unit.

The max_sessions information indicates a maximum number of sessions of a corresponding Url during the time when a Url is used, may indicate "a maximum number of sessions of /jsp/front/search/include/akc.jsp", for example, and has a number as a unit.

The wait information is the number of real-time waits of a corresponding Url, may indicate "the number of real-time response wait sessions of jsp/front/search/include/akc.jsp", for example, and has a number as a unit.

The max_wait information is a maximum number of response wait sessions of a corresponding Url during the time when a Url is used, may indicate "a maximum number of response wait sessions of /jsp/front/search/include/akc.jsp" for example, and has a number as a unit.

The ups information indicates a real-time UPS of a corresponding Url, and may indicate "a real-time UPS of /jsp/front/search/include/akc.jsp", for example. The ups information means "the number of users connected to /jsp/front/search/include/akc.jsp per second", and has a number as a unit.

The max_ups information indicates Max UPS of a corresponding Url, may indicate a "maximum UPS of /jsp/front/search/include/akc.jsp", for example, and has a number as a unit.

The cps information indicates a real-time CPS of a corresponding Url, and may indicate "a real-time CPS of /jsp/front/search/include/akc.jsp", for example. The cps information means "the number of sessions connected to /jsp/front/search/include/akc.jsp per second", and has a number as a unit.

The max_cps information indicates Max CPS of a corresponding Url, may indicate a "maximum CPS of /jsp/front/search/include/akc.jsp", for example, and has a number as a unit.

The tps information indicates a real-time TPS of a corresponding Url, and may indicate "a real-time TPS of /jsp/front/search/include/akc.jsp", for example. The tps information means "the number of transactions occurred in /jsp/front/search/include/akc.jsp per second", and has a number as a unit.

The max_tps information indicates Max TPS of a corresponding Url, may indicate a "maximum TPS of /jsp/front/search/include/akc.jsp", for example, and has a number as a unit.

The latency information is latency of a corresponding Url, may indicate "real-time latency of jsp/front/search/include/akc.jsp", for example, and has a number as a unit.

The max_latency information indicates Max latency of a corresponding Url, may indicate "maximum latency of /jsp/front/search/include/akc.jsp", for example, and has a number as a unit.

The idle information indicates the idle of a corresponding Url, and may indicate "the time when there is not request for /jsp/front/search/include/akc.jsp", for example. Idle becomes short if a corresponding Url is a URL that is used a lot, and Idle becomes long if a corresponding Url is a URL that is not used a lot. The idle information has a number as a unit.

The packet analysis module 1220 may generate content_len, mime, referrers, agent, and cookie information by analyzing the headers of a request packet of a client and a response packet from a server.

The content_len information indicates the content length of a response header, and indicates the length of content included in a response HTTP header transmitted by a server. For example, the content_len information may mean "bytes of /jsp/front/search/include/akc.jsp", and has a string as a unit.

The mime information indicates a response header content type, and may be one of text, html, etc., for example. The mime information is content type information included in a response HTTP header transmitted by a server, and has a string as a unit.

The referrers information indicates the referrer of a request header, and indicates a referrer included in a request HTTP header transmitted by a client. For example, the referrers information may be considered as a meaning, such as "a referrer of /j sp/front/search/include/akc.jsp is http://www.lgmobile.co.kr/jsp/front/search/include/miniAkc.html". And it has a string as a unit.

The agent information indicates the agent of a request header, and indicates an agent included in a request HTTP header transmitted by a client. The information is commonly included and transmitted in a browser, and may include information, such as an OS version, a browser type, and a version.

The cookie information indicates cookies of a request header, and contains information associated with cookies included in a request HTTP header transmitted by a client.

The packet analysis module 1220 may generate server_countrys, server_max_countrys, server_error, server_user, server_max_user, server_sessions, server_max_sessions, server_bps, server_max_bps, server_pps, server_max_pps, server_rtt, server_max_rtt, server_ups, server_max_ups, server_cps, server_max_cps, server_tps, server_max_tps, server_hps, server_max_hps, server_wait, server_max_wait, and server_idle information, as information related to a network service of a specific server.

The server_countrys information indicates the number of real-time countries of a corresponding server, and may mean "the number of real-time countries of users connected to 203.247.157.199 server", for example. The fact that two countries are connected to the 203.247.157.199 server can be analyzed.

The server_max_countrys information indicates a maximum number of countries of a corresponding server. That is, in the case of a registered server, a Max criterion may indicate a day, and may be changed according to user setting matters. For example, the server_max_countrys information may mean "a maximum number of countries connected to a 203.247.157.199 server." Accordingly, the fact that a maximum of 10 countries had been simultaneously connected to the 203.247.157.199 server can be analyzed.

The server_error information indicates the number of real-time errors (400, 500 response codes) of a corresponding server. For example, the server_error information may indicate the number of user errors and/or server errors up to 400-599 in a Response Status Code responded by a 203.247.157.199 server.

The server_user information indicates the number of real-time users (based on a client IP) of a corresponding server, and may mean "the number of real-time users of a 203.247.157.199"server", for example.

The server_max_user information indicates a maximum number of users of a corresponding server. In this case, in the case of a registered server, a criterion for Max may be a day. The server_max_user information may be changed according to user setting matters, and may indicate "a maximum number of users of a 203.247.157.199 server", for example.

The server_sessions information indicates the number of real-time sessions of a corresponding server. The server_max_sessions information indicates a maximum number of sessions of a corresponding server. The server_bps information indicates a real-time BPS of a corresponding server. The server_max_bps information indicates Max BPS of a corresponding server. The server_pps information indicates a real-time PPS of a corresponding server. The server_max_pps information indicates Max PPS of a corresponding server.

The server_rtt information indicates a real-time RTT of a corresponding server. The server_max_rtt information indicates Max RTT of a corresponding server, and may be solved as "maximum average RTT of a 203.247.157.199 server", for example. A unit for the server_rtt information and the server_max_rtt information is a micro sec.

The server_ups information indicates a real-time UPS of a corresponding server, and may indicate "real-time UPS of a 203.247.157.199 server." This means that about one user per second is connected to the 203.247.157.199 server.

The server_max_ups information indicates Max UPS of a corresponding server.

The server_cps information indicates a real-time CPS of a corresponding server, and may indicate "real-time CPS of a 203.247.157.199 server", for example. This means that about 15 sessions are connected to the 203.247.157.199 server per second.

The server_max_cps information indicates Max CPS of a corresponding server.

The server_tps information indicates a real-time TPS of a corresponding server, and may indicate "real-time TPS of a 203.247.157.199 server", for example. This indicates that about 79 transactions occur in the 203.247.157.199 server per second.

The server_max_tps information indicates Max TPS of a corresponding server.

The server_hps information indicates a real-time HPS of a corresponding server, and may indicate "real-time HPS of a 203.247.157.199 server", for example. This means that about 79 Urls are requested from the 203.247.157.199 server.

The server_max_hps information indicates Max HPS of a corresponding server.

The server_wait information indicates the number of waits of a corresponding server, and may indicate "the number of real-time waits of a 203.247.157.199 server", for example. This may indicate that 46 of 206 sessions are now waiting for a response in the 203.247.157.199 server.

The server_max_wait information indicates a Max Wait number of a corresponding server.

The server_idle information indicates an Idle time of a corresponding server, and may indicate "a time during which a request from a 203.247.157.199 server was not present", for example. Idle becomes long when the number of access users to a corresponding server is many, and becomes short when the number of access users to a corresponding server is small. The server_idle information has a micro sec as a unit.

According to an embodiment of the present disclosure, a unit for the server_countrys, server_max_countrys, server_error, server_user, server_max_user, server_sessions, server_max_sessions, server_bps, server_max_bps, server_pps, server_max_pps, server_ups, server_max_ups, server_cps, server_max_cps, server_tps, server_max_tps, server_hps, server_max_hps, server_wait, and server_max_wait information is a number.

The packet analysis module 1220 may generate client_country_code, client_error, client_servers, client_max_servers, client_sessions, client_max_sessions, client_bps, client_max_bps, client_pps, client_max_pps, client_rtt, client_max_rtt, client_sps, client_max_sps, client_cps, client_max_cps, client_tps, client_max_tps, client_hps, client_max_hps, client wait, client_max_wait and client idle information, as information related to a network service of a specific client.

The client_country_code information indicates a country code (KR) of a client, and may indicate "the country of a 222.103.141.187 client is KR", for example.

The client_error information indicates the number of real-time errors of a client, and may indicate "the number of errors up to 400~599 in a Response Status Code among transactions requested by a 222.103.141.187 client", for example.

The client_servers information indicates the number of real-time server accesses of a client, and is calculated based on a server now monitored by the packet analysis module 1220. For example, the client_servers information may indicate "the number of servers now being accessed by a 222.103.141.187 client." The client_max_servers information indicates a maximum number of simultaneous servers of a client. The client_sessions information indicates the number of real-time sessions of a client. The client_max_sessions information indicates a maximum number of sessions of a client.

The client bps information indicates a real-time BPS of a client. The client_max_bps indicates a maximum BPS of a client. The client_pps information indicates a real-time PPS of a client. The client_max_pps information indicates a maximum PPS of a client.

The client_rtt information indicates a real-time RTT of a client. The client_max_rtt information indicates a maximum RTT of a client. A unit for the client_rtt information and the client max_rtt information is a micro sec.

The client sps information indicates a real-time SPS of a client, and indicates to how many servers the client is now connected per second. The client_max_sps information indicates a maximum SPS of a client. The client_cps information indicates a real-time CPS of a client, and indicates how many sessions are connected per second. The client_max_cps information indicates a maximum CPS of a client. The client_tps information indicates a real-time TPS of a client, and indicates how many transactions now occur per second. The client_max_tps information indicates a maximum TPS of a client. The client_hps information indicates a real-time HPS of a client. The client_max_hps information indicates a maximum HPS of a client.

The client_wait information indicates the number of real-time waits of a client, and indicates the number of sessions now waiting for a response in a specific client. The client_max_wait information indicates a maximum number of waits of a client. The client idle information indicates a real-time Idle Time of a client, and indicates the time during which a request was not present in a specific client. A unit for the client idle information is a micro sec.

According to an embodiment of the present disclosure, a unit for the client_country_code, client_error, client_servers, client_max_servers, client_sessions, client_max_sessions, client_bps, client_max_bps, client_pps, client_max_pps, client_sps, client_max_sps, client_cps, client_max_cps, client_tps, client_max_tps, client_hps, client_max_hps, client wait, and client_max_wait information is a number.

Additionally, the packet analysis module 1220 may generate org, city id, isp id, os_id, browser id, mobile id, telcom id information.

The org information indicates an IP-based organization of a client, and may indicate that "an organization of a 222.103.141.187 Client" is Korea Telecom, for example.

The city_id information may indicate an IP-based City Code of a client, and may indicate that "a City of a 222.103.141.187 Client" is Seoul, for example.

The isp_id information indicates an IP-based ISP Code of a client, and may indicate "ISP of a 222.103.141.187 Client" is Korea Telecom, for example.

The os_id information indicates an OS Code of a client. Information on whether a corresponding client uses Win XP, iOS or Android as an OS may be identified based on the os_id information.

The browser_id indicates a Browser Code of a client. Information on whether a corresponding client uses Explorer, Chrome or MSIE9 as a web browser may be identified based on the browser_id.

The mobile_id information indicates a Mobile Code of a client, is device identification information of a client, and indicates information on whether a device is Samsung, Pantech, or Apple device.

The telcom_id information indicates a TelCom Code of a client, and indicates whether information on whether a communication company of a client is SKT, KT, or LGT.

The network service performance-related indicators associated with the 120 packets are generated in real time and stored in the database 1222.

The service module 1230 generates statistics based on the performance-related indicators stored in the database 1222. The statistics may be performed in a specific server unit, in a specific user unit, in a URL unit, in a session unit, as a server group located in a specific area, in a client group unit located in a specific area, and/or in a webpage unit. The service module 1230 may properly visualize the performance-related indicators by using various preset forms of visualization tools so that a user can intuitively check performance of service according to a current network. The visualization is performed based on the statistics. That is, a graph or table of a meaningful form may be generated by collecting indicators associated with a specific parameter. For example, a task of generating a list of sessions generated in a specific time zone in association with a specific client or server or generating a table of a database query generated at that time is performed. That is, the performance-related indicators associated with a network service are stored along with time information (timestamp information) of a corresponding packet, and thus a flow map may be generated so that a packet flow in a specific time zone can be understood in a relation between a client terminal and a server stage. Various statistics and a corresponding visualization method are more specifically described with reference to the following drawings.

In order to generate a specific graph or a specific table/list in accordance with an input from a user, the service module 1230 may perform search and query based on a criteria variable, such as a desired time or a desired environment (e.g., a specific web browser type or a specific user terminal type (mobile or PC)). The service module 1230 may generate a proper form of visualization information by classifying a desired data based on the selected criteria variable.

According to an embodiment of the present disclosure, the service module 1230 may perform an alarm function for finding and displaying a portion that becomes problematic in a network service. For example, if the number of waits is a threshold or more, the service module 530 may determine that there is a problem in the response speed of a corresponding section, and may visually display that there is a problem in the corresponding section. In addition to differently representing alert means according to problem occurrence visually, the alert means may be implemented in a form in which a text message is transmitted to a previously stored contact address of a related person in charge or e-mail is transmitted. This is more specifically described with reference to FIG. 19.

The various statistical data, visualization information data, and information related to the visualization tool generated in the service module 1230 and various threshold information set by a user may be stored in the service database 1232. When a user requests given processed information through the user interface 1240, corresponding information may be returned.

The user interface 1240 includes a device for receiving various inputs from an operator and outputting visualized information, such as a graph or table generated in the service module 1230. The device may include input means, such as a mouse, a keyboard, and a touch pad, and output means, such as a monitor and a touch screen. A user may input UX/UI database information, including a database associated with information (e.g., a server name, a server IP, an associated URL, a port, a sort number, location information of a server, an IP area that may be processed, etc.) on a server, a flow database associated with a connection relation (link) with various server stages, and a visualization tool for output to a user, and/or metadata associated with visualization. Furthermore, a user may input a rule set for determining the occurrence of a problem and various setting values associated with the rule set.

Figure 13:
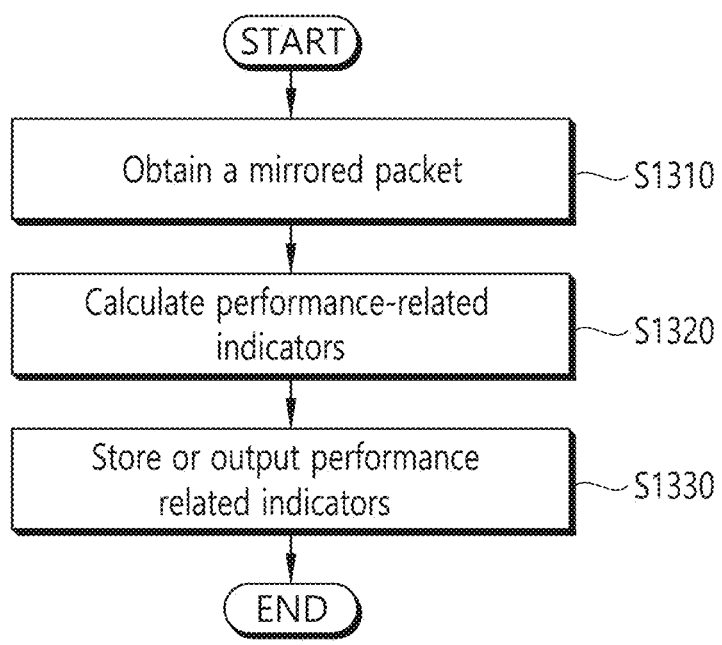
FIG. 13 is a flowchart schematically illustrating a network performance diagnosis method of the packet mirroring device according to an embodiment of the present disclosure.

FIG. 13 is a flowchart schematically illustrating a network performance diagnosis method of the packet mirroring device according to an embodiment of the present disclosure.

Referring to FIG. 13, the packet mirroring device obtains a mirrored packet from a switching device (S1310).

Thereafter, the packet mirroring device extracts a source IP, a destination IP and time information from the mirrored packet and then calculates various performance-related indicators (S1320). Some of the performance-related indicators may be calculated in a transaction unit, and a specific performance-related indicator may be calculated in a second unit.

Thereafter, the packet mirroring device may store the calculated performance-related indicators in a local storage and/or an external database (S1330). Furthermore, in order for a user of the client terminal and/or a network manager to visualize desired statistical information based on the calculated performance-related indicators, the packet mirroring device may generate statistics for the indicators and may return the results of search and query for desired information. Furthermore, in the case of a specific value or more in association with a service, the packet mirroring device may determine a problem in a network and may indicate the problem for each section or each web site.

Figure 14A:
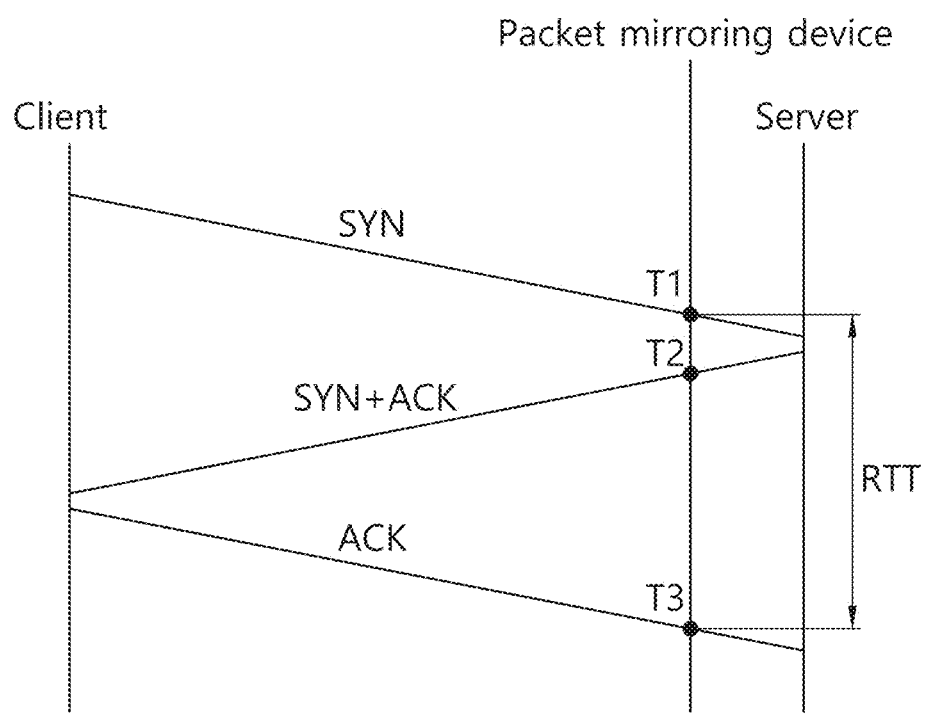
FIGS. 14a and 14b are conceptual diagrams illustrating a network round trip time (RTT) indicator between a user and a server, which is calculated in the packet mirroring device according to an embodiment of the present disclosure.
Figure 14B:
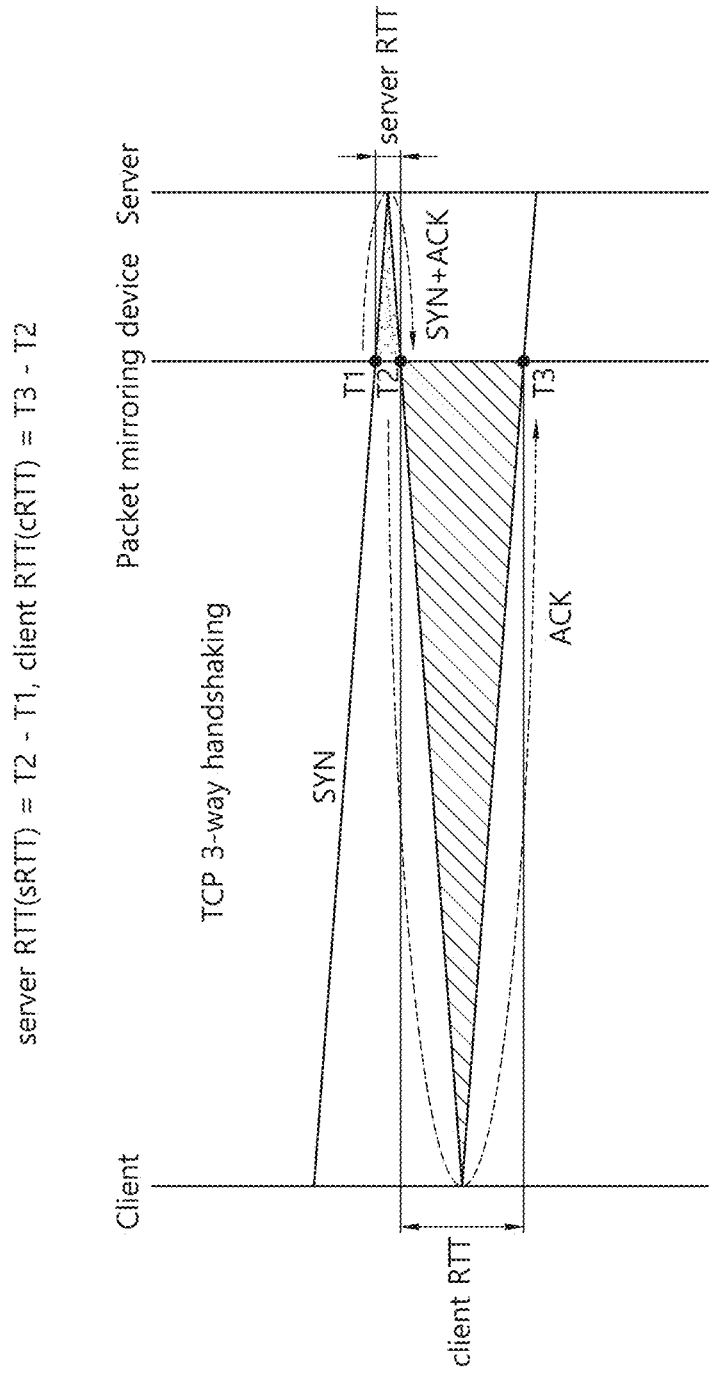

FIGS. 14*a* and 14*b* are conceptual diagrams illustrating a network round trip time (RTT) indicator between a user and a server, which is calculated in the packet mirroring device according to an embodiment of the present disclosure.

Referring to FIG. 14*a*, the packet mirroring device calculates RTT information of a packet in a network between a user terminal and a first entity (e.g., server). In this case, the packet mirroring device assumes that it is located between the client and the server. Assuming a basic synchronization scenario, the client transmits a synchronization signal SYN first, and then the server receives the synchronization signal SYN and transmits a synchronization signal and an acknowledgement signal ACK together in response to the received synchronization signal. The client may transmit an acknowledgement signal ACK in response to the signal from the server. The transmission and reception of these three signals may be called a 3-way handshake.

In such a signal transmission scenario, the packet mirroring device is located between the client and the server, and thus a mirrored packet arrives at the packet mirroring device at timing T1 earlier than the time when the synchronization signal SYN actually arrives at the server after starting from the client. Furthermore, the synchronization signal and the acknowledgement signal from the server arrive at the packet mirroring device at timing T2 earlier than the arrival time for the client. Finally, the acknowledgement signal ACK in the client arrives at the packet mirroring device at timing T3 earlier than the arrival time for the server.

In such a relation, the packet mirroring device can secure the timing information T1 to T3 in relation to the transmission and reception timing of the three packets, and may calculate an RTT value, shifted at earlier timing by a given time from the arrival time for the server by using "T3−T1." This may be called a network RTT.

Referring to FIG. 14*b*, the network RTT may be subdivided and calculated as an RTT in the server and an RTT in the client. The RTT (sRTT) in the server may indicate a latency time in the server stage with respect to one packet, and may be calculated using "T2−T1."

Furthermore, the RTT (cRTT) in the client is an RTT in the client, and may be calculated using "T3−T2."

The packet mirroring device according to an embodiment of the present disclosure calculates and stores the three RTTs; a network RTT, a server RTT, and/or a client RTT in real time for each transaction.

In the embodiment of FIG. 14*a* and FIG. 14*b*, the cRTT and the sRTT are defined and calculated as a client RTT and server RTT of the packet mirroring device located between the client and the server. In 5G communication, the cRTT and the sRTt are disposed between a 5G base station (e.g., gNB) and a core network. Thus, an RTT of an air network between a user terminal and a base station may be calculated as a cRTT, and an RTT of a network connected to a server via a base station, a core network, and a data network may be calculated as an sRTT. That is, the cRTT and the sRTT may be construed as being other than the client RTT and the server RTT in consideration of where the packet mirroring device is connected.

Figure 15:
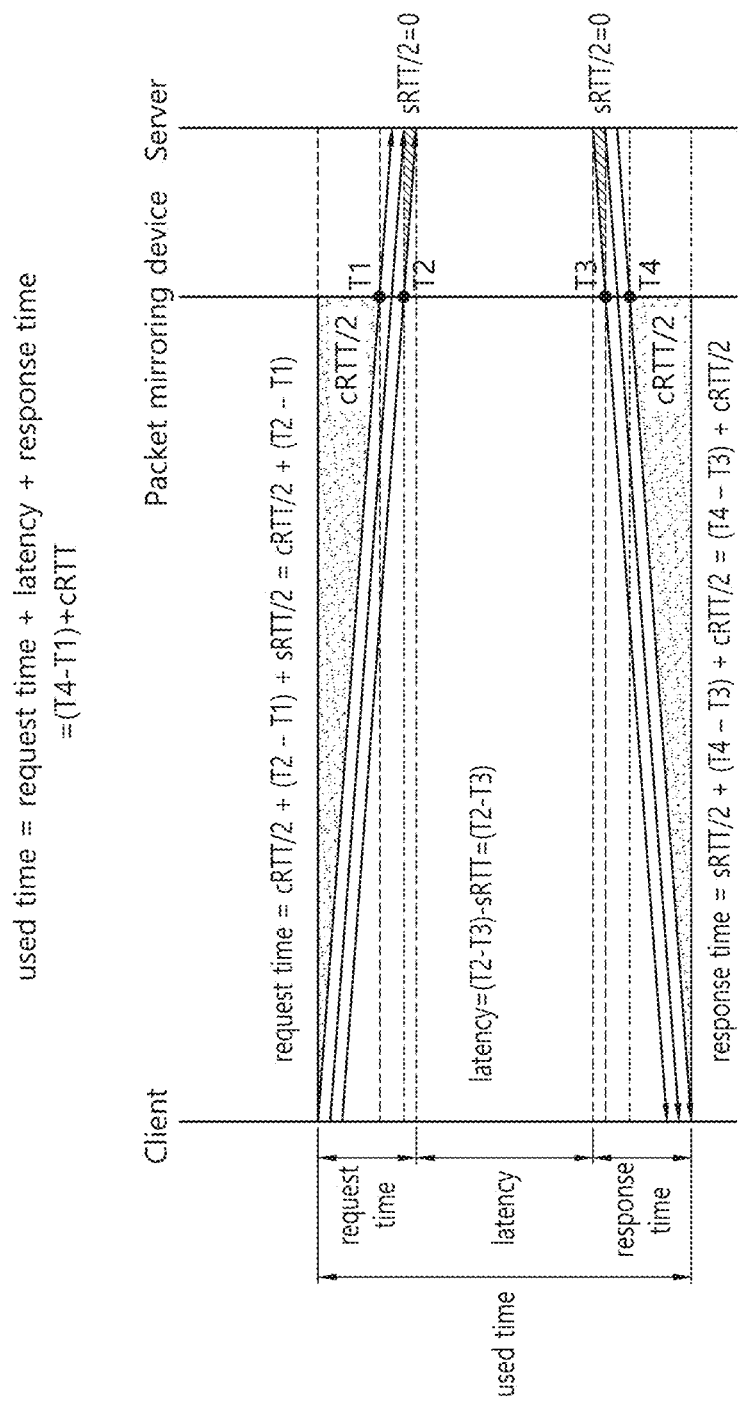
FIG. 15 is a conceptual diagram illustrating a delay indicator calculated in the packet mirroring device according to an embodiment of the present disclosure.

FIG. 15 is a conceptual diagram illustrating a delay indicator calculated in the packet mirroring device according to an embodiment of the present disclosure.

Referring to FIG. 15, the packet mirroring device may calculate various delay indicators. In this case, an embodiment is assumed in which the packet mirroring device is present between a client and a server, the client transmits a plurality of request packets to the server, and the server transmits a plurality of response packets to the client in response to the plurality of requests.

The packet mirroring device may obtain, based on arrival timing of a mirrored packet, timing T1 at which the first client request packet arrives at the packet mirroring device, timing T2 at which the last client request packet arrives at the packet mirroring device, timing T3 at which a first response packet is reached from the server, and timing T4 at which the last response packet is reached from the server.

In this case, request time (request time) information among the delay indicators indicates a time from the time when the client transmits a plurality of requests to the server to the time when a corresponding request arrives as the server. In relation to this, the packet mirroring device may be aware of the time when the first request packet starts from the client based on the timing T1 through a value obtained by dividing a cRTT by half. Furthermore, the packet mirroring device may be aware of the time the last request packet actually arrives at the server based on a value obtained by dividing an sRTT by half. Through such arithmetic analysis, "request time=cRTT/2+(T2−T1)+sRTT/2" may be calculated. In general, the sRTT value is a very small value, and thus is calculated as a value very similar to an cRTT/2+(T2−T1) value.

Next, latency indicates the delay time it takes until the server receives content or data associated with a request from a URL associated with the request of a client. That is, assuming that the server performs transmission to the client as soon as the server receives data, latency indicates the time until the server receives the first data related to a request from the corresponding URL. This is calculated as a value obtained by subtracting an sRTT value from (T2−T3). In this case, "T2−T3" may be latency because the sRTT value may be a very small value to the extent that it may be neglected.

Next, a response time indicates the time taken for the server to transmit content related to a request to the client. This is calculated using an equation "response time=sRTT/2+(T4−T3)+cRTT/2." Considering that the sRTT is a very small value, the response time is almost identical with a (T4−T3)+cRTT/2 value.

If a used time until the entire response data related to a request is received after the client transmits the request is calculated, the user time is calculated using "used time= (T4−T1)+cRTT" because the used time is the sum of the request time, the latency, and the response time.

Figure 16:
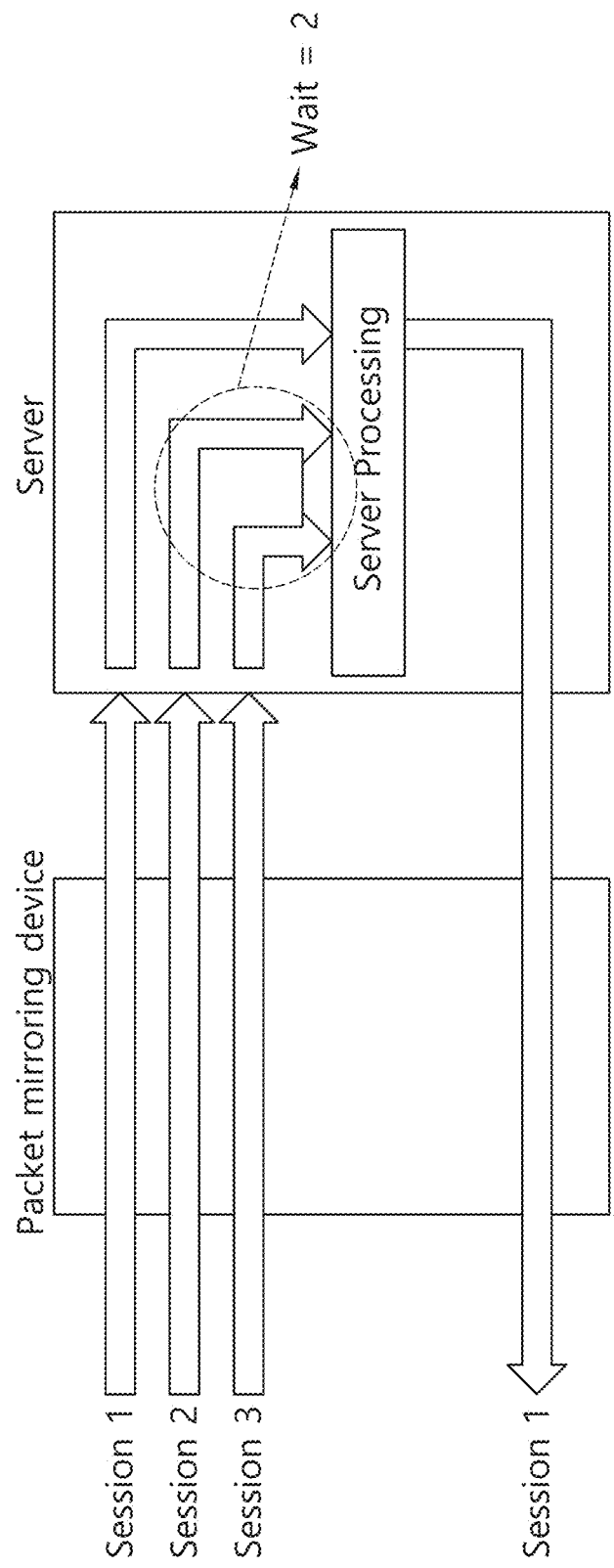
FIG. 16 is a conceptual diagram illustrating a server response wait session number indicator calculated in the packet mirroring device according to an embodiment of the present disclosure.

FIG. 16 is a conceptual diagram illustrating a server response wait session number indicator calculated in the packet mirroring device according to an embodiment of the present disclosure.

Referring to FIG. 16, the server processes at least one request from a plurality of clients, and thus one server processes a plurality of sessions in relation to the request. In this case, if the processing time in the server is increased, latency in the client is also increased. This requires patience for a user of a client device. Accordingly, response wait session number information in the server has a very important meaning.

The number of response wait sessions is calculated as the number of remaining sessions obtained by subtracting a session in which response data is actually transmitted to the client through processing in the serve from a plurality of sessions associated with a request. For example, if only a response to one of three sessions is made, the number of response wait sessions is calculated as wait=3−1=2. That is, the packet mirroring device is present between the client and the server, and can secure all mirroring packets for an actual packet transmitted and received between the client and the server. Accordingly, the number of response wait sessions now being processed within the server can be clearly checked.

According to an embodiment of the present disclosure, whether processing for a specific request in the server has been completed may be checked based on whether a response to the request packet for a specific URL has been transmitted to the client based on a source ip and a destination ip. The response packet is associated with the specific URL shown in the request packet, and may be checked by checking whether the destination ip and the source ip are included in a manner opposite to the request packet.

Figure 17:
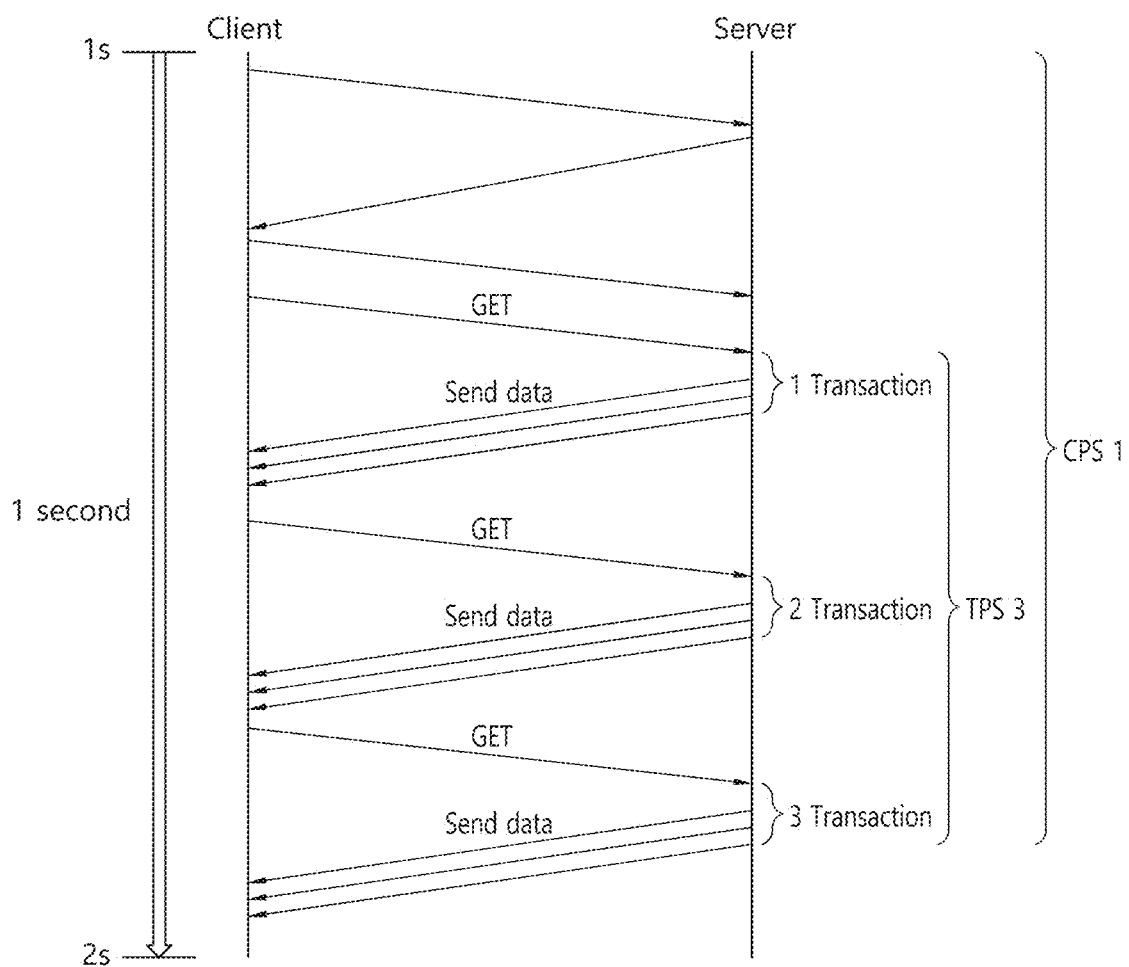
FIG. 17 is a conceptual diagram illustrating a connection per second/transaction per second (CPS/TPS) indicator calculated in the packet mirroring device according to an embodiment of the present disclosure.

FIG. 17 is a conceptual diagram illustrating a connection per second/transaction per second (CPS/TPS) indicator calculated in the packet mirroring device according to an embodiment of the present disclosure.

Referring to FIG. 17, one transaction includes at least one request between a client and a server and at least one response data packet according to the at least one request. In the embodiment of FIG. 17, three response data packets form one transaction with respect to one GET request. They do not need to essentially have a relation of 1:3, but may have a relation in which request packets are greater and a response data packet corresponding to a corresponding request packet is smaller.

Such a transaction also has an important meaning in association with the speed and latency of a network service. The packet mirroring device calculates the number of transactions newly attempted per second, which is called a TPS. Furthermore, the number of connections between a specific client and a specific server, which may be called a connection. The packet mirroring device calculates the number of connections newly attempted per second, which is called a CPS.

In addition, the packet mirroring device periodically calculates user per second (UPS) information indicative of the number of users connected per second and BPS information indicative of the amount of data transmitted and received per second through a specific client, a specific server or a specific session. The packet mirroring device also periodically calculates PPS information indicative of the number of packets transmitted and received per second, HPS information indicative of the number of URLs requested per second, and SPS information indicative of the number of servers connected per second.

In the embodiments of FIGS. 14a to 17, the embodiment in which the packet mirroring device is present between the client and the server and calculates various indicators associated with network latency between the client and the server has been described. The packet mirroring device may be present between a plurality of servers of a server stage, and may calculate latency between the servers. For example, the packet mirroring device may be present between the web server and the WAS server and may calculate a delay indicator between the web server and the WAS server, and may be between the WAS server and the DB server and may calculate a delay indicator between the WAS server and the DB server. Furthermore, the packet mirroring device may be disposed within a server stage in which a plurality of packet mirroring devices includes a plurality of servers, may calculate a delay indicator for each section, and may collectively display the delay indicator for each section within the entire server network and for each server by sharing the calculated delay indicator.

According to another embodiment of the present disclosure, one packet mirroring device may be connected to a switch between the client and the web server, a switch between the web server and the WAS server, and a switch between the WAS server and the DB server, and may calculate a delay indicator for each section in a plurality of server sections and/or for each server.

Figure 18:
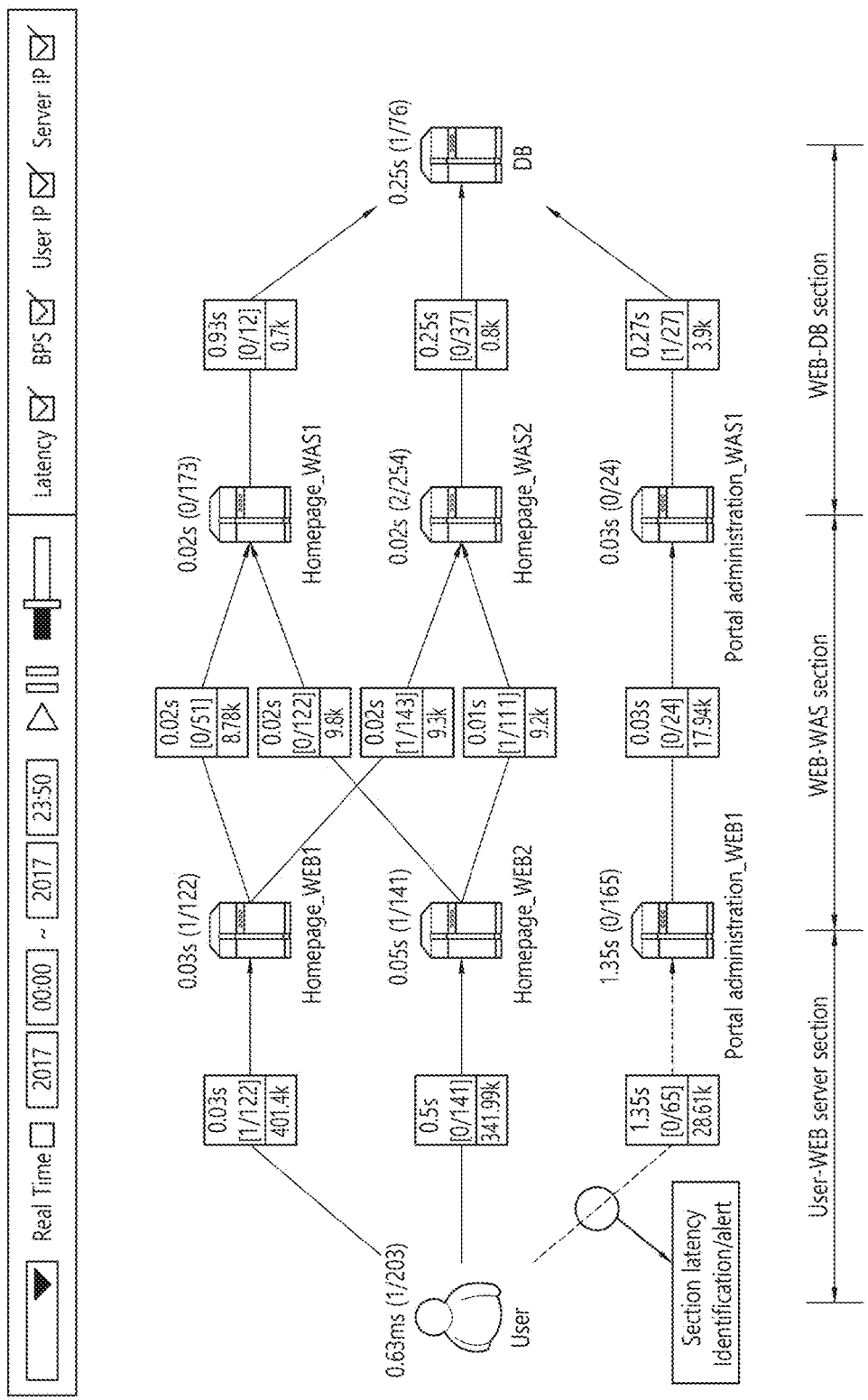
FIG. 18 is a diagram illustrating a flow map generated based on a performance indicator calculated in the packet mirroring device according to an embodiment of the present disclosure.

FIG. 18 is a diagram illustrating a flow map generated based on a performance indicator calculated in the packet mirroring device according to an embodiment of the present disclosure.

Referring to FIG. 18, the flow map is composed of a user, at least one server, and a link (associated with a session) between the user and the server. The present embodiment indicates a system configuration in which the user is connected to three web servers, the three web servers are connected to three WAS s, and the three WAS s are connected to one DB.

According to an embodiment of the present disclosure, in relation to a portion that visualizes a performance indicator of the packet mirroring device, the packet mirroring device is implemented as a network performance indicator visualization device. In this case, the performance-related indicators do not need to essentially use an indicator generated based on a mirrored packet. After a packet is obtained using another method, performance-related indicators may be calculated using the above method based on information within the obtained packet. Thereafter, a flow map, a server list, a user list, a URL list, a session list, a web page analysis page, etc. to be described later may be generated by turning the corresponding performance-related indicator into an object.

First, in the embodiment of FIG. 18, the packet mirroring device may generate a flow map indicative of a traffic flow of a network including each entity based on the calculated performance-related indicator. A portion in which a time duration to be watched is set is present at the top of the flow map. In the case of real-time setting, a flow map at the current timing is played back. In order to check the performance of a network service at a specific timing in the part, a flow map in the past time may be played back. For example, if a section from 11:11 on Jan. 2, 2017 to 01:33 on Jan. 3, 2017 in the past, is to be seen, the user sets a start time and an end time, and plays back content associated with a flow map generated based on the corresponding timing. In this case, a time bar is generated based on the set start time and end time. A flow map at desired timing may be played back through control of fast forward, fast reward, playback/stop, etc. for the generated time bar. In this case, an indicator to be indicated may be selected through each ink, each user and each server. For example, at least one of latency, the number of response wait sessions information (wait), BPS, CPS, TPS, UPS, etc. may be included. Furthermore, an IP address may be selected to be displayed in each user and each server.

According to an embodiment of the present disclosure, in the flow map, the user and each server display the calculated performance-related indicator. In this case, indicators associated with latency and/or speed of a network among the performance-related indicators may be used. Each performance-related indicator may be objected and displayed on a specific virtual space. In this case, the object is a data object and is objected from the performance-related indicators in order to appear in the flow map. For example, the object may include data, such as a response waiting speed or a BPS. Each performance-related indicator includes time information, and thus the object may be implemented to include the time information and mapped on the virtual space. The virtual space indicates a display space indicating an object. A plurality of objects may be represented within the virtual space.

In generating the flow map, the packet mirroring device determines to which entity (e.g., a client, a server, or a link between the client and the server) the performance-related indicators is related, identifies what the performance-related indicators is, and generates the flow map according to predetermined metadata on the virtual space based on the content (BPS, the number of response wait sessions, or latency) of the identified performance-related indicator and the entity of the performance-related indicators. In particular, it is a principle that one performance-related indicator is represented in a visual form for each indicator in accordance with one object, but performance-related indicators having high relevance (e.g., an indicator, such as latency of the same user and the number of response wait sessions) may be objected in one visual form. That is, two data may be displayed on one client icon in a given form. The same is true of performance-related indicators associated with the server stage and the link.

For example, a delay indicator, such as latency of a user of 0.63 ms, is objected and represented on a virtual space associated with the flow map. A link is objected based on at least one of performance-related indicators between a plurality of entities. The server is objected based on at least one of performance-related indicators associated with the server and is represented on the virtual space. The delay indicator indicated in the flow map does not essentially include only latency. At least another of about 120 performance-related indicators generated according to an embodiment of the present disclosure may be indicated. In this case, the indicated latency may indicate current latency. If a plurality of latencies is present in a plurality of links, the fastest latency, average latency, and/or the slowest latency may be indicated according to user setting.

Furthermore, in the flow map, in relation to a user and each server, information on a total number of sessions now associated with the user and information on the number of sessions waiting to be processed may be indicated in a form such as "1/203."

According to an embodiment of the present disclosure, a user may be displayed as a user group in a specific area. For example, users within one company may be indicated as group users related to the one company. In this case, the number of related users may be separately indicated. Furthermore, users within one group may be classified into a group 1, a group 2, etc. In this case, a criterion for the classification may be directly set by a manager, and the users may be automatically classified based on information related to an area, an organization and/or an IP. Furthermore, performance-related indicators for the classified users may be separately processed. The separate processing may mean that, when being objected in the flow map, the performance-related indicators is generated as a separate object. That is, in a group consisting of 50 employees, the group may be divided into Group 1 consisting of 15 employees and Group 2 consisting of 35 employees. In this case, User 1 may indicate performance-related indicators for Group 1 consisting of 15 employees, and Group 2 may be objected based on performance-related indicators for the remaining 35 employees and indicated in the flow map.

Even in the case of the server, information on the number of sessions not being processed compared to a total number of sessions connected to a corresponding server may be indicated like "1/122." In this case, information associated with the sessions may be changed into information associated with transactions and/or information associated with a connection (or link) and indicated according to user setting. That is, about 120 performance-related indicators calculated in the packet mirroring device may be properly displayed in the flow map.

In the embodiment of FIG. 18, each link is associated with sessions on both sides of packet transmission and reception. Information objected and indicated in a rectangular form in the middle of the link may include latency, information on the number of response wait sessions, and a latency indicator such as a BPS. For example, in the case of the user and Homepage_WEB 1 on the upper side of FIG. 18, latency speed of 0.03 s is now indicated between the two entities with respect to a specific packet, and 122 sessions are present. It can be seen at a look that most of the 122 sessions has been processed and only one session is in a response wait state. Furthermore, it may be checked that service is performed at a fast speed of a BPS of 401.4 k.

In contrast, a very slow speed with latency of 1.35 s is indicated between the user and Portal Administration_WEB 1 on the lower side of FIG. 18. A ratio of 0/65 of the number of response wait sessions compared to a total number of sessions is indicated, and a relatively low BPS of 28.61 k is indicated. Accordingly, an alert related to "section latency" is indicated in a corresponding link due to low latency and BPS. The alert indication may be represented using a method of using a color of a line indicative of the corresponding link and a method of differentiating the thickness of a line or a form of a line. For example, a threshold associated with a plurality of pieces of latency may be set, and a state may be identified by comparing the set threshold and a current latency value. The state may be determined by a rule set to be described later, and may be divided into a plurality of sections through a plurality of thresholds. For example, the state may be divided into states, such as "normal", "alert", and "problem occurrence", and may be determined based on a result of a comparison with a threshold. A visual representation corresponding to the determined state is present, and the corresponding state may be indicated as the corresponding visual representation. For example, a method of indicating "problem occurrence" as the worst state in red and indicating a next poor state in yellow indicating"alert" may be used. That is, different visual representations may be used in accordance with a plurality of sections corresponding to a plurality of thresholds. The visual representation includes a change in at least one of the color, thickness and form of an object. In particular, in states related to a link, a "normal" state is indicated using a dark line, a "latency" state is indicated using a red line, a "network problem" state is indicated using a dotted dark line, and a "network latency" state is indicated using a dotted red line so that an operator can intuitively understand the states at a look.

Additionally, in the flow map, a web server is associated with at least one WAS server. In particular, two web servers (Homepage_WEB 1 and Homepage_WEB 2) on the upper side are connected to two WAS servers (Homepage_WAS 1 and Homepage_WAS 2) while forming a plurality of links therewith. That is, the web server (Homepage WEB 1) is also connected to the two WASs (Homepage_WAS 1 and Homepage WAS 2), and the web server (Homepage_WEB 2) is also connected to the two WASs (Homepage_WAS 1 and Homepage WAS 2). Accordingly, four links are generated, and performance-related indicators for the four links are respectively indicated.

Likewise, a web server-WAS section and a WAS-DB section in addition to the user-web server section may be represented. Due to such a visual representation, a user can intuitively check in which server of any section in a network server a problem is present now or in the past.

According to another embodiment of the present disclosure, the three sections of the user-web server section, the web server-WAS section and the WAS-DB section do not need to be essentially represented. Although one section (e.g., user-server section) smaller than the three sections is represented, a plurality of DB server sections may be hierarchized and represented as a plurality of a DB slave, a DB master and a DB end. The same is true of the web server or the WAS. A general configuration of such a flow map may be generated through user setting (this may be stored as metadata).

In relation to the generation of the flow map, the packet mirroring device may configure the web server, the WAS server and the DB server associated with a request from a user based on the user (i.e., the IP of a client terminal), who is the center, through the analysis of a mirrored packet. That is, a server stage related to a destination ip and/or a URL within the mirrored packet may be extracted as components of the flow map. Connection relations of the flow map may be generated based on the ip of each server and visualized. Alternatively, the flow map may be generated by configuring a specific server first, who is the center, and associating a user who has sent a request to the server with other servers associated with the configured server.

The metadata associated with the configuration of the flow map may be previously stored in the service DB (532 of FIG. 5). The metadata may store a color, a font, a location of a physical file, a tile background, etc. in addition to information related to a form and location coordinates of an objected target object (e.g., a user, a server, and a link). This will be described in more detail below.

FIG. 19 is a table illustrating an example of setting values for determining whether an alert associated with network performance in the packet mirroring device according to an embodiment of the present disclosure occurs.

Referring to FIG. 19, in the flow map or other visualized representations, the packet mirroring device indicates an alert by comparing performance-related indicators, associated with a current network service, with various thresholds so that a user can prevent a great traffic problem. In relation to a determination of the alert, various thresholds may need to be set.

In general, a determination of an alert situation may be divided into a server alert and a section alert, which have separate available rule sets. The server section may be determined based on a portion for a server state (Service Down, Server Down), the number of sessions, the number of response wait sessions, latency, a CPS, a TPS, a BPS, HTTP 40× or 50× error, etc. The section alert may be determined based on the number of response wait sessions and latency.

As illustrated in FIG. 19, the packet mirroring device determines whether a problem occurs in a network service based on at least some of performance-related indicators. The packet mirroring device may determine web traffic latency, WAS traffic server latency, a WAS traffic wait excess, DB traffic latency, the occurrence of web WAS section latency, etc. based on latency information indicative of the delay time it takes until a server receives first data associated with content of a client associated with the content from a URL associated with a request for the content and information on the number of response wait sessions indicative of the number of sessions in a state in which a response to the request transmitted by the client has not been received. The packet mirroring device may compare the performance-related indicators with a threshold, and may determine whether a problem occurs through the measurement of duration in which a value of the performance-related indicators higher than the threshold is present as a result of the comparison.

First, the web traffic latency may occur when the number of response wait sessions among all sessions is 70% or more and the latency is more than 5 seconds with respect to all web servers. It may be determined that when such a time is 10 seconds or more, there is a problem with web traffic latency depending on user setting.

Furthermore, the WAS traffic server latency may be determined that a problem has occurred in the WAS server when the state in which latency is 5 seconds or more continues for 5 seconds or more. The occurrence of a WAS traffic wait excess is determined that a problem has occurred in the WAS server when the state in which the number of response wait sessions is 70% or more continues for 5 seconds or more.

The DB traffic latency may occur when the number of response wait sessions among all sessions is 30% or more and the latency is more than 5 seconds with respect to all DB servers. It may be determined that there is a problem with the DB traffic latency when such a time is 10 seconds or more depending on user settings.

Moreover, in relation to the occurrence of the web WAS section latency, it may be determined that there is a problem with all web servers and WAS servers when the state in which the latency is 5 seconds or more continues for about 5 seconds or more.

Furthermore, the packet mirroring device may determine whether a problem occurs by comparing a speed-related indicator, such as a BPS, with a threshold. The occurrence of a BPS excess is targeted for all servers. It is determined that a problem has occurred when the state in which the BPS is more than 50M continues for 5 seconds or more.

The occurrence of a CPS excess is targeted for all servers. It is determined that a problem has occurred when the state in which the CPS is more than 150 continues for about 10 seconds or more.

In the case of a 50× and/or 40× error, when the state in which the HTTP 50× error (or HTTP 40× error) is more than 5 continues for about 5 seconds or more with respect to all web servers, it is determined that a problem has occurred.

In the case of the occurrence of a wait excess, when the state in which a total number of sessions is more than 1000 and a ratio of the number of response wait sessions is more than 80% continue for about 10 seconds or more with respect to all servers, it is determined that a problem has occurred.

Various thresholds related to the occurrence of such a problem, a related duration threshold, a target server IP, and a corresponding alert level are selected to be changed by user setting.

According to an embodiment of the present disclosure, an alert level may be determined to be matched with such a problem situation. An alert state in the flow map and other various visualization tools are represented based on the alert level. Furthermore, as measures against the problem situation, an operation of providing notification of the alert situation through SMS text, an e-mail and/or a social network service (SNS) associated with a preset person-in-charge account may be performed. Alternatively, an alert signal may be directly transmitted to a user terminal, corresponding to a problem situation.

According to another embodiment of the present disclosure, the packet mirroring device continues to store data for a network performance-related indicator over time, so the stored data forms big data. A proper rule set suitable for an alert situation may be adaptively generated by applying a machine learning algorithm to the stored big data. For example, the packet mirroring device may set a higher or lower threshold based on past data on the average delay time and/or number of response wait sessions of WAS servers, with respect to a WAS server in which a WAS traffic latency problem on a regular basis. This may apply similarly to the user terminal.

Furthermore, while the delay time and/or number of response wait sessions and BPS or TPS value within normal ranges are stored through past big data, if there is a difference of a threshold or greater compared to the average delay time and/or number of response wait sessions, and BPS or TPS value, the occurrence of a problem may be determined.

Otherwise, in a connection relation between the web server and the WAS server or between the WAS server and the DB server, if service speed delay intensively occurs in one server alone, an alert may be represented by determining that speed delay having a threshold or more occurs compared to an average speed delay value of other servers.

Application to 5G-Based System

Figure 20:
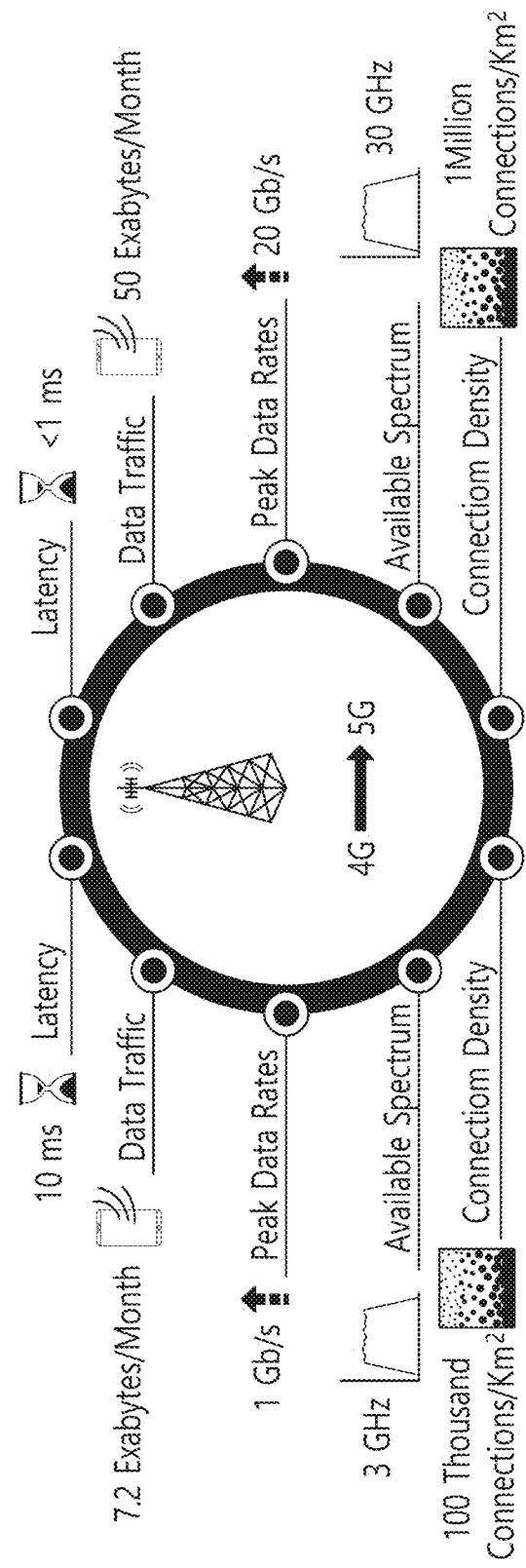
FIG. 20 is a view showing reference values required in a 5G communication system.

FIG. 20 is a view showing reference values required in a 5G communication system.

Referring to FIG. 20, in an embodiment of the present disclosure, values related to basic specifications required in 5G may be used as a threshold for differentiating between a normal range and a range for alerts. In order to use these as references, it is desirable that a performance of 1 ms or lower is guaranteed in terms of network latency, specifically with reference to FIG. 20. However, latency required in 5G-based communication is network latency, which is a concept that corresponds to an RTT of the packet mirroring device according to an embodiment of the present disclosure. That is, while the latency of the packet mirroring device is the delay time of the server or the delay time related to processing, the network latency in FIG. 20 means the delay time on the network, which is a different concept from the former. After all, this concept corresponds to an RTT(cRTT+sRTT), cRTT, or sRTT of the packet mirroring device. In this case, the RTT may mean an RTT to a first entity (e.g., a server or a target entity of other packets) or an RTT of a packet from a user terminal to a base station (i.e., an RTT in an Air Net (see FIG. 27a and FIG. 27b). According to an embodiment of the present disclosure, a comparison with a threshold in a 5G communication system may be made in consideration of a correspondence relationship with performance-related indicators calculated by the packet mirroring device. That is, a 5G latency threshold corresponds to an RTT, cRTT, or sRTT of the packet mirroring device, especially, an RTT in the Air Net. Thus, it is desirable that the device compares with the calculated performance-related indicators in consideration of this correspondence relationship.

According to the embodiment of FIG. 20, in a 5G-based communication system, a threshold for error detection related to network latency may be 1 ms. Also, the value of data traffic is 50 Exabytes/Month, and 20 Gb/s required for 5G in relation to peak data rates may use a threshold for the value of bits per second (BPS).

However, the above threshold related to 5G communication is not necessarily limited to the above 1 ms and 20 Gb/s. The threshold for network latency may be set to other thresholds such as 2 ms, 3 ms, 8 ms, 10 ms, 15 ms, 20 ms, 30 ms, 40 ms, 60 ms, 70 ms, 80 ms, 90 ms, and 100 ms, apart from 1 ms. Also, the threshold related to maximum BPS may be 1 Gbps, 2 Gbps, 5 Gbps, 10 Gbps, 15 Gbps, 25 Gbps, 30 Gbps, 40 Gbps, 50 Gbps, 100 Gbps, etc. Particularly, the threshold related to user data rate (minimum required BPS) may be 10 Mbps, 20 Mbps, 30 Mbps, 40 Mbps, 50 Mbps, 75 Mbps, 100 Mbps, 150 Mbps, 200 Mbps, 500 Mbps, 1 Gbps, etc. It may range from 100 Mbps to 1 Gbps.

The proper bandwidth available in a 5G communication system is 30 GHz, and the proper connection density should be enough to process about 1 million connections per km. These numerical values may be used as thresholds for 5G communication.

Moreover, a threshold for 5G communication service corresponding to the latency of the packet mirroring device according to an embodiment of the present disclosure may be set to one of 5 ms, 10 ms, 20 ms, 30 ms, 40 ms, 50 ms, 100 ms, 200 ms, 300 ms, 400 ms, 500 ms, 750 ms, and 1000 ms.

According to an embodiment of the present disclosure, these thresholds are not specialized for 5G communication service only, but thresholds specialized for 4G communication service also may be used. The thresholds for 5G communication service and the thresholds for 4G communication service may be different. The user of the packet mirroring device may set and change these thresholds as they want, according to the environment in which the packet mirroring device according to an embodiment of the present disclosure is used. In this case, a different threshold value may be set for each user terminal so as to determine whether the network performance is normal or not.

The reference values related to 4G in FIG. 20 may be used as thresholds related to 4G communication service. The reference values related to 4G may have a network latency of 10 ms, a data traffic volume of 7.2 Exabytes/Month, a peak data rate of 1 Gbps, an available spectrum of 3 GHz, and a connection density of 100,000 connections/km².

Figure 21:
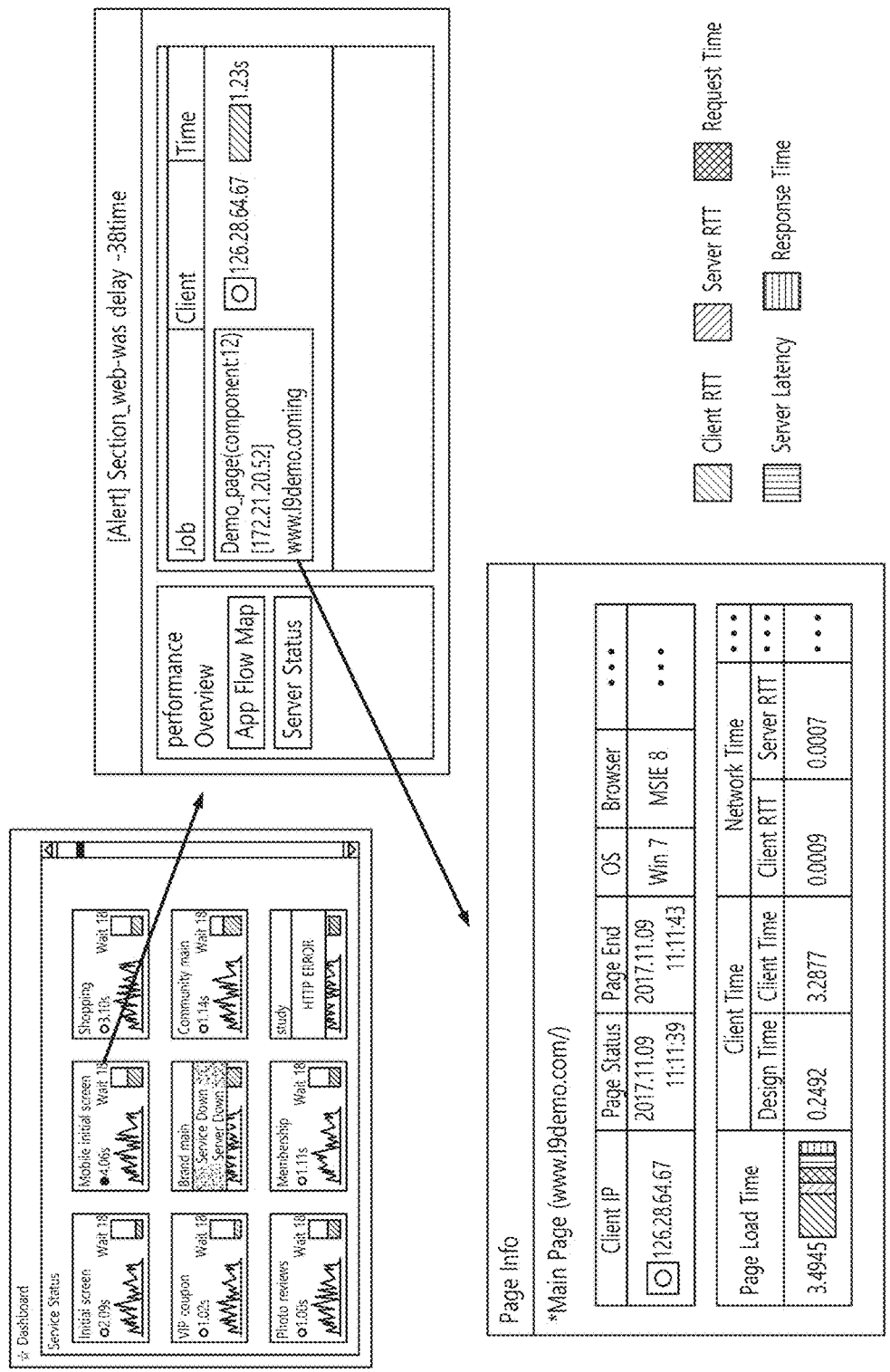
FIG. 21 is a view showing a page visualizing the response speed a target user experiences for a main page according to an alert.

FIG. 21 is a view showing a page visualizing the response speed a target user experiences for a main page according to an alert.

Referring to FIG. 21, when a website in an alert state is clicked, the packet mirroring device displays a performance analysis page according to an alert. For example, the performance analysis page may be an alert about a web-WAS delay, in which the analysis page organizes related actions into a list based on information in mirrored packets associated with the speed delay at that time.

At this time, the sessions associated with a specific website may be analyzed and the actions occurring at the corresponding time may be summarized. For example, the access behavior to the IP of the server (or entity) associated with the web page may be extracted. In addition, the IP of the client, which is the subject of the access action (the country, the OS, and the mobile status may also be displayed as well) and the time required for the access action may be calculated and displayed as well. In particular, as described above, the time required may be expressed in a time bar form by dividing into cRTT, sRTT, request time, response waiting time, and response data transmission time.

More specifically, detailed information about a session or transaction (or connection) that occurred at a specific time for a particular web page may be displayed. In this page, the client IP, page start time, page end time, OS, browser, mobile device presence information, carrier information, ISP information, and city information associated with the session (or transaction) are displayed.

In addition, the page load time information may be provided in the form of a time bar that is divided into cRTT, sRTT, request time, server response waiting time, and response data transmission time. Or else, it may be displayed in the form of a time bar that is divided into client time, network time, and server time. The client time, the network time, and the server time can be displayed separately. The client time means the time spent at the client end and includes page design time and the time spent on the client itself. The network time includes cRTT information, sRTT information, request time, and download time. The server time includes response latency. At this time, the page design time represents the time required to play the data associated with the received web design in the client terminal, the time spent on the client itself, such as the time to generate the request information associated with the web page, regardless of network conditions, may mean the time required for page loading internally in the client device. They may be calculated in consideration of the time taken until the state associated with the state code 6 in which the session request is performed from the state of the state code 5 which means that a session is established based on a transaction state code among the performance-related indicators generated by the packet mirroring device. Alternatively, they may be calculated based on the session result code.

In addition, in connection with the use of a web page, the usage component information, the amount of request packets, the amount of response data, user information, session information, response waiting session information, TPS information, and error related information are also displayed.

In addition, the details (analysis by component) are displayed by sorting, in chronological order, a plurality of sessions included in the corresponding time, but in the form of a time bar that is divided into cRTT, sRTT, request time, server response waiting time, and response data transmission time. Here, URL information, used time information, response waiting time information, and the like may be expressed. Based on this, the delay component can be extracted.

Figure 22:
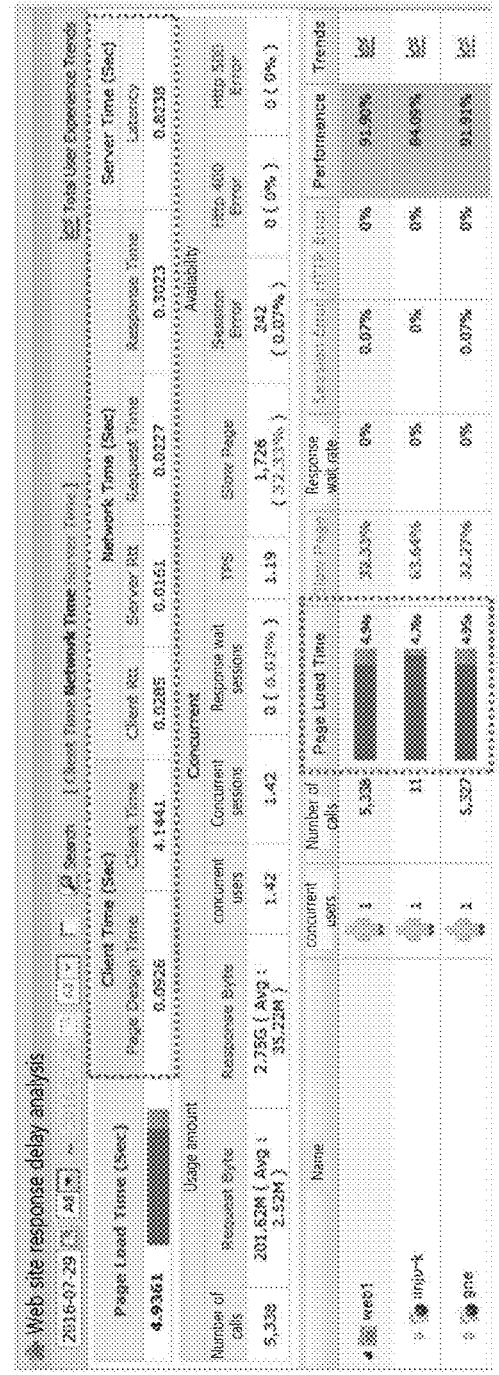
FIG. 22 is a view showing a page diagnosing and analyzing details of a delayed web page.

FIG. 22 is a view showing a page diagnosing and analyzing details of a delayed web page.

Referring to FIG. 22, the packet mirroring device may generate a detailed diagnosis and analysis page for a delayed web page (slow page) having an experienced speed equal to or higher than a specific value. One web page includes a plurality of components. In this case, the delayed web page shows a web page having an experienced speed equal to or higher than a specific value and displays client information, time information, etc. associated with the web page. Hereupon, the time information displays total page loading time. The packet mirroring device may extract the most significant delay cause based on the ratio of client time, the ratio of network time, and the ratio of server time, with respect to total page loading time. This is visually represented by the time bar.

In this case, detailed analysis of a specific web page may be performed. In response to the detailed analysis request from the user, the packet mirroring device performs component-specific analysis. That is, the URL information, time bar information, usage time, response waiting time, amount of data received, result code value, type, and status information are displayed for each component of the corresponding web page. In this case, the time bar information may be displayed by being divided into cRTT, sRTT, request time, server time, and response time.

Figure 23:
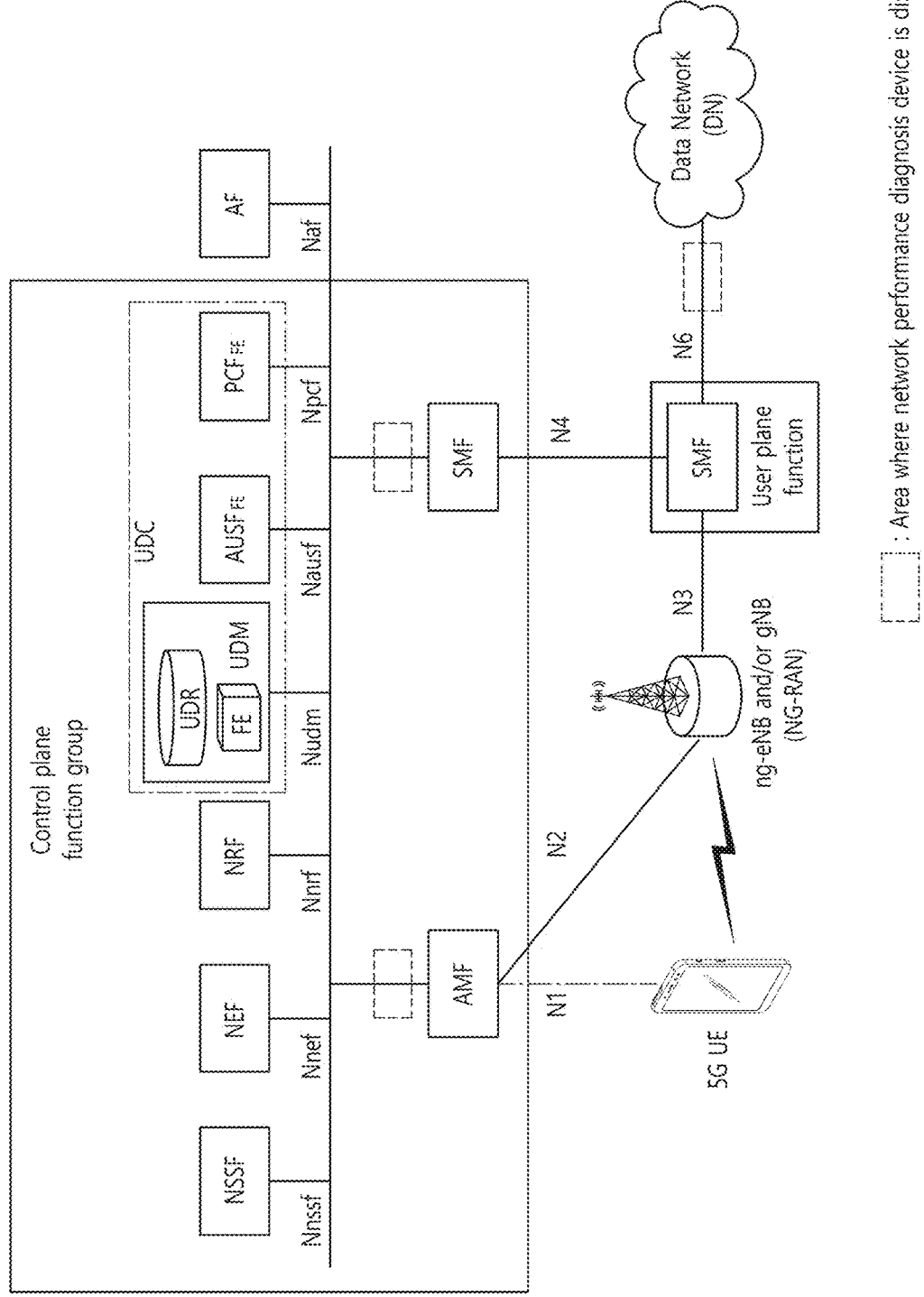
FIG. 23 is a conceptual diagram illustrating areas a network performance diagnosis device can access in a 5G system.

FIG. 23 is a conceptual diagram illustrating areas a network performance diagnosis device can access in a 5G system.

Referring to FIG. 23, the network performance diagnosis device (packet mirroring device) may be disposed by being connected to a switching device between an AMF (Access and Mobility management function) and a bus connecting an NSSF (Network Slice Selection Function), NEF (Network Exposure Function), NRF (NF Repository Function), UDM (Unified Data Management), AUSF (Authentication Server Function), PCF (Policy Control Function) and AF (Application Function) of a control plane of the 5G system or between the bus and an SMF (Session Management Function). Alternatively, the network performance diagnosis device (packet mirroring device) may be disposed by being connected to a switching device between an UPF (User plane Function) and a DN (Data Network).

According to another embodiment of the present disclosure, the network performance diagnosis device (packet mirroring device) may be disposed by being connected to a switching device between AMF and ng-eNB and/or gNB, or may be disposed by being connected to a switching device between SMF and UPF and/or between ng-eNB and/or gNB and UPF.

Figure 24:
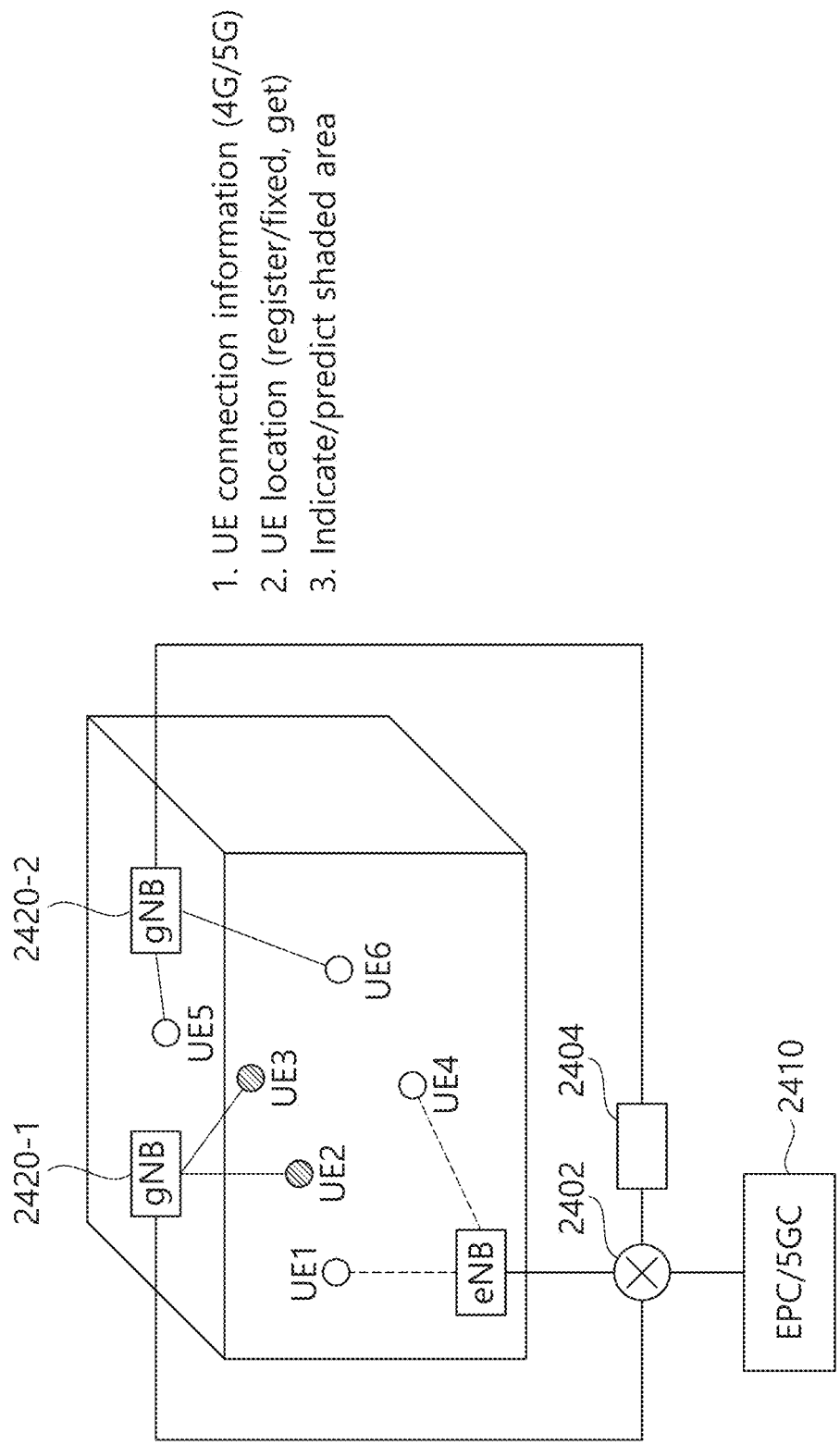
FIG. 24 is a conceptual diagram showing information the network performance diagnosis device according to an embodiment of the present disclosure calculates in relation to the performance of 5G-based communication service.

FIG. 24 is a conceptual diagram showing information the network performance diagnosis device according to an embodiment of the present disclosure calculates in relation to the performance of 5G-based communication service.

Referring to FIG. 24, the network performance diagnosis device 2404 may be disposed while connected to a switching device 2402 between eNB 2420-3 and gNB 2420-1 and 2420-2 and an EPC or 5GC 2410. The network performance diagnosis device 2404 may be connected to the switching device 2402 and perform mirroring and analysis of at least some packets transmitted and received by the EPC or 5GC 2410 via the switching device 2402.

In the embodiment of FIG. 24, a user terminal UE1 and a user terminal UE4 may access the eNB 2420-3 and transmit a packet to the EPC 2410, a user terminal UE2 and a user terminal UE4 may access the gNB 2420-1 and transmit the 5GC 2404, and a user terminal UE5 and a user terminal UE6 may access the eNB 2420-3 and transmit a packet to the 5GC 2404.

In this instance, the network performance diagnosis device 2404 may determine whether they are connected to a 4G network or 5G network and visually display this, based on information on connections to the base stations 2420-1, 2420-2, and 2420-4. In this case, the visual representation may be done based on location information of the user terminals UE1 to UE6. The UE's locations may be fixed. The device may pre-store location information of fixed UEs. Accordingly, in a visualization map related to network connections, the fixed UEs are displayed at locations pre-stored on a visual space where the UEs are displayed. In the case of mobile UEs, location information of the UEs may be received in real time and reflected on the visual space, thereby displaying connection information of the UEs. The real-time location information of the UEs may be acquired by each UE through GPS, and the network performance diagnosis device 2404 periodically collects and acquires the real-time location information from the UEs. Alternatively, the UE's real-time location may be acquired through an indoor positioning technology for UEs, base stations, or other access points.

The visual space may be a map showing a specific space as an image. In this map, the UEs are displayed in different visual representations based on connection information. For example, UEs (e.g., UE1 or UE4) connected to a 4G network are displayed in black, and UEs (e.g., UE2, UE3, UE5, and UE6) connected to a 5G network may be displayed in white. Details of such visual representations may; be changed by user settings, and may be expressed variously using the shape, color, hatching, size, etc. of nodes.

The device 2404 determines whether UEs work properly based on network connection information of the UEs. In this instance, whether they work properly is determined according to a reference value, and the reference value may be set as at least one of a reference value related to a 4G network, a reference value related to a 5G network, a reference value related to a network each individual UE is connected to, and a reference value set directly by the user. For example, in the case of a 5G network-based reference value, the reference value may be 1 ms in terms of network latency (corresponding to RTT) as in the above-explained thresholds, and it is determined whether the network latency of each UE is within 1 ms according to a packet analysis result transmitted and received from UE1 to UE6, so as to determine whether 5G communication is working well. If not, an indication (e.g., red node) of error is made. For the 5G-related reference value, refer to FIG. 20 and the corresponding description.

In the case of a 4G network-based reference value, a threshold for network latency may be set to 10 ms, for example. Accordingly, it is possible to determine whether 4G-based communication is working well by comparing the network latency of UE1 to UE6 with 10 ms. By using a UE connection network-dependent threshold, it is determined whether UE1 and UE4 work within a corresponding threshold range with respect to a 4G-based threshold, and whether UE2, UE3, UE5, and UE6 work within a corresponding threshold range with respect to a 5G-based threshold. Different thresholds are given and compared depending on the type of each UE's connection network.

Visual representations may be determined by the effects of both of two factors: the UE's connection network and the UE's network performance. For example, the color of the contour line of a UE node may be determined depending on the connection network, and the internal color of the UE node may be determined based on the appropriateness of the network performance. That is, if the network performance is appropriate because of a connection to a 4G network, a blue node contour line indicating the 4G network may be internally colored in white. If the network performance is not appropriate because of a connection to a 5G network, the UE may be displayed, with a red node contour line indicating 5G being internally colored in red which indicates an error. A communication shaded area may be displayed based on the locations of such UEs and the corresponding network performance indicators, and a performance degradation of UEs moving to the shaded area may be predicted.

Figure 25:
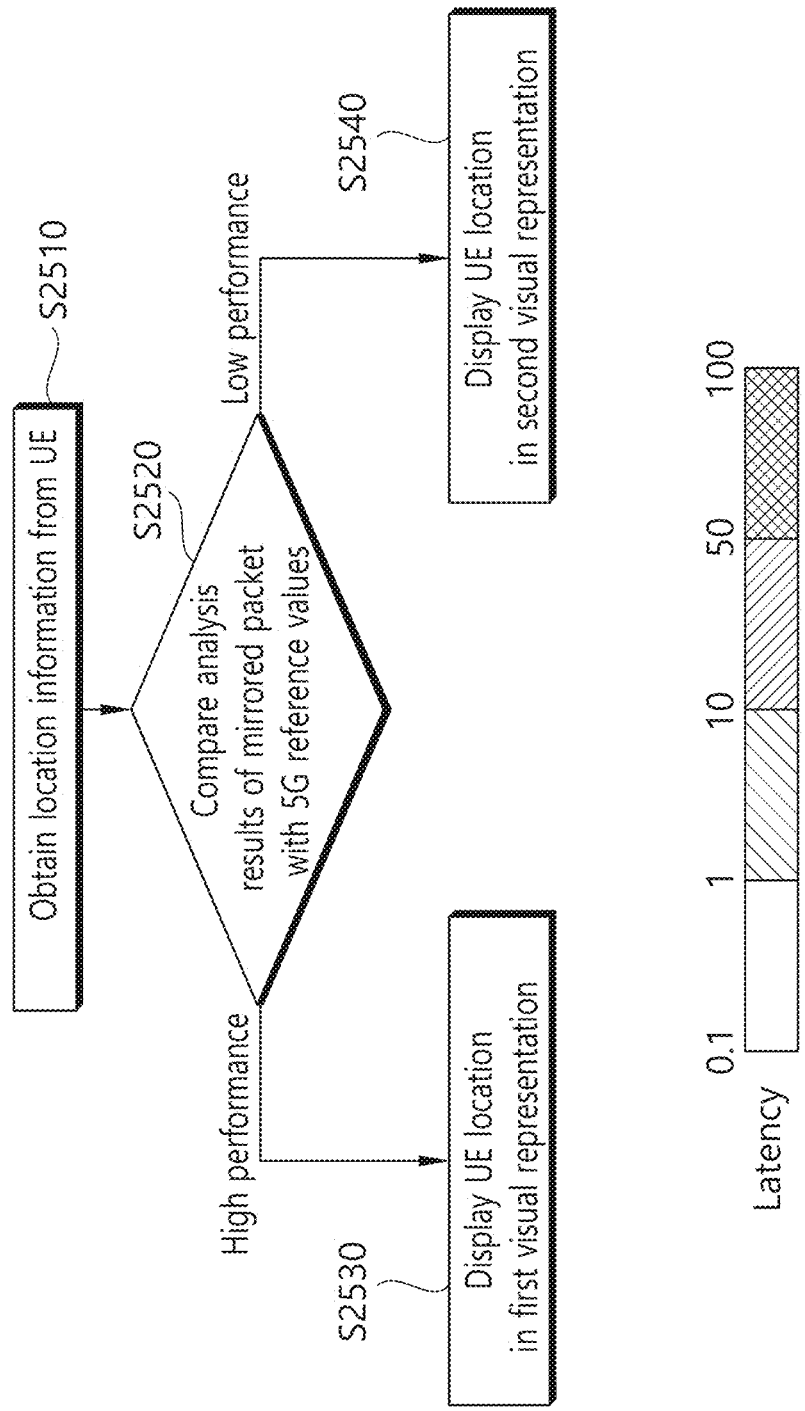
FIG. 25 is a flowchart showing a method in which the network performance diagnosis device according to an embodiment of the present disclosure visualizes network performance.

FIG. 25 is a flowchart showing a method in which the network performance diagnosis device according to an embodiment of the present disclosure visualizes network performance.

Referring to FIG. 25, the device obtains location information of a UE from the corresponding UE (S2510). If the location of the UE is fixed, the above step may be omitted. The device mirrors a packet transmitted or received by the corresponding UE from a switching device and obtains the mirrored packet, analyzes the obtained packet, and calculates at least a part of about 120 network performance indicators. Then, the calculation results are compared with reference values (S2520). In this embodiment, 5G service-related thresholds (e.g., a network latency of 1 ms, a maximum transmission speed of 30 Gbps, etc.). As a result of the comparison, if the performance is higher than a threshold, the UE's location is displayed in a first visual representation in a stored visualized space (S2530), and if not, the UE's location is displayed in a second visual representation (S2540).

According to an embodiment of the present disclosure, a plurality of thresholds may be set, and a specific network performance-related indicator may be divided into segments so that different visual representations are displayed in the different segments. For example, a network latency of 0.1 ms to 1 ms may be shown in a first visual representation, a network latency of 1 ms to 10 ms may be shown in a second visual representation, a network latency of 10 ms to 50 ms may be shown in a third visual representation, and a network latency of 50 ms to 100 ms may be shown in a fourth visual representation. Thus, it is possible to estimate the level of network performance by the visual representations alone.

Figure 26:
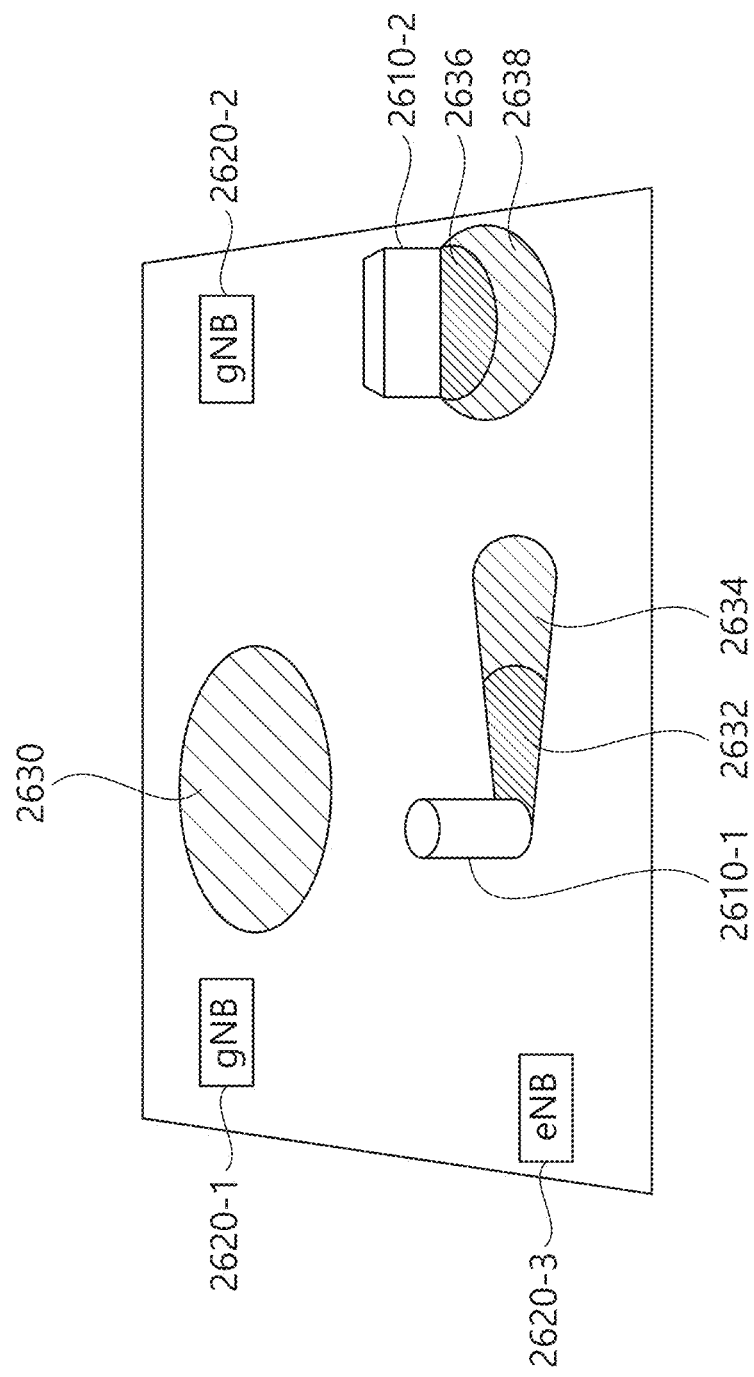
FIG. 26 is a view illustrating a network shaded area display map visualizing network performance according to the method of FIG. 25.

FIG. 26 is a view illustrating a network shaded area display map visualizing network performance according to the method of FIG. 25.

Referring to FIG. 26, the device may display a shaded area for network performance in a visualization space. The device may analyze the locations of UEs and the performance indicators of the UEs and display shaded areas. For example, if at least one UE located in an area 2630 all exhibits the performance of the second segment in FIG. 25, this area 2630 may be specified and displayed in a visual representation related to the second segment.

According to another embodiment, if at least one UE in an area 2632 has the performance of the third segment because of weakening of radio waves from an eNB 2620-3 in relation to an obstacle 2610-1, the corresponding region is displayed in a visual representation corresponding to the third segment. Also, the performance of at least one UE having the performance of the second segment which is a neighboring area 2634 of the area 2632 may be analyzed so that the area 2634 is displayed in a visual representation corresponding to this performance.

In a relationship between an obstacle 2610-2 and a base station 2630-2, an area 2636 and an area 2638 are also displayed in the same ways as above.

Moreover, in displaying a network shaded area, the network performance of a third location between a first location and a second location may be estimated based on the network performance of UE1 present in the first location and UE2 present in the second location. For example, if UE1 has a network latency of 1 ms and UE2 has a network latency of 9 ms, the network latency in the third location which is midway between the two UEs may be estimated to be about 5 ms. This is estimated by the performance indicators between the two UEs alone. If there are a plurality of entities in relation to the third location, the performance indicators in the third location may be calculated in consideration of all or at least a part of the performance indicators of the plurality of UEs. In this case, a UE related to a particular location represents a UE present within a threshold range from that particular location, and considers the location of an obstacle and/or base station present within the threshold range.

According to an embodiment of the present disclosure, performance indicators in a location where no actual entity is disposed may be calculated based on a trained model after the relationship between a location in an area where an actual entity is disposed in a particular visualization space and the performance indicators is trained using an artificial intelligence model or machine learning.

According to an embodiment, a fixed number of UEs are concentrated in a basically constant area size, in relation to displaying of network performance in an area, and when they exhibit the same or similar performance, the network performance in that area may be displayed in a corresponding visual representation. However, if there is a particular obstacle, as long as there is at least one UE in a preset area which is expected to be shaded based on the relationship between the obstacle and the base station, the network performance of the preset area may be displayed in a visual representation corresponding to the network performance of the UE. The shaded area may be expected in consideration of a cell area of the base station without an obstacle, and even if there is only one UE in the expected shaded area, the network performance of the shaded area may be visualized based on the network performance of the only one UE disposed in that area. In this case, if the performance of the UE is normal, even an area designated as an expected shaded area may not be displayed as a shaded area.

According to another embodiment of the present disclosure, the device may generate and update a network shaded area display map for a specific space by the above method. Since the device is able to periodically receive location information from a mobile UE, an alert signal may be provided to a UE that is expected to enter a shaded area on the network shaded area display map by considering the moving speed of the mobile UE. Alternatively, a visual representation corresponding to a shaded area entry alert may be displayed to the corresponding UE in the map, and the UE user or the corresponding network manager may be supported to expect that the operation of the corresponding UE might not be suitable for 5G performance.

According to an embodiment of the present disclosure, the device may consider a variable environment for the location of a base station. In this case, the beamforming capability of the base station may be considered as well. If the location of the base station is changed, the device re-calculates an expected shaded area, etc. based on the changed location. Also, it is desirable that information on UEs' connections to the base station and network performance indicators may be re-calculated corresponding to the location change. The device updates various information related to network performance based on the re-calculated network performance indicators.

Figure 27A:
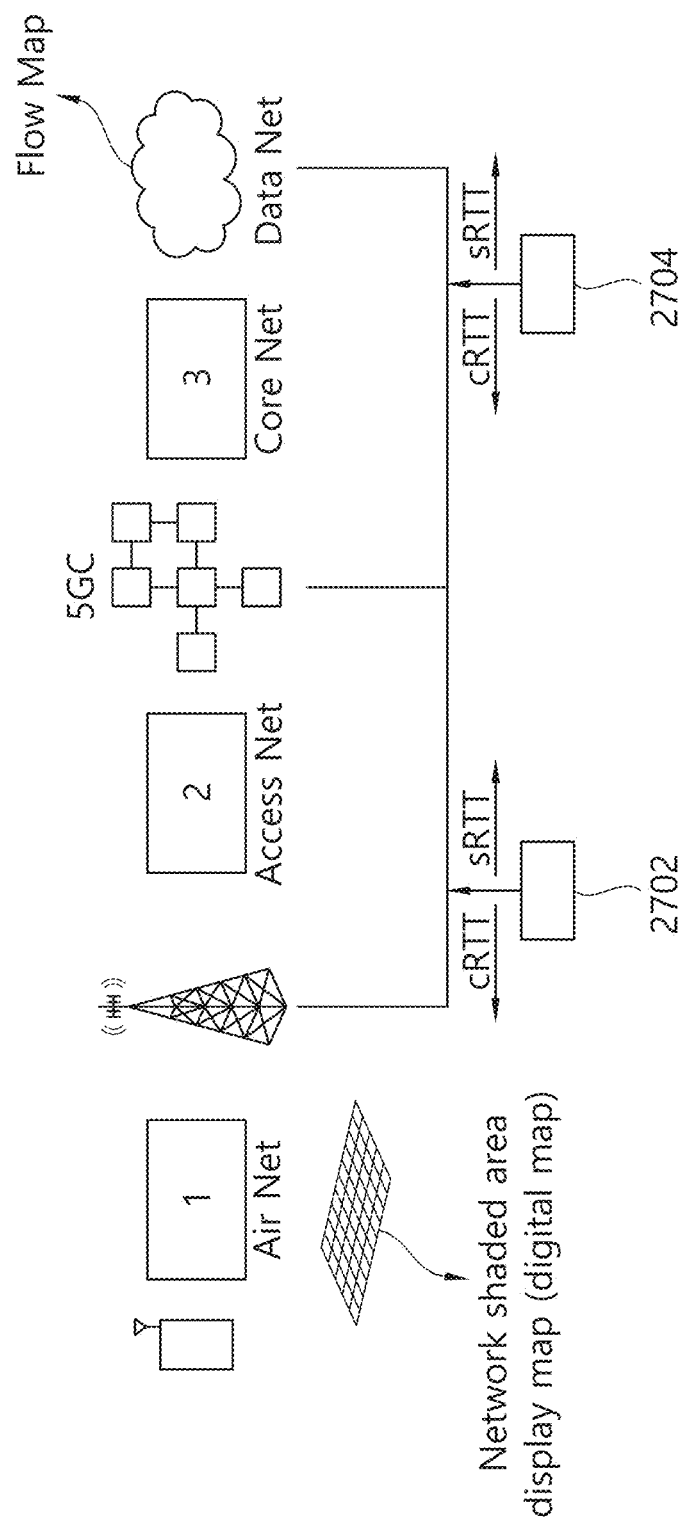
FIG. 27a is a conceptual diagram for explaining a method in which a network performance diagnosis device according to an embodiment of the present disclosure calculates performance for each region of an entire network.

FIG. 27*a* is a conceptual diagram for explaining a method in which a network performance diagnosis device according to an embodiment of the present disclosure calculates performance for each region of an entire network.

Referring to FIG. 27*a*, the network performance diagnosis device 2702 and 2704 monitors at least a part of an entire network including an Air Net 1, an Access Net 2, a Core Net 3, and a Data Net which are related to 5G or LTE. A server or server stage that operates a specific web site may be present in the Data Net. However, the server does not necessarily have to be linked to the web site.

The device 2702 may be disposed between a base station and 5GC in order to calculate the network performance of the Air Net 1. Here, CRTT and sRTTT may be calculated, and network performance indicators such as the network latency and data transmission speed in the Air Net 1 between the terminal and the base station may be calculated by using cRTT. Also, the network performance indicators in the Access Net 2 and the Core Net 3 may be checked by using the sRTT of the device 2702 and the cRTT of the device 2704 connected between 5GC and the data net. Moreover, the network performance indicators of the server stage present on the Data Net may be calculated by using the sRTT of the device 2704.

According to another embodiment of the present disclosure, a separate intermediary device (not shown) may be placed in a 5G core portion, that is, between the device 2702 and the device 2704, to calculate the network performance indicators of the Access Net 2 and the network performance indicators of the Core Net 3 separately by using the cRTT and sRTT calculated by the intermediary device. Also, the network performance indicators in the Data Net may be calculated.

The device may generate a network shaded area display map (Digital Map) as shown in FIG. 26 by using the performance indicators in the Air Net 1 among the above calculated network performance indicators. Also, a flow map as shown in FIG. 18 may be generated with the performance indicators in the Data Net.

In this case, each network performance diagnosis device connected to a different access point may obtain and store 4-tuple information from a mirrored packet to calculate the network performance indicators. The 4-tuple information may include a source IP, a destination IP, a source port, and a destination port.

Figure 27B:
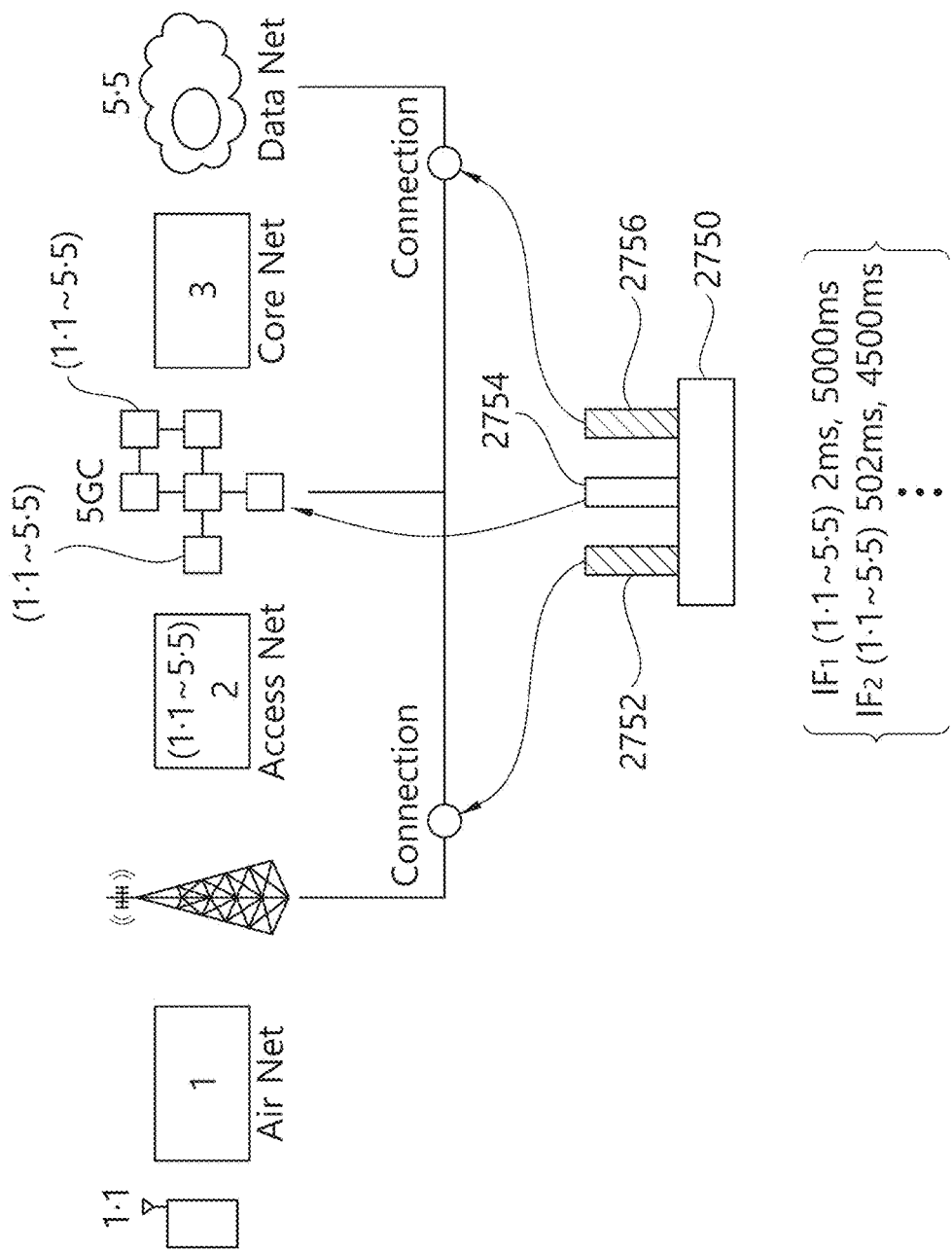
FIG. 27b is a conceptual diagram for explaining a method in which a network performance diagnosis device according to another embodiment of the present disclosure calculates performance for each region of an entire network.

FIG. 27*b* is a conceptual diagram for explaining a method in which a network performance diagnosis device according to another embodiment of the present disclosure calculates performance for each region of an entire network.

Referring to FIG. 27*b*, one network performance diagnosis device 2750 may achieve the effect of being disposed at a plurality of access points by using a plurality of network interfaces. That is, a first network interface 2752 may be connected between a base station and 5GC, a second network interface 2754 may be connected to 5GC, and a third network interface 2756 may be connected to a Data Net, whereby the three network performance diagnosis devices including the above intermediary device of FIG. 27a may perform the same operation as calculating the network performance indicators of the Air Net 1, Access Net 2, and Core Net 3. The network performance diagnosis device periodically calculates cRTT and sRTT individually for each interface, and if using three network interfaces, may calculate three sets of cRTT and sRTT values. As for the cRTT and sRTT values of each interface at the bottom of FIG. 27b, it may be seen that, in packets (whose source IP is 1.1 and whose destination IP is 5.5) used for a first interface $IF_1$ to communicate from a UE 1.1 to a particular server 5.5, the cRTT is 2 ms and the sRTT is 5000 ms. In the case of a second interface $IF_2$, the results of analysis of the packets show that the cRTT is 502 ms and the sRTT is 4500 ms. Using the cRTT and sRTT values calculated via the two interfaces, the network latency (corresponding to RTT) of the Air Net 1 may be calculated to be 2 ms, and the network latency of the Access Net 2 may be calculated to be about 500 ms by subtracting the cRTT value of 2 ms of the first interface $IF_1$ from the cRTT value of 502 ms of the second interface $IF_2$. In this way, the network performance of each of the networks (Air Net, Access Net, Core Net, and Data Net) may be separately calculated by using the cRTT and sRTT values at the access points of the three network interface cards.

When using a plurality of interface cards, the device may additionally obtain NIC (Network Interface Card) information from a mirrored packet, in addition to the above-explained 4-tuple information, and may use a total of 5-tuple information to calculate the network performance indicators.

The aforementioned system or device and method may be implemented as a hardware element, a software element and/or a combination of a hardware element and a software element. For example, the system, device, and elements described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing device may perform an operating system (OS) and one or more software applications executed on the OS. Furthermore, the processing device may access, store, manipulate, process, and generate data in response to the execution of software. For convenience of understanding, one processing device has been described as being used, but a person having ordinary skill in the art may understand that the processing device may include a plurality of processing elements, and/or a plurality of types of processing elements. For example, the processing device may include a plurality of processors or a single processor and a single controller. Furthermore, other processing configurations, such as a parallel processor, are also possible.

Software may include a computer program, code, an instruction or a combination of one or more of them and may configure the processor so that it operates as desired or may instruct the processor independently or collectively. The software and/or data may be permanently or temporarily embodied in any type of machine, component, physical device, virtual equipment or computer storage medium or device or a transmitted signal wave in order to be interpreted by the processor or to provide an instruction or data to the processor. The software may be distributed to computer systems connected over a network and may be stored or executed in a distributed manner. The software and the data may be stored in one or more computer-readable recording media.

The method according to embodiments may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as a CD-ROM or a DVD, magnetooptical media such as a floptical disk, a ROM, a RAM, or a flash memory. Examples of the program instruction may include both a machine-language code, such as a code written by a compiler, and a high-level language code executable by a computer using an interpreter. The hardware device may be configured in the form of one or more software modules for executing the operation of the embodiment, and the vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

What is claimed is:

1. A method for diagnosing a performance of a 5G-based network by a network performance diagnosis device connected to a switching device connected to the 5G-based network, the method comprising:
    obtaining at least one mirrored packet for at least one packet transceived from/to a user terminal connected to at least one base station on the basis of mirroring from the switching device;
    calculating a performance-related indicator representing the performance of a network associated with the user terminal and the at least one base station on the basis of at least a part of information included in the at least one mirrored packet; and
    determining whether the 5G-based network operates normally, on the basis of the performance-related indicator,
    wherein the performance-related indicator comprises information on the user terminal's connection to the at least one base station, and
    wherein the connection information comprises information indicating whether a network to which the user terminal is connected is a 5G network or a long-term evolution (LTE) network.

2. The method of claim 1, wherein the at least one base station comprises at least one of
    a gNB (Next Generation NodeB), which is a base station of a 5G network, an en-gNB, which supports a connection to an LTE core or a connection to a 5G core, and an ng-eNB, which supports the connection to the LTE core.

3. The method of claim 1, further comprising:
comparing the performance-related indicator with a predetermined reference value related to a network performance required by a 5G communication service; and
determining whether an error has occurred or not based on a result of the comparison.

4. The method of claim 1, further comprising:
comparing the performance-related indicator with a predetermined reference value related to a network performance required by a communication service to which the user terminal is connected, the communication service to which the user terminal is connected comprising LTE or 5G communication; and
determining whether an error has occurred or not based on a result of the comparison.

5. The method of claim 1, further comprising, when it is determined that an error in network performance has occurred, sending an alert regarding the error occurrence.

6. The method of claim 5, wherein the alert comprises at least one of displaying a visual representation related to the alert on a display screen or transmitting a signal related to the alert to the user terminal.

7. The method of claim 1, wherein a reference value related to a packet RTT (Round Trip Time) from the user terminal to a first entity or the at least one base station, among the performance-related indicator, is compared to a reference value related to a network latency required by the 5G communication service.

8. The method of claim 7, wherein the reference value related to the network latency is from 1 ms to 2 ms.

9. The method of claim 1, wherein a BPS (Bits Per Second) representing the number of bits of data per second, among the performance-related indicator, is compared with a BPS-related reference value required by a 5G communication service.

10. The method of claim 9, wherein the BPS-related reference value required by the 5G communication service is from 100 Mbps to 1 Gbps.

11. The method of claim 1, wherein the calculating of the performance-related indicator comprises:
extracting, from a first mirrored packet generated by mirroring a first packet transmitted to the first entity from the user terminal, information on a first timing T1 at which the first packet arrives at the network performance diagnosis device from the user terminal, the first entity being an entity that arrives from the user terminal via at least one of the at least one base station and a core network;
extracting, from a second mirrored packet generated by mirroring a first response packet from the first entity with respect to the first packet, information on a second timing T2 at which the first response packet arrives at the network performance diagnosis device from the first entity; and
calculating a first round trip time sRTT based on the extracted information on the first timing T1 and the extracted information on the second timing T2.

12. The method of claim 11, wherein the calculating of the performance-related indicator further comprises:
extracting, from a third mirrored packet generated by mirroring a second response packet from the user terminal with respect to the first response packet, information on a third timing T3 at which the second response packet arrives at the network performance diagnosis device from the user terminal; and
calculating a second round trip time cRTT based on the extracted information on the second timing T2 and the extracted information on the third timing T3.

13. The method of claim 12, further comprising
calculating individual network performance-related indicators for each of a first network and a second network located between the user terminal and a data network (DN), by using the first round trip time sRTT and the second round trip time cRTT, which are calculated by a first network performance diagnosis device connected to a first switching device, and by using the first round trip time sRTT and the second round trip time cRTT, which are calculated by a second network performance diagnosis device connected to a second switching device,
wherein the first switching device is disposed between a network core and at least one base station, and
wherein the second switching device is disposed between a network core and the data network.

14. The method of claim 13, wherein the first network comprises at least one of a wireless network (Air Net) and an access network, and the second network comprises at least one of an access network (Access Net) and a core network (Core Net).

15. The method of claim 12, further comprising
calculating individual network performance-related indicators for each of a first network and a second network located between the user terminal and a data network, by using the first round trip time sRTT and the second round trip time cRTT, which are calculated using a first network interface connected to a first switching device provided between a network core and at least one base station, and by using the first round trip time sRTT and the second round trip time cRTT, which are calculated using a second network interface connected to a second switching device between a network core and a data network,
wherein the first network interface and the second network interface are connected to different ports of the network performance diagnosis device.

16. The method of claim 15,
wherein 5-tuple information of the at least one mirrored packet is analyzed in order to calculate individual network performance-related indicators,
wherein the 5-tuple information comprises a source IP, a destination IP, a source port, a destination port, and NIC (Network Interface Card) information.

17. The method of claim 1, wherein the switching device is provided between a network core and at least one base station.

18. A network performance diagnosis device connected to a switching device connected to a 5G-based network, the network performance diagnosis device comprising:
a port that obtains at least one mirrored packet for at least one packet transceived from/to a user terminal connected to at least one base station on the basis of mirroring from the switching device;
a processor that calculates performance-related indicators representing the performance of a network associated with the user terminal and the at least one base station on the basis of at least a part of information included in the at least one mirrored packet, and that determines whether the 5G-based network operates normally, on the basis of the performance-related indicators; and a memory that stores instructions related to the operation of the processor and stores the calculated performance-related indicators, wherein the performance-related indicators comprise information on the user terminal's connection to the at least one base station, and wherein the connection information comprises information indicating whether a network to which the user terminal is connected is a 5G network or a long-term evolution (LTE) network.

19. A 5G-based network performance diagnosis system comprising:

a switching device connected to a 5G-based network; and a network performance diagnosis device that obtains at least one mirrored packet for at least one packet transceived from/to a user terminal connected to at least one base station on the basis of mirroring packets from the switching device, that calculates performance-related indicator representing the performance of a network associated with the user terminal and the at least one base station on the basis of information included in the at least one mirrored packet, and that determines whether the 5G-based network operates normally, on the basis of the performance-related indicator, wherein the performance-related indicator comprises information on the user terminal's connection to the at least one base station, and wherein the connection information comprises information indicating whether a network to which the user terminal is connected is a 5G network or a long-term evolution (LTE) network.

* * * * *